(12) United States Patent
Deysarkar et al.

(10) Patent No.: US 11,407,932 B2
(45) Date of Patent: *Aug. 9, 2022

(54) FRACTURING FLUID COMPOSITIONS AND METHODS FOR MAKING AND USING SAME

(71) Applicant: PfP INDUSTRIES, LLC, Houston, TX (US)

(72) Inventors: Asoke Kumar Deysarkar, Houston, TX (US); Michael Joseph Callanan, Houston, TX (US); Robert Ray McDaniel, Cypress, TX (US); Brian James Keola DeCaires, Cypress, TX (US); Nikhil Patel, Houston, TX (US); Nathalie Rasolomiarantsoa, Houston, TX (US); James Nguyen, Houston, TX (US); Rajendra Ghimire, Houston, TX (US); Madhukar Chetty, Houston, TX (US)

(73) Assignee: PfP Industries, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/098,521

(22) Filed: Nov. 16, 2020

(65) Prior Publication Data

US 2021/0222054 A1 Jul. 22, 2021

Related U.S. Application Data

(60) Continuation of application No. 16/911,546, filed on Jun. 25, 2020, now Pat. No. 10,829,685, and a
(Continued)

(51) Int. Cl.
*C09K 8/68* (2006.01)
*E21B 43/26* (2006.01)
(Continued)

(52) U.S. Cl.
CPC .............. *C09K 8/685* (2013.01); *C09K 8/725* (2013.01); *C09K 8/885* (2013.01); *C09K 8/887* (2013.01);
(Continued)

(58) Field of Classification Search
CPC .......... C09K 8/685; C09K 8/90; C09K 8/887; C09K 8/035; C09K 8/68; C09K 2208/26;
(Continued)

(56) References Cited

U.S. PATENT DOCUMENTS

| 2008/0066909 A1* | 3/2008 | Hutchins | C09K 8/80 |
| | | | 166/280.1 |
| 2015/0203746 A1* | 7/2015 | Aften | C09K 8/035 |
| | | | 166/280.1 |

* cited by examiner

*Primary Examiner* — Zakiya W Bates
(74) *Attorney, Agent, or Firm* — Robert W. Strozier

(57) ABSTRACT

Polymers and fracturing fluid compositions including a base fluid, an effective amount of a hydratable polymer composition including one or more gel-forming hydratable polymers, a friction reducer composition including hydrolyzed or partially hydrolyzed hydrolyzable polymers and copolymers, a cross-linking composition in an amount sufficient to crosslink the one or more gel-forming hydratable polymers to form crosslinked structures within the fracturing fluid composition with or without a proppant and methods including combining an aqueous fluid and an oleaginous fluid to prepare an invert emulsion comprising a polymerizable composition, degassing the invert emulsion under an extensional flow regime through an elongated passageway of an extender and thereby removing oxygen to produce a degassed invert emulsion and compositions and methods including a hydratable additive concentrate comprising a hydratable additive that is at least substantially hydrated and a hydrating liquid, wherein the hydratable additive concentrate is a mixture produced according to a method that includes flowing a hydrating liquid in a extensional flow regime through an elongated passageway of an extender.

28 Claims, 15 Drawing Sheets

Related U.S. Application Data continuation of application No. 16/900,084, filed on Jun. 12, 2020, now Pat. No. 10,836,849, which is a continuation-in-part of application No. 16/556,566, filed on Aug. 30, 2019, now Pat. No. 10,703,963, said application No. 16/911,546 is a division of application No. 16/556,566, filed on Aug. 30, 2019, now Pat. No. 10,703,963, application No. 17/098,521, which is a continuation of application No. 16/101,835, filed on Aug. 13, 2018, now Pat. No. 10,870,791.

(60) Provisional application No. 62/545,368, filed on Aug. 14, 2017.

(51) Int. Cl.
 *C09K 8/90* (2006.01)
 *C09K 8/72* (2006.01)
 *C09K 8/88* (2006.01)
 *E21B 43/267* (2006.01)

(52) U.S. Cl.
 CPC ............... *C09K 8/90* (2013.01); *E21B 43/26* (2013.01); *E21B 43/267* (2013.01)

(58) Field of Classification Search
 CPC ........ E21B 43/26; E21B 43/267; E21B 43/16; E21B 43/25
 See application file for complete search history.

US 11,407,932 B2

FRACTURING FLUID COMPOSITIONS AND METHODS FOR MAKING AND USING SAME

RELATED APPLICATIONS

The present application is a continuation application of United States Patent Application Serial Nos. (a) Ser. No. 16/101,835 filed Aug. 13, 2018, which claim priority to and the benefit of U.S. Provisional Application Ser. No. 62/545,368, filed Aug. 14, 2017; (b) Ser. No. 16/900,084 filed Jun. 12, 2020, which is a continuation-in-part of U.S. patent application Ser. No. 16/556,566 filed Aug. 30, 2019, now U.S. patent Ser. No. 10/703,963 issued Jul. 7, 2020; and (c) Ser. No. 16/911,546 filed Jun. 25, 2020, which is a divisional of U.S. patent application Ser. No. 16/556,566 filed Aug. 30, 2019, now U.S. patent Ser. No. 10/703,963 issued Jul. 7, 2020, incorporated by reference through the operation of the closing paragraph of the specification.

BACKGROUND OF THE DISCLOSURE

1. Field of the Disclosure

U.S. Ser. No. 16/101,835

Embodiments of the present disclosure relate to compositions, systems, and methods for making and using the compositions, where the compositions include a crosslinked fracturing fluid including a base fluid comprising fresh water, a high total dissolved solids (TDS) produced water, a TDS flow back water, a brackish water, a reverse osmosis (RO) reject water, a clear brine, or mixtures thereof. Embodiments of the present disclosure also relate to low concentration crosslinked polymer fracturing fluids and methods for making and using same.

In particular, embodiments of the present disclosure relate to compositions, systems, and methods for making and using the compositions, where the compositions include a crosslinked fracturing fluids including a base fluid comprising fresh water, a high TDS produced water, a TDS flow back water, a brackish water, a RO reject water, a clear brine, or mixtures and combinations thereof. The methods include: (a) adding a first buffer to the base fluid to lower a pH of the base fluid to form a low pH base fluid, (b) adding a hydratable polymer or a hydratable polymer slurry to the base fluid to form a hydrated hydratable polymer fracturing fluid, (c) adding a crosslinking agent to the hydrated hydratable polymer fracturing fluid to form a pre-cross-linked fracturing fluid, and optionally (d) adding a second buffer to the pre-cross-linked fracturing fluid to increase a pH of the pre-cross-linked fracturing fluid to form a viscosified fracturing fluid. In certain embodiments, the methods also include the step of adding a proppant to the fracturing fluid. In other embodiments, the methods include fracturing a formation with the fracturing fluid of this disclosure, where the fracturing methods may include injecting the fracturing fluid with the proppant or injecting a proppant free fracturing fluid followed by injecting a proppant fluid.

2. Description of the Related Art

U.S. Ser. No. 16/101,835

Hydraulic fracturing is a process in which proppant is transported at a very high pressure along with other necessary reagents to form fracture or fissures in a formation and to prop-open the fractures or fissures in the formation. The most common way of transporting proppant is by suspending the proppant in a viscosified fluid. The fluid could be either viscous (linear gel or crosslinked) or thin as in a "slick water frac". The key is to pump at a higher rate than may leak-off (flow out into the reservoir rock). When this happens there is a build-up of pressure at the face exposed to the fracturing fluid. This pressure will continue to increase until it exceeds the forces binding the rock together. At this point the formation rock will "fracture". Once the fracture is initiated, continued pumping will cause the fracture to grow in length, width and height.

After fracture initiation and during the period of fracture development and growth, solids called proppants are added to the fluid being pumped forming a slurry so that the proppants may be deposited in the created fracture. Multiple stages of slurry injection at increasing pumping rates are common. It is the distribution of the solids in the fracture that will keep the fracture propped open after pumping has ceased and the formation tries to go back to its unstressed position. This "propped" fracture has a conductivity that is significantly higher that the formation rock surrounding it and therefore represents a highly conductive passageway back to the wellbore.

While the variation in the formation properties of the various producing intervals may lead to the need for a variety of viscosity levels in the fracturing fluids that may be utilized to perform the most effective fracturing treatment designs, they all have one thing in common. That being the effect that horizontal completions has had on treatment designs. The trend to horizontal completions has led to the increase of the "lateral" lengths and the number of fracturing stages that are required to maximize the amount of production that may be realized in a given well. As the number and size of the stages increases (regardless of the fluid being utilized) so does the requirement for water that is necessary to complete the fracture design. This trend may easily translate to a fracturing design for a well that could require 5 to 15 million gallons of water.

While slick water (containing friction reducers), linear gels and crosslinked gels all may be effective with fresh water and some limited blending of fresh and brackish water (containing an elevated level of total dissolved solids or TDS), no approach may retain their fluid viscosity (and related proppant transport capability) if TDS levels get too high or there is an attempt to utilize produced water, flow back water, or frac flow back water. This is because of high TDS of produced or flow back water which translates to a large number of water analytes or impurities compared to fresh water. While linear gels may maintain their viscosity and transport properties in high TDS fluids the same may not be said for the friction reducers that are a key part of a slick water design or a crosslinked polymer gel.

The effect that high TDS water has on the performance properties of the friction reducer (used in slick water designs) may be illustrated by the results of a dynamic proppant transport test. The procedure for such a test is shown below:

1. adding a 500 mL sample of a hydrated friction reducer/frac system to be tested to a blend jar including a blender and stir for 5 minutes to 1500 rpm[1];

[1] The time allowed for polymer hydration may be representative of an expected hydration period (associated with the treatment) or some standard period.

2. adding 120 g of a proppant to be tested (equivalent to 2 ppg) and mix for 30 seconds;
3. increasing a shear rate to achieve a calculated high shear history[2];

[2] The shear history may be specific to a particular application or some standard calculated shear history.

4. at the conclusion of the high shear history, reducing the blender rpm until build-up of proppant is visible on the bottom of the blend jar;
5. increasing the rpm to fluidize the settled proppant and then start decreasing rpm to again find a minimum rpm[3] to prevent proppant build-up and repeating this process until the minimum rpm numbers remains within 10% of one another; and

[3] For a friction reducer to exhibit an improved proppant transport the RPM reading needs to be a minimum of 10% lower than that of the same TDS water without a friction reducer.

6. recording a lowest rpm reading that does not cause proppant build up.

The adverse effect that high TDS waters have on the suspension properties of a friction reducer are illustrated in FIG. 1. The test results shown in FIG. 1 verify that an increase of TDS to 50,000 ppm will result in the total elimination of any (anionic or cationic) friction reducer's ability to improve proppant transport above the same TDS water without any polymer in solution.

Slick water fracturing designs are the most frequently utilized approach to fracture stimulating today's horizontal completion that continue to utilize massive amounts of fresh water. Their popularity is based on their relatively low cost coupled with their ability to create long, narrow fracture profiles. The desire to improve the well's response to this stimulation technique has resulted in an increase in the length of the lateral completion and in the number of stages performed in each treatment design. Both of these trends result in an increase in the amount of fresh water that is consumed in each stimulation operation.

Them is increasing pressure to reduce the amount of fresh water that is consumed in the fracturing process. An obvious alternative would be to utilize high TDS water or at least a mixture of high TDS and fresh water as a replacement for fresh water in these fracturing operations. Unfortunately, the effect of elevated TDS on the viscosity and transport capability of a slick water fluid makes this approach less than desirable. The effect of high TDS on friction reducers is best shown in FIG. 1. The samples labeled AFRE-4 represent tests performed on a high molecular weight/high viscosity anionic friction reducer available from PfP Industries.

All test results depicted in FIG. 1 include a high shear period that represents the high velocity period corresponding to the fracturing fluid traveling through tubular good from the surface to the entry of the fracture. This representative shear history will test each friction reducer's capacity to resist shear degradation. The combination of high TDS and a representative shear history renders both the high viscosity anionic friction reducers and standard cationic friction reducers comparable (in suspension properties) to a high TDS water that does not contain a friction reducer/polymer to improve proppant transport.

A crosslinked fracturing fluid may be described as consisting of a hydratable polymer such as guar, its derivatives, or a natural polysaccharide that hydrates easily in water and may be cross-linked with metals or polyvalent compounds to form an efficient, effective, carrier of proppant into fractured formations. Traditionally, this type of fracturing fluid would include hydratable polymers such as guar, a pH buffer, and cross-linking compositions (such as a borate cross-linker). The traditional method for forming the fracturing fluid includes: (a) hydrating a hydratable polymer or hydratable polymer slurry in a pH neutral water, (b) adding a high pH buffer to the fluid to increase a pH of the fluid to a pH above pH 9, and (c) adding a cross-linking composition to the fluid to cross-link the hydratable polymers to form the viscosified fracturing fluid.

This type of fracturing fluid approach (unlike a slick water design) will possess a significant ability to generate fracture width and transport proppant if prepared using a relatively fresh water (low TDS) but if prepared using a high TDS water will result in a poor viscosity and minimum proppant transport capability as demonstrated by the data presented in FIG. 2.

FIG. 2 confirms the viscosity profile of a crosslinked polymer prepared with fresh water. Switching from fresh water to a higher TDS synthetic brine (in this case API brine which has approximately 110,000 ppm TDS) drops the viscosity by more than 50%. Even more interesting is that if you actually utilize a produced back water (instead of a synthetic brine with a similar TDS) the viscosity drops to approximately 5% of the value for the same system in fresh water.

The continued growth in horizontal completions and in the desire to increase the amount of proppant pumped into the fracture matrix will result an increased need of water to be used in the fracturing programs. This trend is already causing a concern in the amount of fresh water that is required to meet fracturing needs and that will only continue to grow. At some point it will become a necessity to fill some of the required volume with something other than fresh water. Produced water from the formation or produced back water (after a fracturing treatment) are something that currently requires a monitored disposal plan and process. Utilizing these water sources as part or all of the water (to be consumed in a fracturing treatment) will both decrease the fresh water requirement and offer an alternative to current disposal costs.

However, increasing the TDS of the water (to be utilized in a fracturing program) will create its own set of issues. In slick water design while increased TDS has minimal effect on the drag reduction (that may be achieved during a pumping operation), as shown in FIG. 1 it will also render both anionic and cationic friction reducers virtually incapable of significantly contributing to proppant transport. As shown in FIG. 2, high TDS will also impact the viscosity values that may be achieved and proppant transport capabilities that may be derived from crosslinked polymer systems.

Clearly there is a need to incorporate high TDS water in fracturing treatment designs that may replace either current crosslinked fluid systems (designed to transport and place high concentrations of proppant) or slick water systems that may still create the long relatively narrow propped fractures that are required to maximize well response in today's well. In the case of slick water systems, there is also a clear need to create a viable option to the high volume, high rate slick water treatment designs that result in a less than desirable propped fracture length.

U.S. Ser. No. 16/900,084

In the oil and gas industry, hydrocarbons are obtained rom subterranean geologic formations by drilling a well that penetrates one or more hydrocarbon-bearing formations. The well provides a flowpath for the hydrocarbons to reach the surface, and production of the hydrocarbons to the surface occurs when a sufficiently unimpeded flowpath from the hydrocarbon-bearing formation to the wellbore is present.

The majority of subterranean formations produced today have low natural permeability. To improve permeability and well productivity, hydrocarbonbearing formations are commonly subjected to a hydraulic fracturing operation, also commonly referred to as "fracking." Hydraulic fracturing entails pumping a fracturing fluid downhole under high pressure and high flow rates and injecting the fracturing fluid into adjacent hydrocarbon-bearing formations to create, open, and extend formation fractures. Fracturing fluids usually contain propping agents, commonly referred to as "proppant" or "proppant particulates," that are carried into the fractures and deposited to hold or "prop" open the fractures once the fluid pressure is reduced. Propping the fractures open enhances permeability by allowing the fractures to serve as conduits for hydrocarbons trapped within the formation to flow to the wellbore.

Most fracturing fluids contain one or more additives to viscosify the fracturing fluid and thereby aid in transporting the fracturing fluid and proppant deeper into the fractures. Common viscosifying additives include hydrophilic polymers and guar. Preferred viscosity levels for the fracturing fluids are reached when the viscosifying additive becomes properly hydrated. The term "hydration" refers to the process wherein a hydratable material solvates or absorbs water (hydrates) and swells in the presence of water. Most commonly, a viscosifying additive is added to a fracturing fluid from a non-hydrated or poorly hydrated concentrate. High-shear blending protocols may provide more effective polymer hydration but result in polymer chain scission, which reduces the viscosity of the fluid and compromises the ability of the polymer to transport the proppant. Further, in most instances, conventional fracturing fluid formulation processes do not result in instantaneous hydration, thereby necessitating a wait time or multistage hydration protocol. Moreover, high-shear mixing (blending) may or may not cause a reduction in viscosity but it will damage the structure of the polymer, which can translate to a reduced ability to transport proppant.

As an alternative to waiting, slower hydrating polymers (e.g., guar gum) and faster hydrating polyacrylamides do not go through a pre-hydration step but rather are expected to hydrate "on the fly" as they are pumped. These polymers complete their hydration either in the tubular goods or early in the fracture. This approach currently is necessary to save time and labor but may not result in obtaining maximum performance properties out of the polymer and the concentration that is being utilized.

Multistage hydration protocols used to generate high viscosity fracturing fluids can be challenging, particularly at remote sites or when large fluid and proppant volumes are required. Special equipment for mixing the dry additives with water is required, and problems such as chemical dusting, uneven mixing, and lumping can often result. Lumping occurs when the initial contact of the dry additive with the water results in rapid hydration of the outer layer of the material, which creates a sticky, rubbery exterior layer that prevents the interior portions of the material from contacting the water. The result is the formation of "gel balls" or "fish eyes," which can encumber efficiency by lowering the viscosity achieved per pound of dry additive and also by creating insoluble particles that can restrict flow both into and out of the subterranean formations. Consequently, merely mixing the dry additive directly with water often does not generate a homogeneous fracturing fluid, which is one reason why liquid forms of the polymers (e.g., concentrates) are preferred.

Thus, there is still a need in the art for more effective systems and methods for hydrating dry additives used in the production of fracturing fluids.

U.S. Ser. No. 16/911,546

Polymers are important macromolecules used in everyday life. The structural characteristics that determine the functionality of a polymer can be divided into four classes. Beginning at the molecular level, a polymer's primary structure includes a backbone chain that can be linear or branched, and comprised of monomers in random, alternating, block, or graft structures. Secondary structural effects relate to intramolecular interactions based on ionic interactions, polar interactions, hydrogen bonding, and steric effects. Tertiary structural effects are from the intermolecular interaction with other polymer chains. Quaternary structural effects are determined by intermolecular interaction by multiple polymer chains.

Polymers are assembled from monomers during a polymerization reaction that includes that basic steps of initiation, propagation (polymer formation), and termination. Mechanisms of polymerization can be sorted into two categories: step-growth polymerization (polyaddition) and chaingrowth polymerization. Step-growth polymerization is a polymerization reaction in which polymer is formed by independent reactions, i.e., multifunctional monomers combining to form dimers and oligomers that eventually coalesce to form polymer chains. In many cases, no initiator is required for step-growth polymerization, polymerization begins when reactive monomers are present at the proper concentration and conditions. Termination of step-growth reactions occurs with the exhaustion of monomer concentration or the addition of a terminating agent, such as a monofunctional monomer that prevents subsequent chain extension. Examples of polymers generated by step-growth polymerization include polyester, polyamide, and polyether.

Chain-growth polymerization is the addition of one monomer at a time to the polymer chain. Polymerization begins with the addition of an initiator species, such as a radical, ion, or coordination catalyst that promotes the addition of monomers to a growing polymer chain. Unlike step-growth polymerization, chain-growth polymerization can involve chain transfer reactions during propagation in which the anion, radical, or coordination catalyst center transfer from a polymer chain end to another molecule or elsewhere on the polymer chain. For chain-growth polymerization, termination requires a terminator to quench the reactive species like the addition of a radical or radical scavenger, neutralization, or catalyst removal. Examples of chain-growth polymers include polyethylene, polyvinylchloride, polyacrylic acid, and polyacrylamide.

Synthesis of high molecular weight polymers can be difficult for many polymer types because step-growth and chain extension reactions begin to slow in frequency due to structural effects. Under standard polymerization conditions, polymer chains begin to fold and entangle, which reduces the availability of chain ends for addition by monomers and other reactive species. The reduction in chain extension is also accompanied by an increase in the concentration of lower molecular weight species and branching side reactions.

SUMMARY OF THE DISCLOSURE

U.S. Ser. No. 16/101,835

Embodiments of this disclosure provide fracturing fluid compositions including: (a) a base fluid, (b) a first buffer to adjust a pH of the base fluid to a target pH value, (c) a dry powdered hydratable polymer or a hydratable polymer slurry, (d) a cross-linking composition, and (e) an optional second buffer to increase the pH to a pH above pH 9 for cross-linking compositions that require a high final pH. The first buffer is adapted to lower the pH of the base fluid prior to adding the polymer or polymer slurry and the cross-linking composition to the base fluid, while the second buffer is adapted to raise the pH after the addition of the polymer or polymer slurry and the cross-linking composition to form a crosslinked or viscosified fracturing fluid.

In certain embodiments, the fracturing fluid compositions may not require addition of the second buffer as the fracturing fluid viscosifies at a final pH that is below a pH of 7. In such compositions, there may not be a requirement to achieve a final pH adjustment (after the addition of the polymer or polymer slurry and the cross-linking composition). In other embodiments, the crosslinked compositions are based on reduced polymer concentration levels (generally <10 ppt, even less than or equal to 8 ppt) to achieve a controlled viscosity level that will be an efficient and effective alternative to a slickwater treatment design.

Embodiments of this disclosure provide systems for using fracturing fluids of this disclosure, where the systems include: (1) a vessel containing a fracturing fluid including: (a) a base fluid, (b) a first buffer to adjust a pH of the base fluid to a target pH value, (c) a dry powdered hydratable polymer or a hydratable polymer slurry, (d) a cross-linking composition, and (e) an optional second buffer to increase the pH to a pH above pH 9, wherein the pH is lowered to prior to adding the slurry and the cross-linking composition, and the pH is raised after the addition of the slurry and the cross-linking composition to form a viscosified fracturing fluid; and (2) an injection assembly for injecting the fracturing fluid from the vessel into a formation under fracturing conditions to fracture the formation. In other embodiments of this disclosure, the systems include: (1) a vessel containing a fracturing fluid including: (a) a base fluid, (b) a first buffer to adjust a pH of the base fluid to a target pH value, (c) a hydratable polymer slurry, (d) a cross-linking composition or mixtures that do not require the pH to be elevated by an additional or a second pH buffer and (2) an injection assembly for injecting the fracturing fluid from the vessel into a formation under fracturing conditions to fracture the formation. Embodiments are disclosed for formulating both high and low final pH crosslinkable polymer fracturing fluids, wherein the fluids have a greatly reduced polymer loading allowing a reduced targeted lower viscosity to be achieved.

In other embodiments, the systems are based on using a crosslinked fracturing fluid having a final pH that is less than or equal to pH 7. In such systems, the fracturing fluid may not require a final pH adjustment (after the addition of the slurry and crosslinker). In yet other embodiments, the systems are based on using a crosslinked fracturing fluid composition having a reduced polymer concentration level, generally, <10 ppt to achieve a controlled viscosity level that will be an efficient and effective alternative to a slickwater treatment design. In other embodiments, the fracturing fluid includes a proppant. In other embodiments, the systems include a fracture fluid vessel and a proppant containing fluid vessel and the injection assembly sequentially injects the proppant free fracturing fluid followed by the proppant containing fluid under fracturing conditions.

Embodiments of this disclosure provide methods for forming fracturing fluids based on an aqueous base fluid, where the methods include: (a) adding a first buffer to the aqueous base fluid to lower a pH of the base fluid to form a low pH base fluid, (b) adding a hydratable polymer or hydratable polymer slurry to the low pH base fluid to form a hydratable polymer fracturing fluid, (c) adding a cross-linking composition to the hydratable polymer fracturing fluid to form a pre-cross-linked fracturing fluid, and (d) optionally adding a second buffer to the pre-cross-linked fracturing fluid to increase a pH of the pre-cross-linked fracturing fluid to form a viscosified fracturing fluid. In certain embodiments, the methods also include the step of adding a proppant to the fracturing fluid. In other embodiments, the methods include fracturing a formation with a fracturing fluid of this disclosure, where the methods further includes injecting the fracturing fluid with the proppant or injecting a proppant free fracturing fluid followed by injecting a proppant fluid.

Embodiments of this disclosure provide methods for fracturing a formation using an aqueous high TDS base fluid, where the methods include forming a fracturing fluid including: (a) adding a first buffer to the aqueous high TDS base fluid to lower a pH of the aqueous high TDS base fluid to form a low pH aqueous high TDS base fluid, (b) adding a hydratable polymer or hydratable polymer slurry to the low pH aqueous high TDS base fluid to form a hydratable polymer fracturing fluid, (c) adding a cross-linking composition to the hydratable polymer fracturing fluid to form a pre-cross-linked fracturing fluid, and (d) optionally adding a second buffer to the pre-cross-linked fracturing fluid to increase a pH of the pre-cross-linked fracturing fluid to form a viscosified fracturing fluid. The methods also include injecting the fluid into a formation under fracturing conditions sufficient to fracture the formation. In certain embodiments, the methods also include the step of adding a proppant to the fracturing fluid prior to the injecting step. In other embodiments, the methods include injecting a proppant free fracturing fluid into the formation followed by injecting a proppant containing fluid into the formation under fracturing conditions.

U.S. Ser. No. 16/900,084

Embodiments Listing

The present disclosure provides, among others, the following examples, each of which may be considered as optionally including any alternate example.

Clause 1. A method includes combining an aqueous fluid and an oleaginous fluid to prepare an invert emulsion comprising a polymerizable composition; degassing the invert emulsion under an extensional flow regime through an elongated passageway of an extender and thereby removing oxygen to produce a degassed invert emulsion, wherein a flow rate of the invert emulsion and a diameter of the elongated passageway are sufficient to achieve a Reynolds number of 20,000 or greater.

Clause 2. The method of clause 1, wherein preparing the invert emulsion and degassing the invert emulsion occur simultaneously.

Clause 3. The method of clause 1, wherein degassing is performed under inert gas.

Clause 4. The method of clause 1, wherein the diameter of the elongated passageway is 45 mm or less.

Clause 5. The method of clause 1, wherein the degassed invert emulsion comprises an oxygen concentration of 1 ppm or less.

Clause 6. The method of clause 1, wherein the invert emulsion comprises one or more emulsifiers selected from a group of polyethoxylated phenols, polyethoxylated sorbitans, polyethoxylated alcohols, and carboxylic acid esters.

Clause 7. The method of clause 1, wherein the extender is a first extender, the method further including transferring the degassed invert emulsion to a reactor that is fluidly connected with a second extender; initiating polymerization of the polymerizable composition in the degassed invert emulsion; transferring at least a portion of the degassed invert emulsion to the second extender at one or more time intervals and returning the portion of the degassed invert emulsion to the reactor, wherein a flow rate of the invert emulsion and a diameter of the elongated passageway are sufficient to achieve a Reynolds number of 20,000 or greater; and isolating a polymer product from the degassed invert emulsion.

Clause 8. The method of clause 7, further including terminating the polymerization with a polymerization terminator fed into the second extender.

Clause 9. The method of clause 7, wherein the second extender comprises an elongated passageway having a diameter of 45 mm or less.

Clause 10. The method of clause 7, wherein the polymer product has a weight average molecular weight of 10,000 g/mol to 50,000,000 g/mol.

Clause 11. The method of clause 7, wherein the polymer product has a branching index in a range of 0.95 to 1.0.

Clause 12. The method of clause 7, wherein the invert emulsion has a particle size according to ASTM G205-16 in a range of 50 Å to 100 Å.

Clause 13. The method of clause 7, wherein the polymerizable composition comprises one or more monomers selected from a group consisting of acrylamide, acrylic acid, 2-acrylamido-2-methylpropane sulfonic acid, diallyldimethylammonium chloride, cyclic lactams, and cyclic lactones.

Clause 14. The method of clause 7, further including: transferring the isolated polymer product to a third extender configured for vacuum distillation; removing a stream comprising at least one of water or solvent from the isolated polymer product to create a concentrated polymer stream.

Clause 15. A method, including charging a reactor with an invert emulsion comprising a polymerizable composition, the reactor fluidly connected with an extender; initiating polymerization of the polymerizable mixture in the reactor; transferring at least a portion of the invert emulsion to an extender at one or more time intervals and returning the portion of the degassed invert emulsion to the reactor; and isolating a polymer product from the degassed invert emulsion.

Clause 16. The method of clause 15, further comprising terminating the polymerization with a polymerization terminator fed into the extender.

Clause 17. The method of clause 15, wherein the reactor is a continuous feed reactor.

Clause 18. The method of clause 15, where the reactor is an inline mixed tube reactor.

Clause 19. A method, including combining an aqueous fluid with a nonaqueous fluid to form an invert emulsion comprising a polymerizable mixture under an extensional flow regime through an elongated passageway of a first extender, wherein a flow rate of the invert emulsion and a diameter of the elongated passageway are sufficient to achieve a Reynolds number of 20,000 or greater; degassing the invert emulsion under an extensional flow regime through an elongated passageway of a first extender in the presence of an inert gas to produce a degassed invert emulsion; transferring the degassed invert emulsion to a reactor that is fluidly connected with a second extender; initiating polymerization of the polymerizable mixture in the degassed invert emulsion within the reactor; transferring at least a portion of the degassed invert emulsion to the second extender at one or more time intervals and returning the portion of the degassed invert emulsion to the reactor; and isolating a polymer product from the degassed invert emulsion.

Clause 20. A polymer composition comprising a polymer prepared by the process of clause 19.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure.

The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

U.S. Ser. No. 16/911,546

Embodiments disclosed herein provide:

A. A method that includes flowing a hydrating liquid in an extensional flow regime through an elongated passageway of an extender, wherein a flow rate of the hydrating liquid and a diameter of the elongated passageway are sufficient to achieve a Reynolds number of 20,000 or greater, and adding a hydratable additive to the hydrating liquid in the elongated passageway to produce a mixture comprising the hydratable additive that is at least partially hydrated.

B. A hydratable additive concentrate comprising a hydratable additive that is at least substantially hydrated and a hydrating liquid, wherein the hydratable additive concentrate is a mixture produced according to a method comprising flowing a hydrating liquid in a extensional flow regime through an elongated passageway of an extender, wherein a flow rate of the hydrating liquid and a diameter of the elongated passageway are sufficient to achieve a Reynolds number of 20,000 or greater, and adding a hydratable additive to the hydrating liquid in the elongated passageway to produce a mixture comprising the hydratable additive that is at least partially hydrated.

C. A fracturing fluid that includes proppant, a dilution fluid, and a hydratable additive concentrate comprising a hydratable additive that is at least substantially hydrated and a hydrating liquid, the hydratable additive concentrate being produced by flowing a hydrating liquid in a extensional flow regime through an elongated passageway of an extender, wherein a flow rate of the hydrating liquid and a diameter of the elongated passageway are sufficient to achieve a Reynolds number of 20,000 or greater, and adding a hydratable additive to the hydrating liquid in the elongated passageway to produce a mixture comprising the hydratable additive that is at least partially hydrated.

D. A hydratable additive concentrate comprising a hydratable additive that is at least substantially hydrated and a hydrating liquid, wherein the hydratable additive concentrate has a % improvement in dynamic proppant transport capability (DPTC) that is greater than the % improvement in DPTC for a same mixture composition produced under traditional shear hydration as determined by a DPTC test that includes a shear history equivalent to 5 min at 4500 RPM.E.

E. A blending system that includes a mixing device that mixes a hydrating liquid and a hydratable additive to initiate hydration of the hydratable additive, the mixing device including an extender that receives the hydrating liquid and the hydratable additive, an elongated passageway defined by the extender and having a geometry that results in the hydrating liquid flowing therethrough in an extensional flow regime, wherein a flow rate of the hydrating liquid and a diameter of the elongated passageway are sufficient to achieve a Reynolds number of 20,000 or greater, and an additive inlet in fluid communication with the elongated passageway to introduce a hydratable additive into the elongated passageway, wherein adding the hydratable additive to the hydrating liquid in the elongated passageway produces a mixture comprising the hydratable additive that is at least partially hydrated.

F. A mixing device that includes an extender having a fluid inlet for receiving a hydrating liquid and an outlet for discharging a mixture of the hydrating liquid and a hydratable additive, an elongated passageway extending between the fluid inlet and the outlet and having a geometry that results in the hydrating liquid flowing therethrough in an extensional flow regime, wherein a flow rate of the hydrating liquid and a diameter of the elongated passageway are sufficient to achieve a Reynolds number of 20,000 or greater, and an additive inlet coupled to the extender to introduce the hydratable additive into the elongated passageway, wherein adding the hydratable additive to the hydrating liquid in the elongated passageway produces the mixture comprising the hydratable additive that is at least partially hydrated.

Each of embodiments A, B, C, D, E, and F may have one or more of the following additional elements in any combination: Element 1: further comprising prewetting the hydratable additive with a portion of the hydrating liquid before introduction of the hydratable additive to the elongated passageway, wherein a concentration of the hydratable additive being prewetted is at least 5 times higher than a concentration of the hydratable additive in the mixture. Element 2: further comprising conveying the mixture from the extender to a vessel, and subjecting the mixture to low shear mixing within the vessel. Element 3: wherein the hydratable additive is at least substantially hydrated within 5 minutes in the vessel. Element 4: further comprising conveying the mixture from the extender directly to a blender. Element 5: wherein the mixture has a viscosity within 50% of peak within 5 minutes of exiting the extender. Element 6: wherein the mixture has a viscosity within 50% of peak in less than 1 minute of exiting the extender. Element 7: wherein the mixture has a viscosity within 85% of peak in 2 minutes of exiting the extender. Element 8: wherein the flow rate of the hydrating liquid is at least 50 gallons per minute through the elongated passageway and the diameter of the elongated passageway is 45 mm or less. Element 9: wherein the hydratable additive is present in the mixture at 10 pounds to 300 pounds per 1000 gallons of the hydrating fluid. Element 10: further comprising mixing the mixture with proppant and a dilution fluid to form a fracturing fluid, injecting the fracturing fluid into a subterranean formation under conditions sufficient to create and/or extend at least one fracture in the subterranean formation, and placing the proppant in the at least one fracture. Element 11: wherein the hydratable additive is present in the fracturing fluid at 0.25 pound to 40 pounds per 1000 gallons of the hydrating fluid. Element 12: wherein the hydratable additive comprises a powder polymer having a water content of 10 wt % or less. Element 13: wherein the hydratable additive comprises a polymer suspended in a fluid. Element 14: wherein the hydratable additive comprises a polymer suspended in an emulsion. Element 15: wherein the polymer has a molecular weight of 10,000 g/mol to 50,000,000 g/mol Element 16: wherein the hydratable additive comprises a clay. Element 17: wherein the mixture has a % improvement in dynamic proppant transport capability (DPTC) that is greater than the % improvement in DPTC for a same mixture composition produced under traditional shear hydration as determined by a DPTC test that includes a shear history of 5 min at 4500 RPM.

Element 18: wherein the hydrating liquid comprises water or a solution comprising water. Element 19: wherein the hydratable additive is selected from the group consisting of a polymer, a synthetic polymer, a clay, a polymer suspended in an aqueous fluid, a polymer suspended in an emulsion, and any combination thereof. Element 20: wherein the hydratable additive comprises a polymer having a molecular weight of 10,000 g/mol to 50,000,000 g/mol. Element 21: further comprising an auger operable to feed the hydratable additive into the elongated passageway. Element 22: further comprising a wetting chamber that receives the hydratable additive and a portion of the hydrating liquid and pre-wets the hydratable additive before feeding the hydratable additive into the elongated passageway. Element 23: further comprising a hydration tank that receives the mixture from the mixing device. Element 24: wherein the hydration tank comprises a circular, cylindrical structure and the mixture is introduced into the hydration tank at an angle tangent to an inner sidewall of the hydration tank to induce swirl to the mixture as the mixture enters the hydration tank. Element 25: further comprising a pump arranged downstream from the hydration tank to pump the mixture from the hydration tank to downstream equipment. Element 26: wherein the mixture has a % improvement in dynamic proppant transport capability (DPTC) that is greater than the % improvement in DPTC for a same mixture composition produced under traditional shear hydration as determined by a DPTC test that includes a shear history equivalent to 5 min at 4500 RPM.

Element 27: wherein the additive inlet includes a first valve that regulates flow of the hydratable additive into the elongated passageway. Element 28: further comprising a second valve fluidly coupled to the additive inlet and operable to introduce a flushing fluid into the extender. Element 29: wherein the additive inlet includes a suction port that extends into the elongated passageway at an intermediate point between the fluid inlet and the outlet. Element 30: wherein the suction port is cylindrical and flares outward as it extends into the elongated passageway. Element 31: wherein a diameter of the elongated passageway increases at or near the suction port. Element 3.2: wherein a leading edge of the suction port extends further into the elongated passageway as compared to a trailing edge of the suction port. Element 33: wherein the fluid inlet provides a converging portion that transitions to the elongated passageway across an arcuate transition, and wherein the fluid inlet converts the hydratable liquid into a jet that enters the elongated passageway in the extensional flow regime. Element 34: wherein the mixture exhibits a viscosity within 50% of peak in less than 1 minute of exiting the extender. Element 35: wherein the mixture exhibits a viscosity within 85% of peak in 2 minutes of exiting the extender. Element 36: wherein the hydratable additive is selected from the group consisting of a polymer, a synthetic polymer, a clay, a polymer suspended in an aqueous fluid, a polymer suspended in an emulsion, and any combination thereof. Element 37: wherein the hydratable additive comprises a polymer having a molecular weight of 10,000 g/mol to 50,000,000 g/mol. Element 28: wherein the mixture has a % improvement in dynamic proppant transport capability (DPTC) that is greater than the % improvement in DPTC for a same mixture composition produced under traditional shear hydration as determined by a DPTC test that includes a shear history equivalent to 5 min at 4500 RPM.

By way of non-limiting example, exemplary combinations applicable to A, B, C, D, E, and F include: Element 2 with Element 3; Element 6 with any of Elements 1-5; Element 5 with Element 6; Element 5 with Element 7; Element 9 with any of Elements 1-8; Element 10 with any of Elements 1-9; Element 11 with any of Elements 1-10; Element 5 with Element 11; Element 12 with any of Elements 1-11; Element 13 with any of Elements 1-11; Element 14 with any of Elements 1-11; Element 15 with any of Elements 12-14; Element 16 with any of Elements 1-11; Element 17 with any of Elements 1-16; Element 23 with Element 24; Element 23 with Element 25; Element 27 with Element 28; Element 29 with Element 30; Element 30 with Element 31; and Element 29 with Element 32.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of anyone of the items, and/or at least one of any combination of the items, and/or at least one of each of the 25 items. By way of example, the phrases "at least one of A, B, and C" or "at least one of A, B, or C" each refer to only A, only B, or only C; any combination of A, B, and C; and/or at least one of each of A, B, and C.

BRIEF DESCRIPTION OF THE DRAWINGS OF THE DISCLOSURE

The disclosure may be better understood with reference to the following detailed description together with the appended illustrative drawings in which like elements are numbered the same:

U.S. Ser. No. 16/101,835

Figure 4:
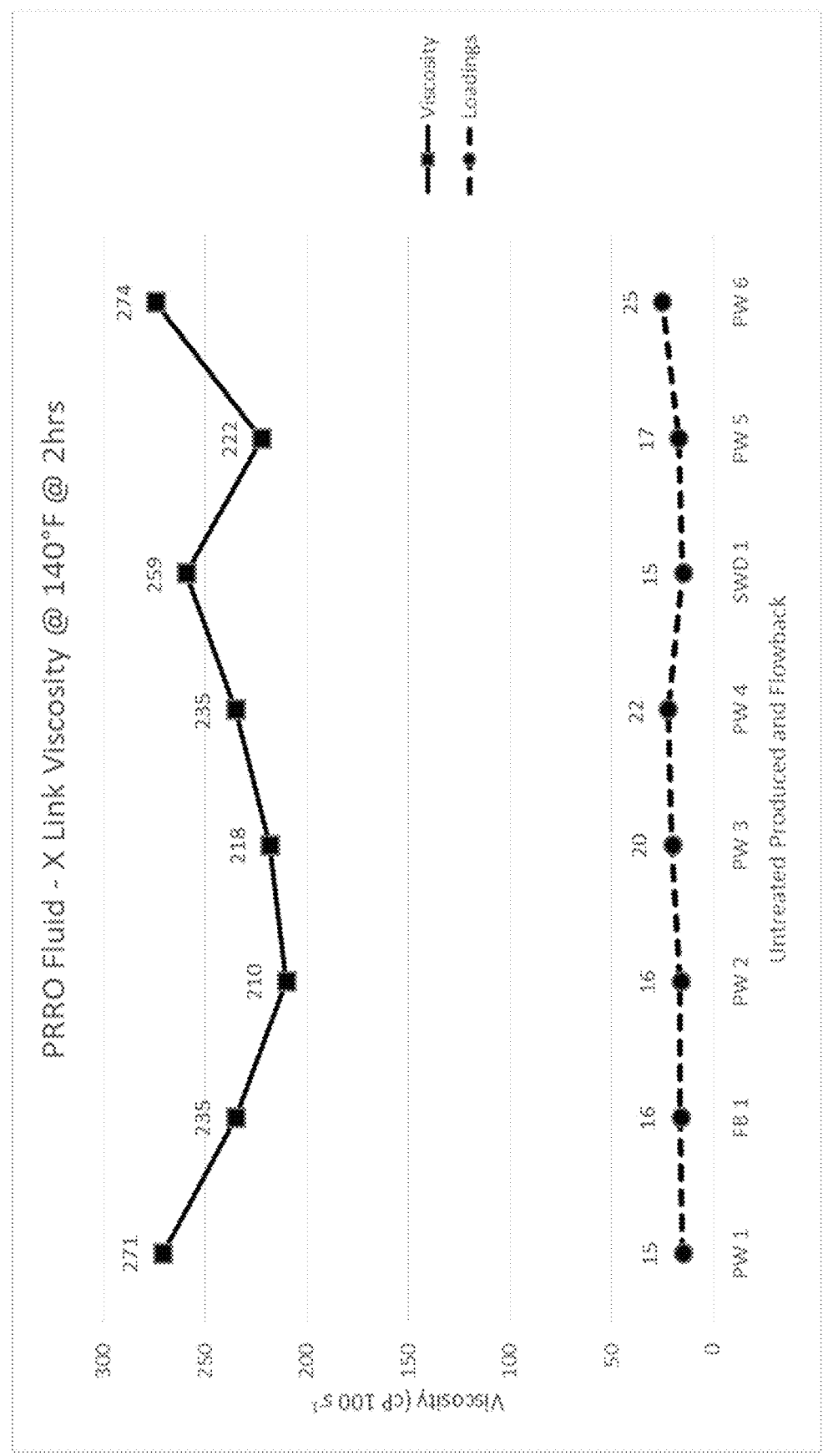

FIG. 4 depicts viscosities of a fracturing fluid of this disclosure using different waters, where PW1 is a first produced water, FBI is a flowback water, PW2 is a second produced water, PW3 is a third produced water, PW4 is a fourth produced water, SWD1 is a disposal salt water, PW5 is a fifth produced water, and PW6 is a sixth produced water and where the loading is in gpt (gallons per thousand gallons).

Figure 5:
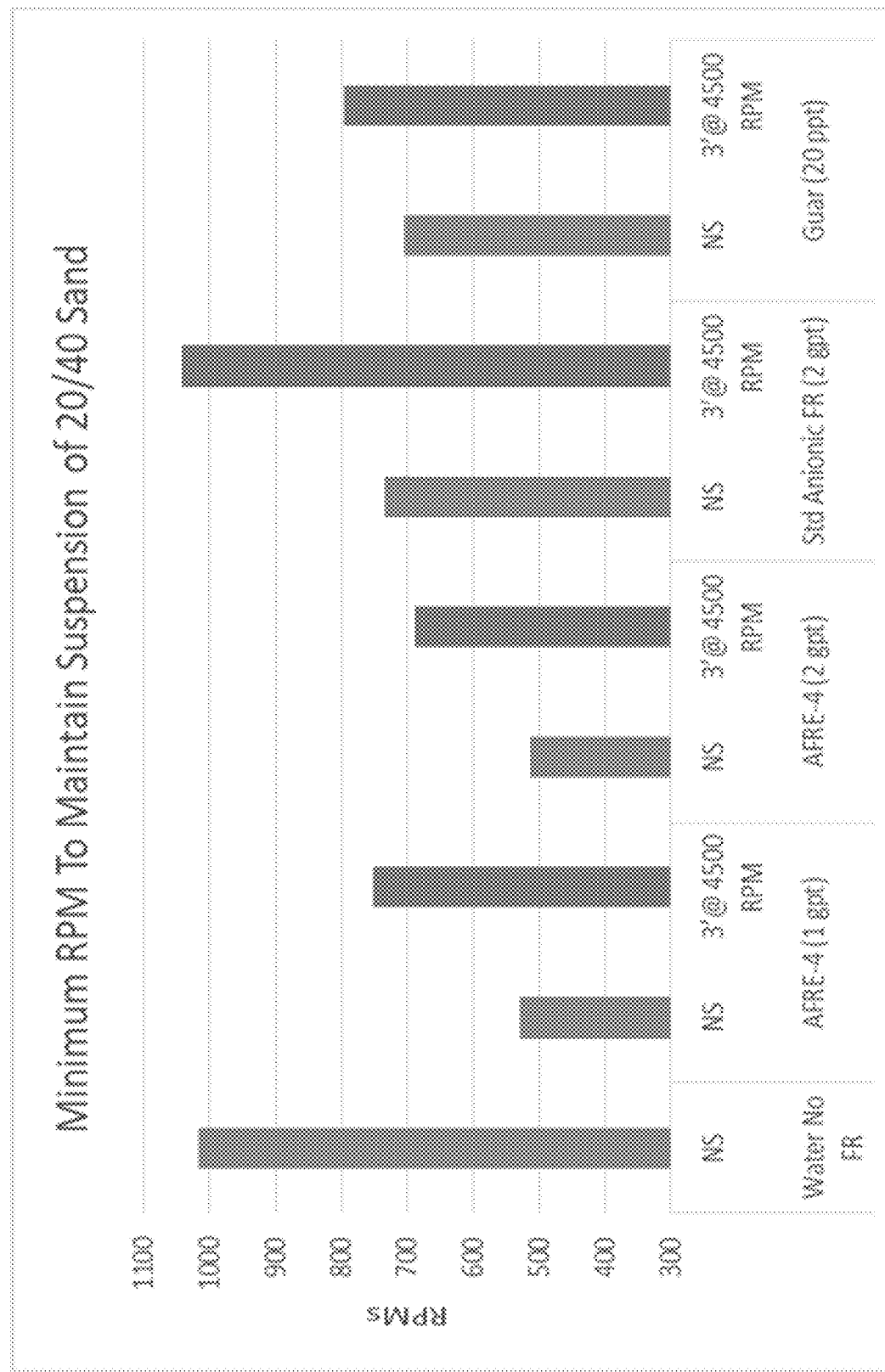

FIG. 5 depicts a plot of minimum rpm tests of fracturing fluids of this disclosure in high shear periods.

Figure 6:
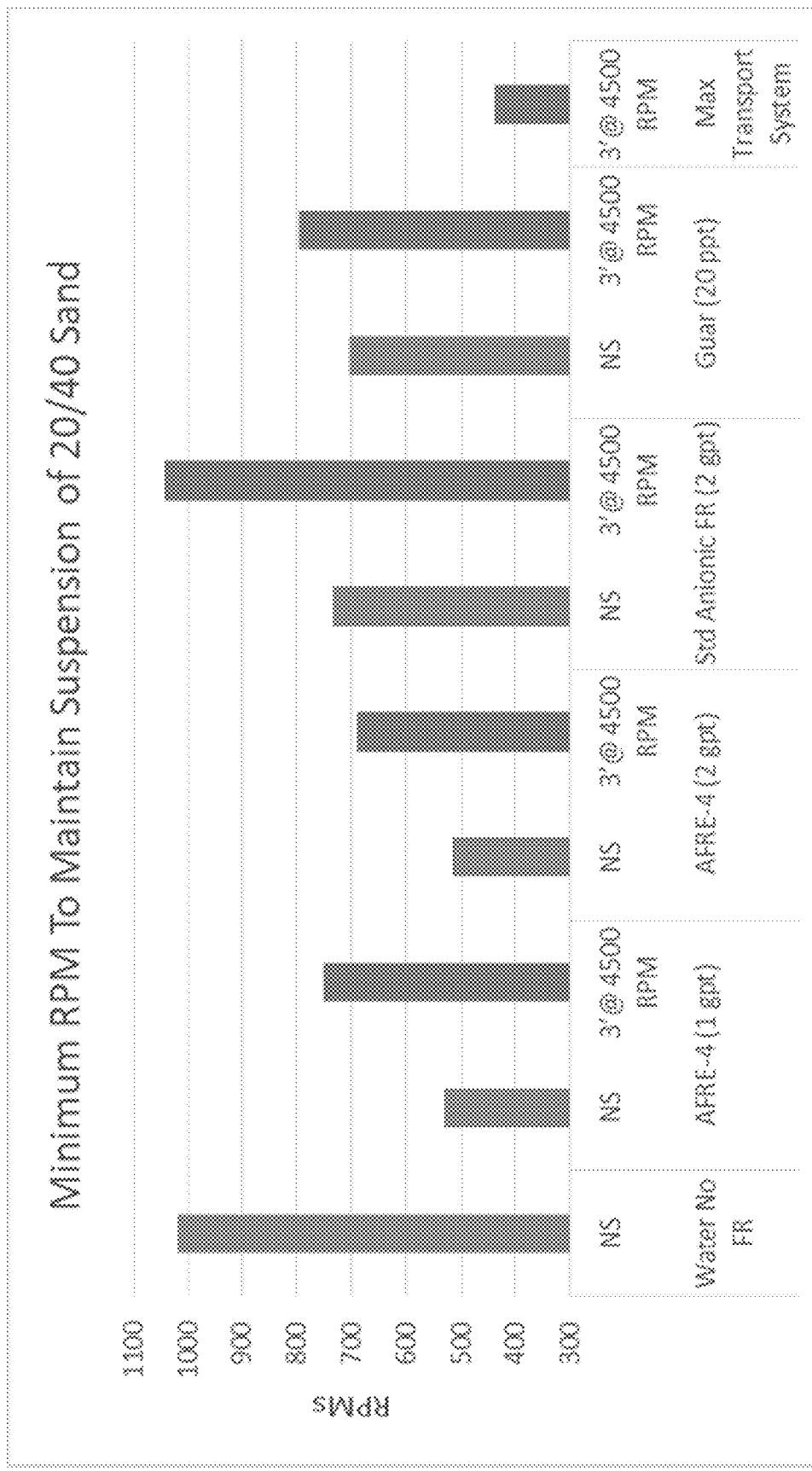

FIG. 6 depicts a plot of minimum rpm tests of fracturing fluids of this disclosure in high shear periods.

Figure 7:
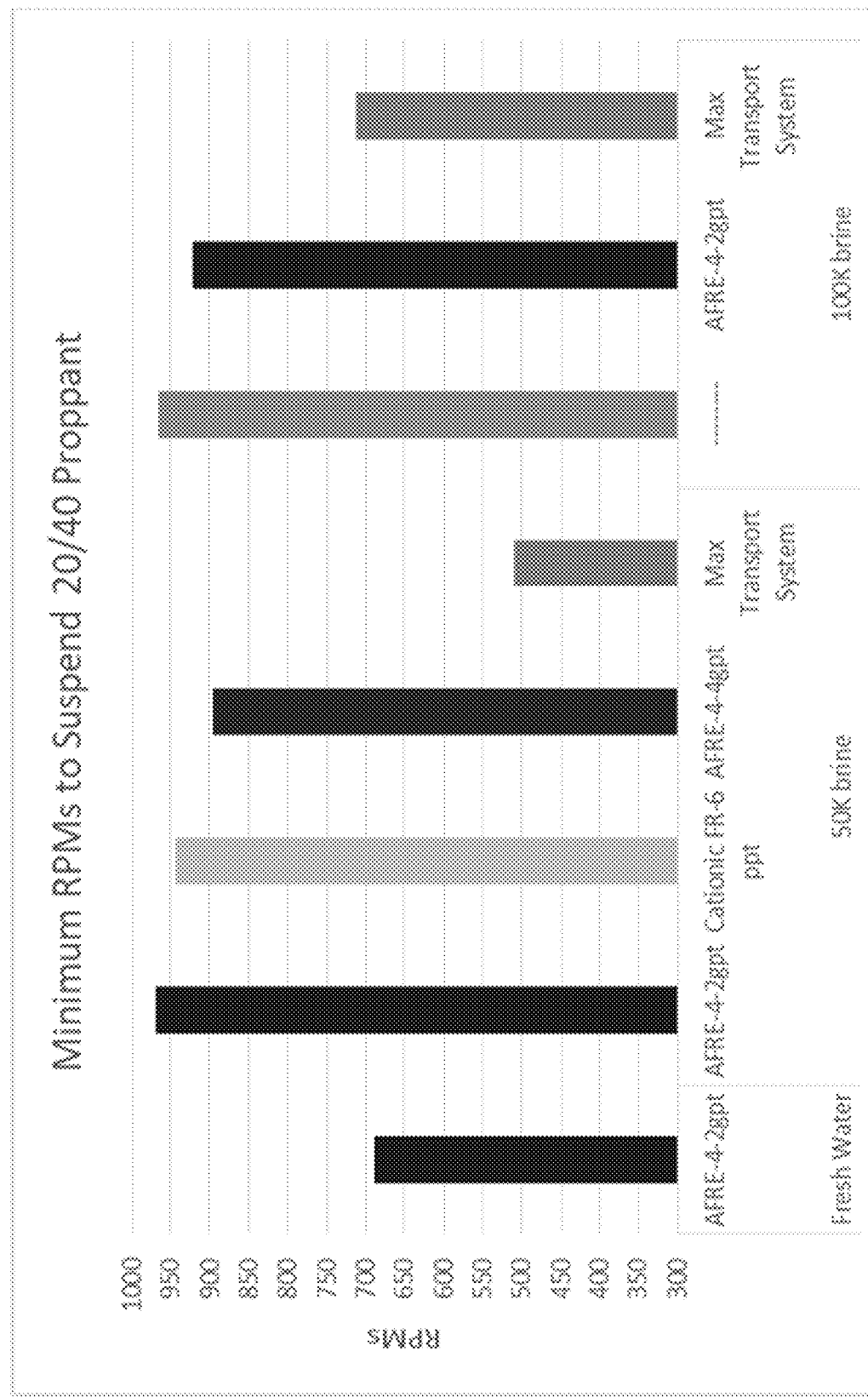

FIG. 7 depicts a plot of minimum rpm tests of fracturing fluids of this disclosure in high shear periods.

Figure 8:
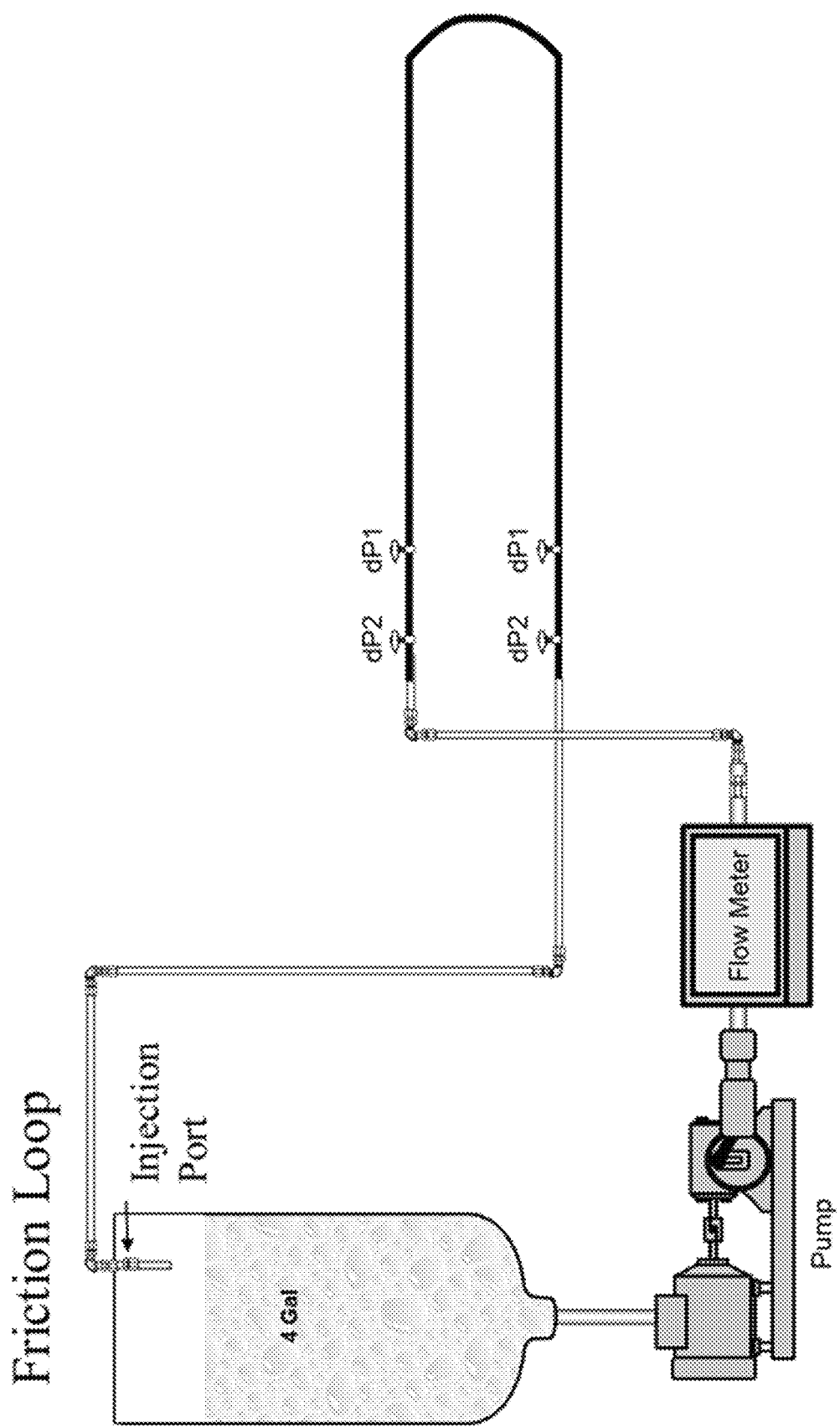

FIG. 8 depicts a testing system for testing the flow characteristics of the fluids.

Figure 9:
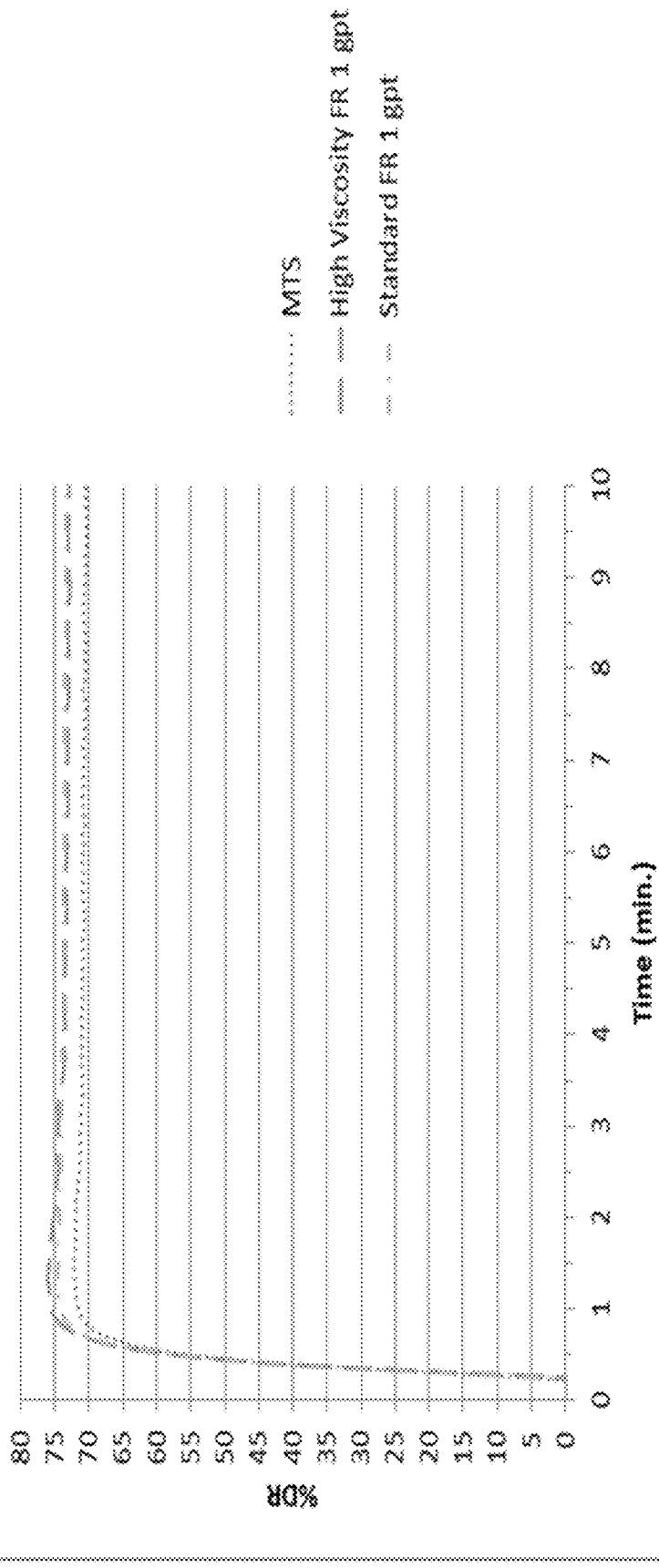

FIG. 9 depicts a comparison between the fracturing fluids of this disclosure and conventional fracturing fluids.

U.S. Ser. No. 16/900,084

Figure 10:
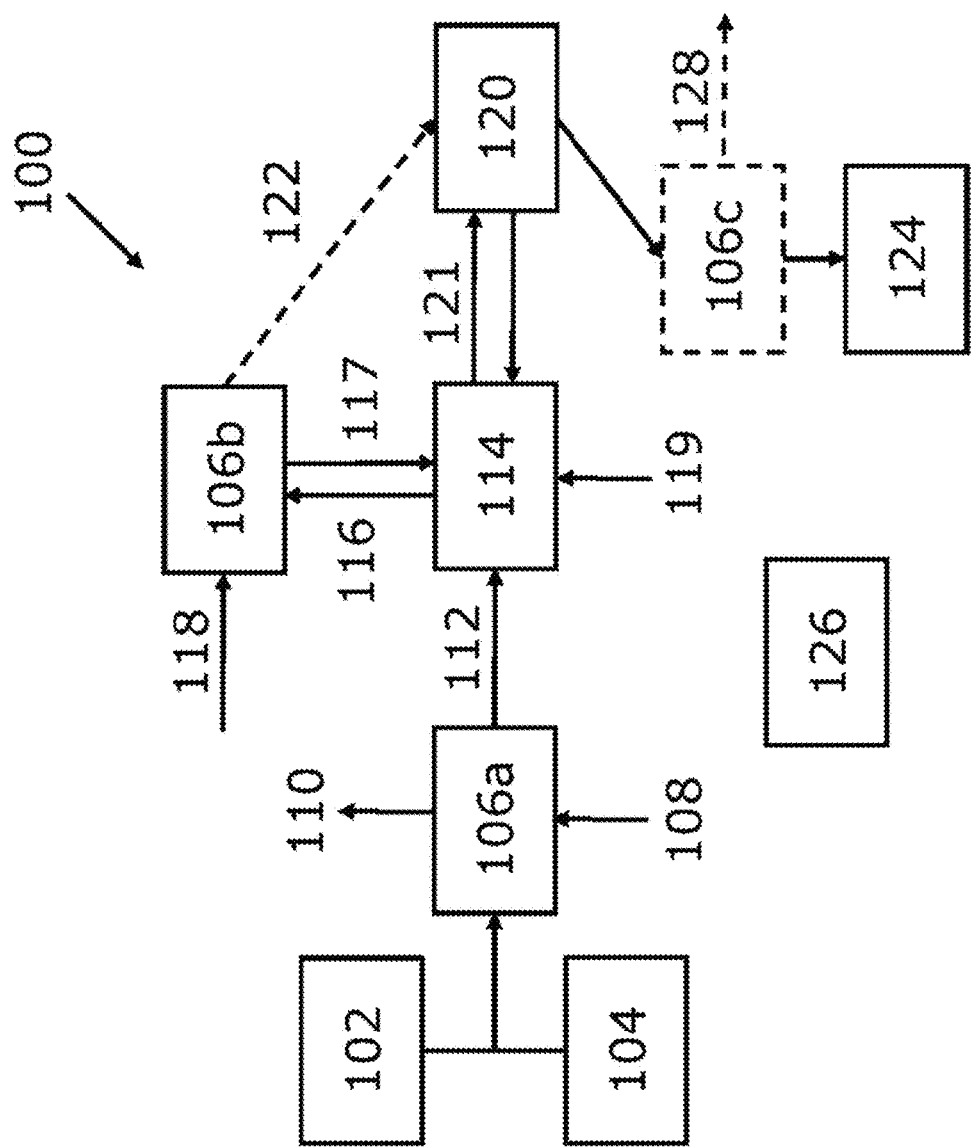

FIG. 10 is a schematic diagram of an example polymerization system that may incorporate one or more principles of the present disclosure.

Figure 11:
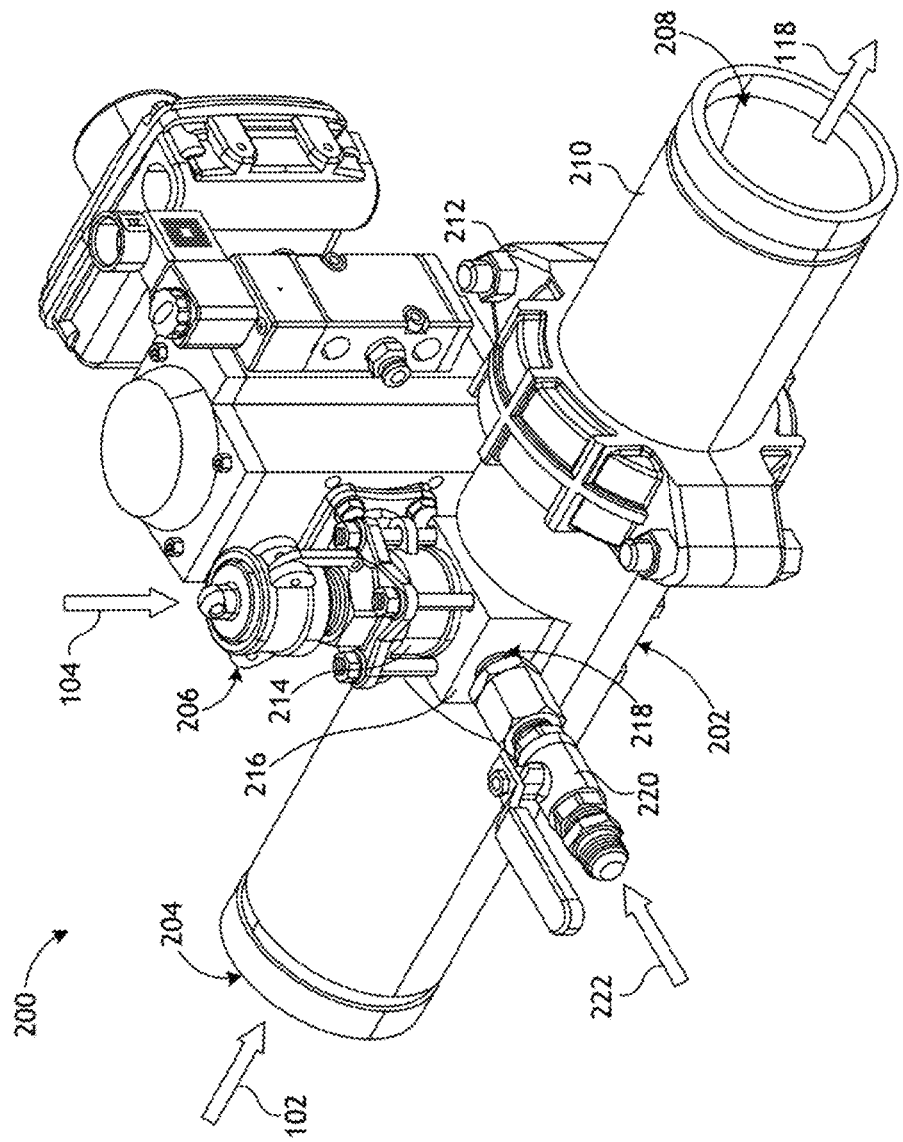

FIG. 11 is an isometric view of an example mixing device, according to one or more embodiments of the present disclosure.

Figure 12:
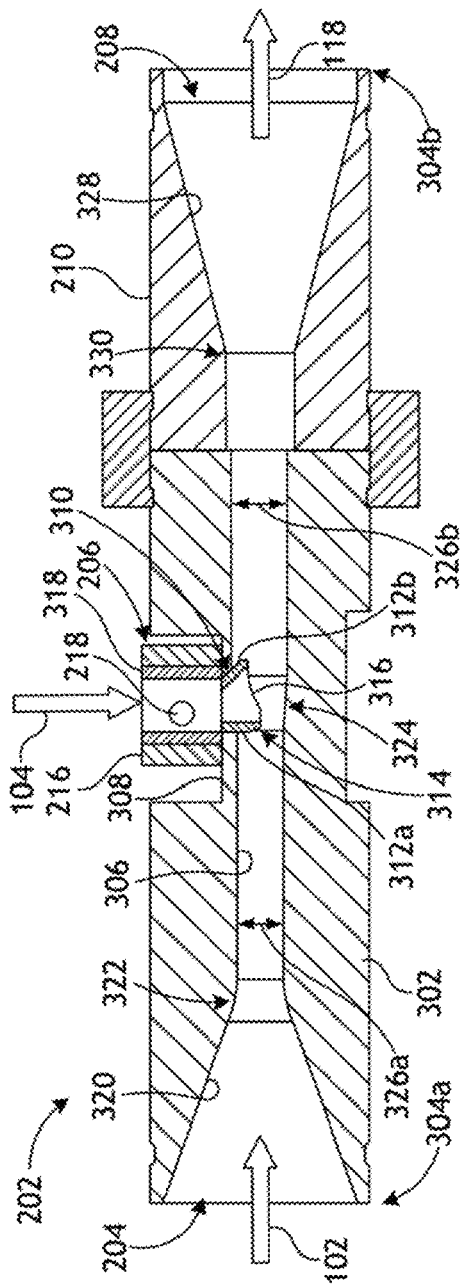

FIG. 12 is a cross-sectional side view of one embodiment of the extender of FIG. 11.

U.S. Ser. No. 16/911,546

Figure 13:
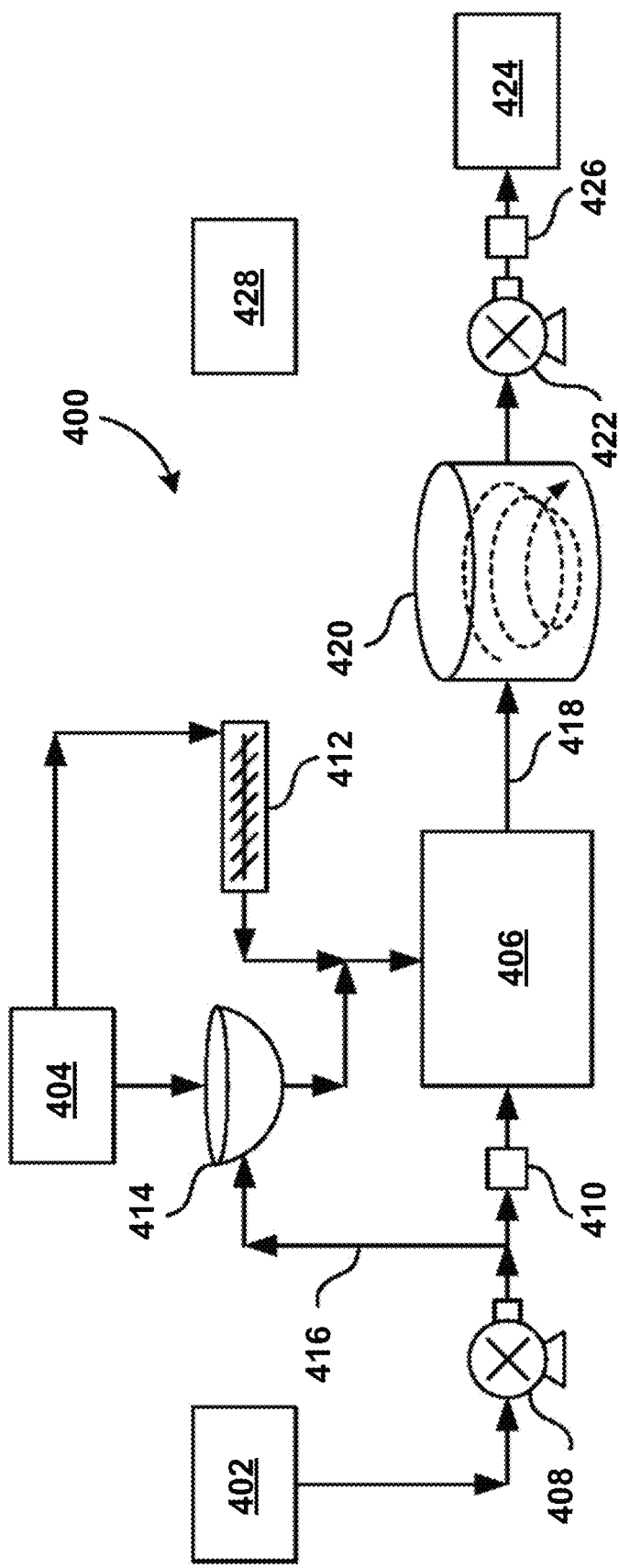

FIG. 13 is a schematic diagram of an example blending system that may incorporate one or more principles of the present disclosure.

Figure 14:
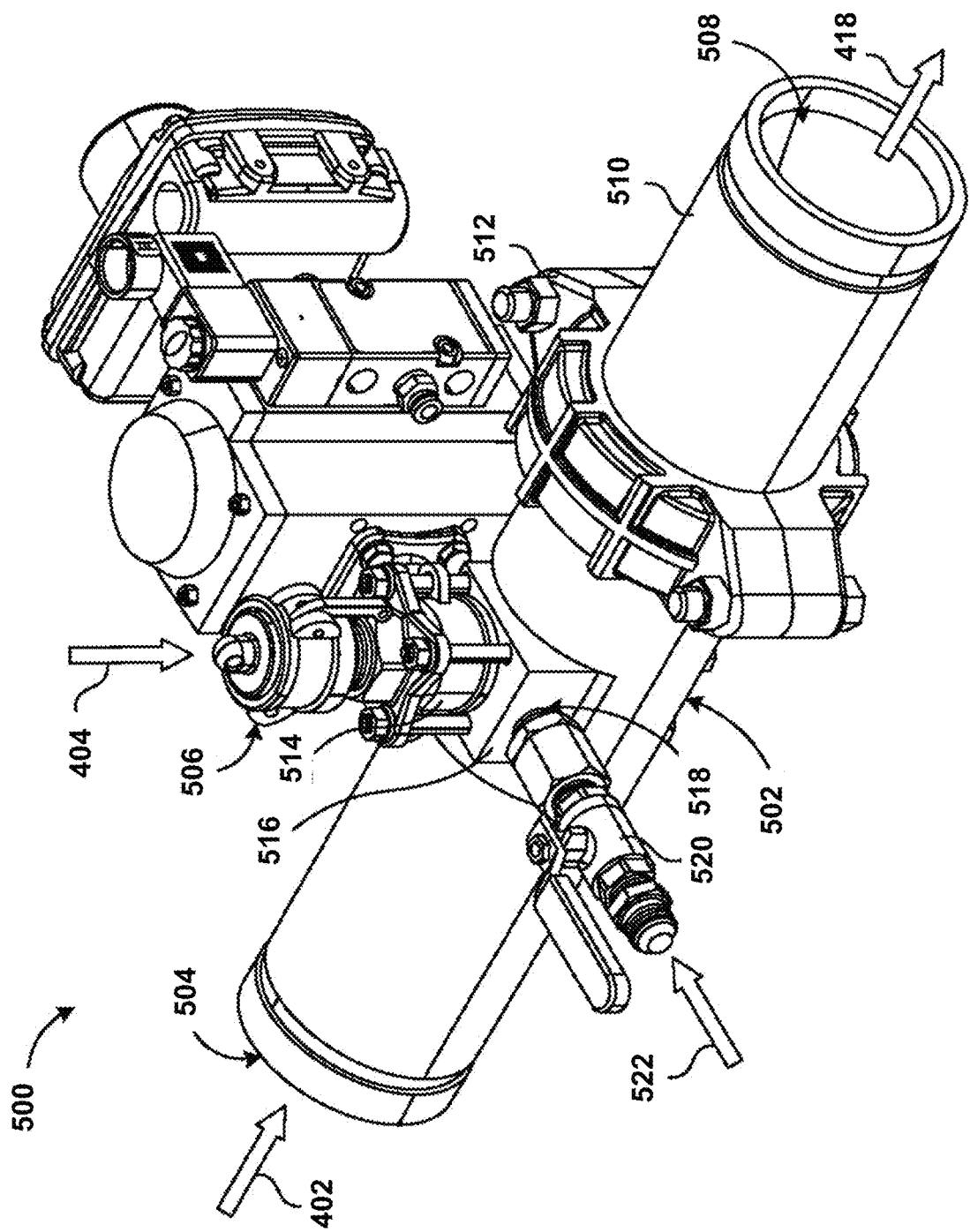

FIG. 14 is an isometric view of an example mixing device, according to one or more embodiments of the present disclosure.

Figure 15:
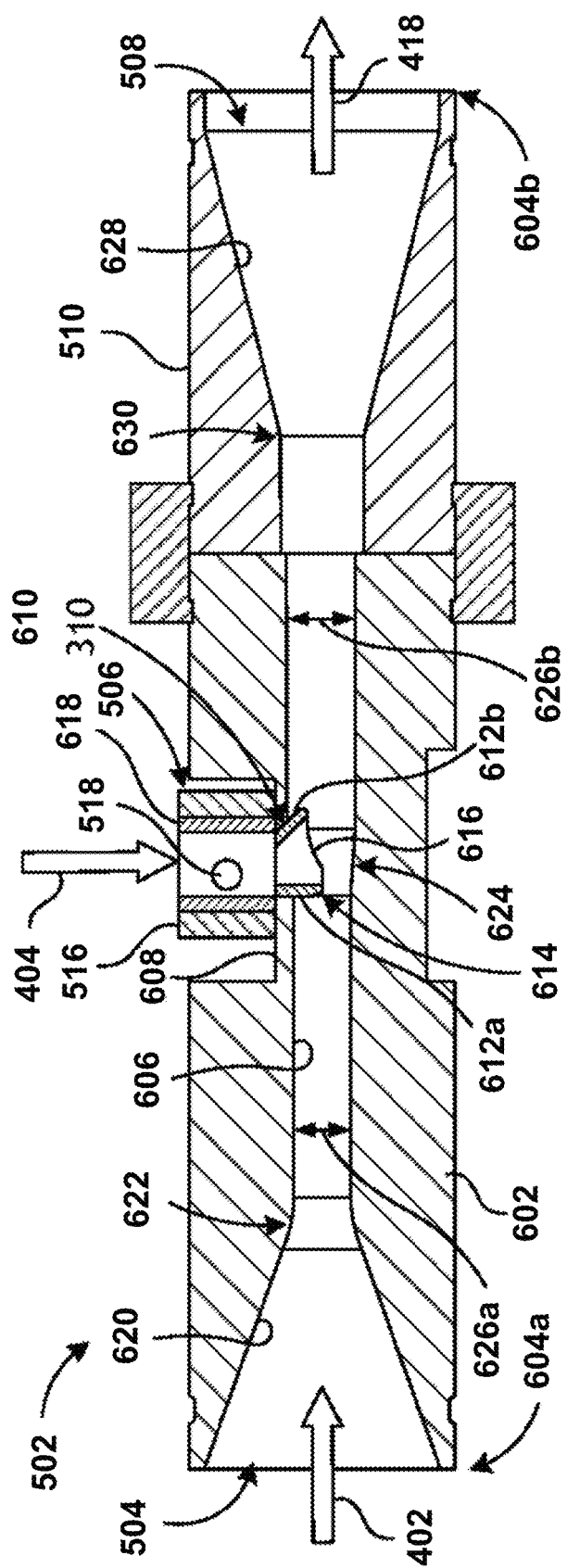

FIG. 15 is a cross-sectional side view of one embodiment of the extender of FIG. 14.

DEFINITIONS USED IN THE DISCLOSURE

U.S. Ser. No. 16/101,835

In addition to having their customary and usual meaning, the following definitions apply where the context permits in the specification and claims:

The term "at least one" means one or more or one or a plurality, additionally, these three terms may be used interchangeably within this application. For example, at least one device means one or more devices or one device and a plurality of devices.

The term "one or a plurality" means one item or a plurality of items.

The term "about" means that a value of a given quantity is within ±20% of the stated value. In other embodiments, the value is within ±15% of the stated value. In other embodiments, the value is within ±10% of the stated value. In other embodiments, the value is within ±7.5% of the stated value. In other embodiments, the value is within ±5% of the stated value. In other embodiments, the value is within ±2.5% of the stated value. In other embodiments, the value is within ±1% of the stated value.

The term "substantially" means that a value of a given quantity is within ±5% of the stated value. In other embodiments, the value is within ±2.5% of the stated value. In other embodiments, the value is within ±2% of the stated value. In other embodiments, the value is within ±1% of the stated value. In other embodiments, the value is within ±0.5% of the stated value. In other embodiments, the value is within ±0.1% of the stated value.

The term "gpt" means gallons per thousand gallons.

The term "gptg" means gallons per thousand gallons.

The term "pptg" or "ppt" means pounds per thousand gallons.

The term "wt. %" means weight percent.

The term "w/w" means weight per weight.

The term "ppm" means parts per million.

The term "cps" or "cP" means centipoise.

The term "rpm" means revolutions per minute.

The term "TDS" means total dissolved solids and means waters having from about 60 ppm to about 120,000 ppm total dissolved solids.

The term "RO" means reverse osmosis.

The term "FR" means friction reducer.

The term "fracturing" refers to the process and methods of breaking down a geological formation, i.e., the rock formation around a well bore, by pumping fluid at very high pressures, in order to increase production rates from a hydrocarbon reservoir. The fracturing methods of this disclosure use otherwise conventional techniques known in the art.

The term "under fracturing conditions" means injecting or pumping a fracturing fluid into a formation at a sufficient pressure, at a sufficient temperature (normally not an issue), and for a time sufficient to form fractures or fissures in the formation.

The term "proppant" refers to a granular substance suspended in the fracturing fluid during the fracturing operation, which serves to keep the formation from closing back down upon itself once the pressure is released. Proppants envisioned by the present disclosure include, but are not limited to, conventional proppants familiar to those skilled in the art such as sand, 20-40 mesh sand, resin-coated sand, sintered bauxite, glass beads, and similar materials.

Detailed Description of the Disclosure

U.S. Ser. No. 16/101,835

The inventors have found that compositions, systems, and methods for forming and using fracturing fluids, where the fracturing fluids are based on aqueous base fluids including high TDS produced water and/or flow back water and/or disposal water and/or mixtures of fresh water. The compositions, systems, and methods may be formulated and implemented, where the compositions, systems, and methods are based on adjusting a pH of the aqueous base fluids to a sufficiently low pH to form a low pH base fluid, adding a hydratable polymer or hydratable polymer slurry to the base fluid to form a fracturing fluid, adding a cross-linking composition to the fracturing fluid to form a pre-cross-linked fracturing fluid, and then optionally (if utilizing a high pH crosslinking system) adjusting the pH of the pre-crosslinked fracturing fluid to a pH above pH 9 to from a crosslinked fracturing fluid. In certain embodiments, the methods also include adding a proppant to the crosslinked fracturing fluid. In other embodiment, the methods may also include adding a breaking composition to the fracturing fluids to break the viscosity of the fracturing fluids.

The compositions, systems, and methods of this disclosure are designed to overcome the problems associated with using high TDS (total dissolved solids) waters including produced and/or flow back water and/or disposal water in fracturing fluids, which will allow the use and reuse of treated and untreated produced water with or without the addition of fresh water. The inventors have found that, contrary to existing knowledge and practices, cross-linked hydratable polymer based fracturing fluids may be produced using produced, flow back, and/or fracturing flow back water or mixtures of these waters and fresh water. In certain embodiments, the hydratable polymers are guar and/or guar derivatives and the cross-linking composition comprises a borate cross-linkers or combinations of borate crosslinkers or crosslinkers that are compatible with low pH approaches to crosslinking. To that end, we re-engineered the crosslinking process and designed buffers to handle the severity of high TDS fluids such as produced and/or flow back water and/or disposal water. One such process includes the following steps: (a) adding a first buffer to an aqueous base fluid including a high TDS water to lower a pH of the aqueous base fluid to form a low pH base fluid; (b) adding a hydratable polymer or hydratable polymer slurry to the base fluid to form a fracturing fluid; (c) adding a cross-linking composition to the fracturing fluid to form a precross-linked fracturing fluid, and optionally (if the crosslinked system being utilized requires high pH)(d) adding a second buffer to increase the pH of the pre-cross-linked fracturing fluid to form a crosslinked fracturing fluid.

In certain embodiments, the first buffer is added to the base fluid at a level sufficient to adjust a pH of the base fluid to an acidic pH. In certain embodiments, the acidic pH is less than or equal to pH 7. In other embodiments, the acidic pH is less than or equal to pH 6. In other embodiments, the acidic pH is less than or equal to pH 5. In other embodiments, the acidic pH is less than or equal to pH 4. The buffer may include an inorganic acid, an organic acid, or mixtures thereof. The first buffer is added until the pH is at an acidic level for example at or below pH 7, 6, 5, or 4. In certain embodiments, an amount of the added first buffer is between about 0.1 gpt and about 5 gpt depending on the initial pH of the base fluid.

In certain embodiments where a high pH is needed, a second buffer is added to the fracturing fluid after the polymer or the polymer slurry and the crosslinking composition have been added at a level sufficient to adjust a pH of the fracturing fluid to at or below pH 9. The second buffer may include an inorganic base, an organic base, or mixtures thereof. The second buffer is added until the pH is at or below pH 9. In certain embodiments, an amount of the added second buffer is between about 0.1 gpt and about 5 gpt depending on the initial pH of the fracturing fluid. As the pH of the fracturing fluid prior to addition of the second buffer is considerably below pH 9, cross-linking of the fracturing fluid does not start to occur until the pH of the fluid approaches pH 9 or greater. Thus, the compositions have a build in cross-link delay system, which is one of the unique features of the compositions, systems, and/or methods of this disclosure.

The compositions, systems and methods also provide systems that incorporate a crosslinked polymer approach based on a final pH that is below pH 7. In such systems, it may not be necessary to make a final pH adjustment (after the addition of the polymer or the polymer slurry and the crosslinking composition). Still other compositions, systems and methods will provide approaches in which the cross-linked compositions are based on reduced polymer concentration levels of <10 ppt to achieve a controlled viscosity that will result in the generation of the desired long narrow type fractures, but with superior proppant transport as compared to low viscosity slick water designs and therefore increased propped fracture length.

Embodiments of the present disclosure broadly relates to fracturing fluid compositions including: (a) a base fluid comprising an elevated total dissolved solids (TDS) water selected from the group consisting to produced, flow back water, brackish water, reverse osmosis (RO) reject water, clear brine, and mixtures and combinations thereof, (b) a first buffer, (c) a hydratable polymer or a hydratable polymer slurry, and (d) a cross-linking composition, wherein the first buffer is adapted to adjust a pH of the base fluid to an acidic pH prior to adding the hydratable polymer or the hydratable polymer slurry and the cross-linking composition to the base fluid to reduce or prevent pre-mature polymer crosslinking, and wherein the cross-linking composition crosslinks the hydratable polymer after hydration to form the fracturing fluid composition having a crosslinked structure. In certain embodiments, the compositions may also include (e) a second buffer to adjust the pH to a final pH sufficient to activate the crosslinking composition toe form the cross-linked structure in the composition. In other embodiments, the second buffer adjusts the pH to at or above 9. In other embodiments, the base fluid further includes fresh water. In other embodiments, the the hydratable polymer is selected from the group consisting of galactomannan gums, glucomannan gums, guars, derivatized guars, cellulose derivatives, synthetic polymers such as polyvinyl alcohol, polyacrylamides, poly-2-amino-2-methyl propane sulfonic acid, other synthetic polymers and copolymers, and mixtures or combinations thereof. In other embodiments, the hydratable polymer is a guar or derivatized guar and is in powder form when added to the composition or to the slurry. In other embodiments, the hydratable polymer is a mixture of a guar or derivatized guar and a polyacrylamide in which the polyacrylamide is present in an amount between 5 wt. % and 20 wt. % of the total polymer weight, and the polyacrylamide reduces a drag of the composition being pumped through a tubular downhole injection mechanism into a formation to be fracture and improves a shear stability of the crosslinked structure formed in the composition. In other embodiments, the hydratable polymer is present in an amount between about 0.05 wt. % and about 0.5 wt. % in the composition or if in a slurry form, the polymer is present in an amount between about 1 gpt and about 10 gpt in the slurry. In other embodiments, the amount is between about 0.05 wt. % and about 0.10 wt. % in the composition or between about 1 gpt and 2 gpt in the slurry. In other embodiments, the acidic pH is less than or equal to pH 7, or less than or equal to pH 6, or less than or equal to pH 5, or less than or equal to pH 4. In other embodiments, the crosslinking composition is capable of producing the crosslinked structure at the acidic pH. In other embodiments, the crosslinking composition comprises compounds including boron ions, zirconium ions, and titanium ions, or mixtures thereof. In other embodiments, the crosslinking composition comprises one or more borate compounds.

Embodiments of the present disclosure broadly relates to methods of fracturing a subterranean formation including pumping a fracturing fluid compositions including (a) a base fluid comprising an elevated total dissolved solids (TDS) water selected from the group consisting to produced, flow back water, brackish water, reverse osmosis (RO) reject water, clear brine, and mixtures and combinations thereof, (b) a first buffer, (c) a hydratable polymer or a hydratable polymer slurry, and (d) a cross-linking composition, wherein the first buffer is adapted to adjust a pH of the base fluid to an acidic pH prior to adding the hydratable polymer or the hydratable polymer slurry and the cross-linking composition so that the polymer may hydrate but not crosslink, and wherein the cross-linking composition crosslinks the hydratable polymer to form the fracturing fluid composition having a crosslinked structure. In certain embodiments, the composition used in the methods may also include a second buffer to adjust the pH to a final pH sufficient to activate the crosslinking composition. In other embodiments, the second buffer adjusts the pH to at or above 9. In other embodiments, the base fluid further includes fresh water. In other embodiments, the methods may further include adding a proppant to the fracturing fluid being pumped into the well. In other embodiments, the hydratable polymer can be taken from a group that includes galactomannan gums, glucomannan gums, guars, derivatized guars, cellulose derivatives, synthetic polymers such as polyvinyl alcohol, polyacrylamides, poly-2-amino-2-methyl propane sulfonic acid, and various other synthetic polymers and copolymers and mixtures or combinations thereof. In other embodiments, the hydratable polymer is a guar or derivatized guar and is in powder form when added to the composition or to the slurry. In other embodiments, the hydratable polymer is a mixture of a guar or derivatized guar and a polyacrylamide in which the polyacrylamide is present in an amount between 5 wt. % and 20 wt. % of the total polymer weight, and the polyacrylamide reduces a drag of the composition being pumped through a tubular downhole injection mechanism into a formation to be fracture and improves a shear stability of the crosslinked structure formed in the composition In other embodiments, the hydratable polymer is present in an amount between about 0.05 wt. % and about 0.5 wt. % in the composition or if in a slurry form, the polymer is present in an amount between about 1 gpt and about 10 gpt in the slurry. In other embodiments, the amount is between about 0.05 wt. % and about 0.10 wt. % in the composition or between about 1 gpt and 2 gpt in the slurry. In other embodiments, the acidic pH is less than or equal to pH 7, or less than or equal to pH 6, or less than or equal to pH 5, or less than or equal to pH 4. In other embodiments, the crosslinking composition is capable of producing the crosslinked structure at the acidic pH. In other embodiments, the crosslinking composition is comprised of metal ions including boron, zirconium, and titanium containing compounds, or mixtures thereof. In other embodiments, the crosslinking composition comprises one or more borate compounds.

U.S. Ser. No. 16/900,084

The present disclosure relates to process methods and systems in which one or more process stages incorporate an extender to enhance mixing action and place components in an extensional flow regime. In another aspect, systems and methods disclosed herein are applicable to polymerization processes, including emulsion polymerization, to generate polymers having defined molecular weight distributions and controllable branching. In yet another aspect, methods disclosed herein relate to methods of forming and degassing an emulsion in a single step.

Methods disclosed herein include the preparation of polymer compositions and the use of extenders to modify process conditions at one or more stages of polymerization. Extenders can be used to enhance rates of mixing, gas exchange, and polymerization, which can lead to better reaction initiation and completion. Polymerization under extensional flow conditions in an extender can also contribute to a number of structural changes, including increased overall weight average molecular weight and modifying the degree of polymer branching. During propagation, chain transfer side reactions can occur including intermolecular reactions between a polymer chain and other reactive species in solution such as monomers, initiators, solvent, and other polymer chains. As the polymer chain grows in length and begins folding upon itself, intramolecular chain transfer can also occur. Mitigation of chain transfer often involves kinetic control by reducing temperature and reaction rates. In addition to kinetic controls, methods disclosed herein can incorporate an extender during polymerization that reduces intramolecular chain transfer reactions by stretching polymer chains into a linear configuration that prevents backbiting chain transfer reactions, while also exposing reactive end sites for chain extension.

Polymerization processes disclosed herein can be adapted to a number of systems including aqueous polymerization, inverse emulsion (water in oil, or w/o) polymerization, inverse microemulsion polymerization, and precipitation polymerization. Emulsion polymerization techniques include a number of advantages, such as high solids concentrations, lower solution viscosities, increased heat removal, and easier mixing. The better the thermodynamic stability of the emulsion, the less separation of phases over time. Emulsion stability is dependent on a number of factors that include the presence of emulsifiers and the nature of the monomer(s) and other additives. As emulsification improves through mixing and/or the use of emulsifiers to enhance emulsion stability, microemulsions can form in which the internal phase has a low particle size, in the range of 50 Å to 100 Å. Reduced internal phase particle size is also associated with increased rates of polymerization, which can be increased by 10-200 times in some systems. Industrially, emulsions are prepared by mixing the oil and aqueous phases through high shear pumps or mixing systems, which are costly in terms of equipment, energy, and time expenditures.

Degassing to remove oxygen is another important consideration for polymerization processes. Oxygen is a known inhibitor of many polymerization initiators, and reactant mixtures are often degassed in the presence of an inert gas (or mixture) to remove or reduce the concentration of oxygen prior to initiation. In some processes, oxygen levels can be reduced to 1 part per million (ppm) or less. Several parameters affect the rate of degassing including oxygen solubility, liquid temperature, and inert gas injection methodology. Of these factors, solubility is dependent on the reactant liquids used, and temperature is often constrained by the initiator temperature. At scale, degassing is often employed following emulsification, which can increase costs and time, and limit overall production when done separately.

Methods in accordance with the present disclosure can incorporate an extender at one or more stages. Broadly, extenders disclosed herein promote mixing between different phases (including gas/liquid phases and liquid/liquid phases) by placing components into extensional flow. Without being limited by theory, it is believed there are three flow regimes/mechanisms by which compositions can mix. The first is laminar flow where the only mixing that takes places is between two adjacent layers by diffusion. This diffusion is a slow process and controlled by diffusional coefficient. The second is turbulent flow where two mechanisms are present: diffusion and convective (convection) mixing. Convective mixing is the primary mechanism by which mixing and dissolution takes place. In a turbulent regime flow, not only convective mixing takes place, but also diffusion mixing between the layers but with an order of magnitude difference between the two. The third is extensional flow, which has three mechanisms of mixing: diffusion, convective mixing (very little), and polymer stretching. Because of the high flow rate and small diameter flow path needed to achieve extensional flow, the polymer chains are stretched, which can influence polymerization rates and chain extension characteristics.

Extenders disclosed herein can provide a number of advantages, including enhanced oxygen removal rates during degassing, simultaneous degassing and emulsion preparation, increased component mixture during polymerization, and increased reaction efficiency under extensional flow conditions by increasing polymer stretching and reaction site accessibility. In embodiments directed to emulsion polymerization methods, one or more extenders can be used for simultaneous emulsion preparation and degassing in a single step, followed by polymerization in which a polymerizing mixture is processed through one or more extenders under extensional flow.

Extenders disclosed herein can include a design incorporating an elongated passageway in which fluids and/or gases are pumped at high flow rates to achieve an extensional flow regime for various processes including degassing and emulsion polymerization. As used herein, the term "extensional flow regime" refers to a flow regime characterized by high momentum diffusion, low momentum convection, and polymer stretching. The extensional flow regime is achieved by the synergistic combination of (a) a high flow rate through the elongated passageway of the extender and (b) a size and shape of the elongated passageway to achieve a Reynolds number (e.g., 20,000 or greater) through the passageway with little to no turbulence or eddies. Such flow rates with viscous fluids are often associated with turbulent flow and the production of eddies. In contrast, the inlet, elongated passageway, and outlet of the extender are designed to achieve little to no turbulence or eddies at high flow rates.

In the context of polymer systems, turbulent flow regimes can impart significant force on polymer chains, which can increase the occurrence of chain scission reactions along the polymer backbone. Chain scission reactions convert longer polymer chains to shorter species, which can change the overall molecular weight and structure of a polymer composition. In some cases, turbulent conditions (such as those resulting from the use of high shear mixers, for example) shift the weight average molecular weight lower and broaden the molecular weight distribution as a fraction of the large chains are sheared and converted to smaller polymers. In contrast, extensional flow regimes carry the benefits of enhanced mixing, while preserving chain length and overall polymer characteristics.

In some embodiments, the elongated passageway of the extender may be designed without, or otherwise not including, any moving parts that might inadvertently cause shear. Without being bound by theory or mechanism, it is believed that, when incorporated into a polymerization process, processing polymerizing compositions under extensional flow increases the elongation and unfolding of forming polymer chains, which can modify polymerization rates and properties such as molecular weight and branching index. The extender design then changes to maintain extensional flow but at a lower flow rate than in elongated passageway so that the fluid exiting the extender can be further processed without inducing high shear degradation of polymerized species in the obtained product mixture.

One or more of the presently disclosed methods can include flowing compositions for degassing, emulsification, and/or polymerization in an extensional flow regime where the flow rate and dimensions of the elongated passageway are chosen to achieve a Reynolds number for the composition passing through the elongated passageway of 20,000 or greater (e.g., 50,000, 75,000, 100,000 to 800,000, or 250,000 to 750,000, or 400,000 to 600,000). The flow rate and dimensions of the elongated passageway can be any suitable values to achieve said Reynolds number.

By way of nonlimiting example, the volumetric flow rate through the elongated passageway may be at least 50 gallons per minute (gpm)(0.19 m/min)(e.g., 50 gpm to 200 gpm (0.76 m3/min), or 75 gpm (0.28 m$^3$/min) to 175 gpm (0.66 m$^3$/min), or 100 gpm (0.38 m$^3$/min) to 150 gpm (0.57 m$^3$/min)). By way of another nonlimiting example, the diameter of the elongated passageway at its narrowest may be 45 mm or less (e.g., 10 mm to 45 mm, or 10 mm to 30 mm, or 15 mm to 20 mm). By way of yet another nonlimiting example, with a volumetric flow rate of 115 gpm through the elongated passageway, and a diameter of the elongated passageway at its narrowest of 19 mm yields a Reynolds number of about 500,000. While a number of extender design parameters are presented, it is also envisioned that design parameters, such as flow rate and internal extender dimensions, can be adjusted depending on handling capacity, reagent properties and rheology, product volume, system design, and other operational requirements.

U.S. Ser. No. 16/911,546

The present disclosure is related to hydraulic fracturing fluids and, more particularly, to improved systems and methods of hydrating additives, especially dry additives, for use in hydraulic fracturing fluids.

The systems and methods disclosed herein are primarily applicable to hydratable additives like high molecular weight polymers that are included in fracturing fluids used in the oil and gas industry for hydraulic fracturing operations. However, those skilled in the art will readily appreciate that the principles disclosed herein are equally applicable to other industries including, but not limited to, food production, fertilizer production, paint production, and the like.

The oil and gas industry has recently begun to utilize and incorporate high-viscosity friction reducers (HVFR) in hydraulic fracturing fluids to improve fluid viscosity and proppant transport. Embodiments discussed herein describe improved systems and methods of hydrating additives, especially dry additives, to obtain an HVFR with preferred (enhanced) fluid properties, in particular, dynamic proppant transport. Dynamic transport tests on HVFRs resulting from the hydration techniques described herein have demonstrated effective and improved transport of proppant through surface equipment, the potential to locate higher proppant concentrations within formation fractures, and the creation of increased packed fracture lengths in subterranean formations. Improved proppant transport properties opens up the possibility that a desired fracture design (e.g., propped fracture length) can be achieved at reduced injection rates, which may result in less wear and tear on surface pumping equipment and improved ability to contain created fractures within targeted areas.

Without being limited by theory, it is believed that there are three flow regimes/mechanisms by which polymers can mix with and be hydrated by a hydrating liquid. The first is laminar flow where the only mixing that takes places is between two adjacent layers by diffusion. This diffusion is a slow process and controlled by diffusional coefficient. The second is turbulent flow where two mechanisms are present: diffusion and convective (convection) mixing. Convective mixing is the primary mechanism by which mixing and dissolution takes place. In a turbulent regime flow, not only convective mixing takes place, but also diffusion mixing between the layers but with an order of magnitude difference between the two.

The third is extensional flow, which has three mechanisms of mixing: diffusion, convective mixing (very little), and polymer stretching. Because of the high flow rate and small diameter flow path needed to achieve extensional flow, the polymers are immediately stretched when exposed to a hydrating liquid, which allows for flash hydration of the polymer. This ability to flash hydrate is the result of the combination of the polymer stretching, high energy in the form of fluid velocity but with a substantial absence (preferably complete absence) of turbulence and therefore maximizes structure development of the polymer.

Equipment capable of creating an extensional flow condition will allow the hydratable polymer to maximize viscosity and structure development while minimizing the polymer structure's susceptibility to shear degradation.

Methods of the present disclosure utilize an extender in mixing (blending) a hydrating liquid and a hydratable additive. The extender has a design that causes the hydrating liquid to flow through an elongated passageway at a high flow rate to achieve an extensional flow regime at which point the hydratable additive is added to the hydrating liquid. As used herein, the term "extensional flow regime" refers to a flow regime characterized by high momentum diffusion, low momentum convection, and polymer stretching. The extensional flow regime is achieved by the synergistic combination of (a) a high flow rate through the elongated passageway of the extender and (b) a size and shape of the elongated passageway to achieve a Reynolds number (e.g., 20,000 or greater) through the passageway with little to no turbulence or eddies. Such flow rates with viscous fluids are associate with turbulent flow, which produces significant eddies. In contrast, the inlet, elongated passageway, and outlet of the extender are designed to achieve little to no turbulence or eddies as high flow rates.

In some embodiments, the elongated passageway may be designed without or otherwise not including any moving parts that might inadvertently cause shear. Without being bound by theory or mechanism, it is believed that contacting a hydratable additive like a polymer and hydrating liquid in such a manner causes the individual polymer molecules to be wetted and then begin structure development. The smooth, extensional flow regime helps achieve elongation and unfolding of the polymer structure with a minimum of damage (e.g., shortening of the polymer chain) that hydrates more readily.

The extender design then changes to maintain extensional flow but at a lower flow rate than in elongated passageway so that the fluid exiting the extender can be further processed without inducing high shear degradation. Upon leaving the extender, the hydratable-additive will be at least partially hydrated and its structure development will have commenced, if not having already been substantially completed. If needed, further processing can include further mixing of the fluid under low shear conditions (±400 sec$^{-1}$) to substantially or fully develop the hydrated structure of the hydratable additive (e.g., achieving 85% to 100% of peak viscosity). Because the polymer structure is elongated and unfolded by the mixing and flow conditions in the extender, the time for such further processing and hydration is minimized.

Unless otherwise specified, viscosity is measured using a commercially-available viscometer, such as an Ofite 900 Viscometer. Hydration rate data related to viscosity can be obtained by comparing samples prepared using the extender designs described herein and connected to a conventional hydration tank with samples that are hydrated for the same amount of time but using a lab mixer. In one example, the total amount of mixing time for each sample was 13 seconds before being placed on the viscometer to record the viscosity build-up. In this example, the viscometer was an Ofite 900 Viscometer which was used to record a 300 RPM reading (511 sec$^{-1}$) at 80.F. Readings were taken at 30 seconds, 1, 2, 3, and 5 minutes. Tests were run at a polymer loading of 24 ppt (same polymer was used in both tests). The results are shown below in Table 1:

As used herein, the term "peak viscosity" refers to 5 the viscosity of a sample when the viscosity is changing by less than 5% over 30 minutes with continuous low shear mixing. A viscosity ($\eta_m$ with X % of the peak viscosity ($\eta_p$) is calculated as $100-((\eta_p-\eta_m/\eta_p*100)\geq X$. As used herein, the term "substantially hydrated" refers to a viscosity within 85% of peak viscosity.

Again, without being bound by theory or mechanism, it is believed that by having the hydratable additive substantially to fully hydrated before being introduced to high shear conditions common to mixing in downstream equipment and passing through tubulars, damage to the polymer structure from the high shear conditions may be lessened or avoided. As will be appreciated, this improves shear resistance of the resultant fluid and, when used in fracturing operations, improves dynamic proppant transport capability.

One or more of the presently disclosed methods can include flowing a hydrating liquid in a extensional flow regime where the flow rate and dimensions of the elongated passageway are chosen to achieve a Reynolds number for the hydrating fluid passing through the elongated passageway of 20,000 or greater (e.g., 50,000, 75,000, 100,000 to 800,000, or 250,000 to 750,000, or 400,000 to 600,000). A hydratable additive may then be added to the hydrating liquid in the elongated passageway, such that the hydratable additive becomes at least partially elongated while passing through the elongate passageway, and thereby producing a mixture comprising an at least partially hydrated hydratable additive. The flow rate and dimension of the elongated passageway can be any suitable values to achieve said Reynolds number. By way of nonlimiting example, the volumetric flow rate of the hydrating fluid through the elongated passageway may be at least 50 gallons per minute (gpm) (0.19 m$^3$/min) (e.g., 50 gpm to 200 gpm (0.76 m/Min), or 75 gpm (0.28 m$^3$/min) to 175 gpm (0.66 m$^3$/min), or 100 gpm (0.38 m/min) to 150 gpm (0.57 ma/min)). By way of another non-limiting example, the diameter of the elongated passageway at its narrowest may be 45 mm or less (e.g., 10 mm to 45 mm, or 10 mm to 30 mm, or 15 mm to 20 mm). By way of yet another 5 nonlimiting example, using water as the hydrating fluid, with a volumetric flow rate of 115 gpm through the elongated passageway, and a diameter of the elongated passageway at its narrowest of 19 mm yields a Reynolds number of about 500,000.

The viscosity of the mixture within 5 minutes (e.g., 10 seconds to 5 10 minutes, or 30 seconds to 2 minutes, or 1 minute to 3 minutes, or 2 minutes to 5 minutes) of exiting the elongated passageway may be within 50% of the peak viscosity (e.g., within 50% to 100%, or 50% to 75%, or 60% to 80%, or 75% to 90%, or 80% to 95%, or 80% to 100% of the peak viscosity). As provided in Table 1 above, using the extender described herein can result in reaching 50% of Peak Viscosity in less than 1 minute and 85% of Peak Viscosity in 2 minutes.

TABLE 1

| Sample | Hydration Equipment | Viscosity (cps) | | | | |
|---|---|---|---|---|---|---|
| | | 30 sec. | 1 min. | 2 min. | 3 min. | 5 min. |
| 1$^{st}$ Method | Presently Disclosed Extender @ 123 gpm | 12.9 | 17.1 | 28.5 | 33.0 | 33.5 |
| 2$^{nd}$ Method | Lab Mixer @ 1250 RPM | 5.2 | 8 | 14.8 | 21.3 | 24.1 |

The methods of the present disclosure can further include conveying the mixture from the extender to a vessel (e.g., a hydration tank) while in the extensional flow regime and low shear mixing of the mixture within the vessel. At higher hydratable additive concentrations (e.g., 25 pounds per 1000 gallons of the hydrating fluid ppt or more), the mixture exiting the extender may be diluted with additional hydrating liquid (e.g., by introduction into the vessel containing additional hydrating liquid, by mixing with additional hydrating liquid in downstream mixing equipment, or by entraining with additional hydrating liquid in tubulars).

Such methods can be performed in a variety of settings for a variety of applications. One example application is hydraulic fracturing operations for subterranean formations. In a hydraulic fracturing operation, the mixture discharged from the extender or the vessel (e.g., a hydration tank) can be further diluted to a desired hydratable additive concentration and mixed with proppant for use in creating and/or extending at least one fracture in the subterranean formation and introducing the proppant into said fracture. Advantageously, the blending systems to perform such methods do not require a large footprint and can be easily installed at a wellsite for onsite production of the fracturing fluid.

The dynamic proppant transport capability (DPTC)(test method described in the Examples below) of the mixture (diluted or not) produced by the methods/extender described herein may have a % improvement that is greater than the % improvement in DPTC for the same mixture composition produced under traditional high shear mixing for the same amount of mixing time in each. The % improvement in DPTC relative to control (the hydrating fluid without the hydratable additive) may be 20% or greater (e.g., 20% to 75%, or 20% to 40%, or 25% to 50%, or 30% to 60%, or 50% to 75%).

New Embodiments

Embodiments of the disclosure broadly related to methods including flowing a hydrating liquid in an extensional flow regime through an elongated passageway of an extender, wherein a flow rate of the hydrating liquid and a diameter of the elongated passageway are sufficient to achieve a Reynolds number of 20,000 or greater; and adding a hydratable additive to the hydrating liquid in the elongated passageway to produce a mixture comprising the hydratable additive that is at least partially hydrated. In certain embodiments, the methods further include prewetting the hydratable additive with a portion of the hydrating liquid before introduction of the hydratable additive to the elongated passageway, wherein a concentration of the hydratable additive being prewetted is at least 5 times higher than a concentration of the hydratable additive in the mixture. In other embodiments, the methods further include conveying the mixture from the extender to a vessel; and subjecting the mixture to low shear mixing within the vessel. In other embodiments, the methods further include conveying the mixture from the extender directly to a blender. In other embodiments, the methods further include the hydratable additive includes (a) an effective amount of a hydratable polymer composition or a hydratable polymer slurry composition including one or more gel-forming hydratable polymers, (b) a friction reducer composition including one or more hydrolyzed or partially hydrolyzed hydrolyzable polymers and copolymers, and (c) a cross-linking composition in an amount sufficient to cross-link the one or more gel-forming hydratable polymers to form crosslinked structures within the fracturing fluid composition, wherein the effective amount of the hydratable polymer composition is less than about 10 ppt of the fracturing fluid composition, and wherein the fracturing fluid composition is adapted to improve proppant transport properties, to control viscosity improvement when the hydrating fluid is a brine or has elevated total dissolved solids (TDS), and to increase proppant concentrations and proppant particles sizes within fractures. In other embodiments, the gel-forming hydratable polymers are selected from the group consisting of galactomannan gums, glucomannan gums, guars, derivatized guars, cellulose derivatives, and mixtures or combinations thereof, the hydratable polymer composition or a hydratable polymer slurry composition further includes one or more synthetic polymers selected from the group consisting of the partially hydrolyzed polymers and copolymers are selected from the group consisting of hydrolyzed or partially hydrolyzed polyacrylic acid, hydrolyzed or partially hydrolyzed polymethacrylic acid, hydrolyzed or partially hydrolyzed polyacrylamide, hydrolyzed or partially hydrolyzed copolymers of acrylic acid and one or more ethylenically unsaturated monomers, hydrolyzed or partially hydrolyzed copolymers of methylacrylic acid and one or more ethylenically unsaturated monomers, hydrolyzed or partially hydrolyzed copolymers of acrylamide and one or more ethylenically unsaturated monomers and mixtures or combinations thereof, the ethylenically unsaturated monomers including vinyl alcohol, ethylene, propylene, and mixtures and combinations thereof, the one or more synthetic polymers are also adapted to protect and stabilize the crosslinked structures from shear degradation, and the one or more synthetic polymers have molecular weights above about 15 million, or ranging between about 18 million and about 40 million, or ranging between about 18 million and about 25 million. In other embodiments, the methods further include the hydratable polymer composition is present in the slurry in an amount between about 1 gpt and about 10 gpt of the fracturing fluid composition. In other embodiments, the methods further include the additive further includes one or more anionic, cationic, or amphoteric homopolymers, copolymers, terpolymers, or high order mixed monomer polymers synthesized from one or more anionic monomers, cationic monomers, and/or neutral monomers, wherein the anionic monomers are selected from the group consisting of acrylic acid, methacrylic acid, 2-acrylamide-2-methylpropane sulfonic acid, maleic anhydride, and mixtures or combinations thereof, wherein the cationic monomers are selected from the group consisting of dimethyl-diallyl ammonium chloride, dimethylamino-ethyl methacrylate, and/or allyltrimethyl ammonium chloride, wherein the neutral monomers are selected from the group consisting of butadiene, N-vinyl-2-pyrrolidone, methyl vinyl ether, methyl acrylate, maleic anhydride, styrene, vinyl acetate, acrylamide, methyl methacrylate, and/or acrylonitrile, and wherein the one or more anionic, cationic, or amphoteric homopolymers, copolymers, terpolymers, or high order mixed monomer polymers are adapted to also protect and stabilize the crosslinked structures from shear degradation. In other embodiments, the crosslinking composition comprises one or more compounds including boron-containing ions, zirconium-containing ions, and titanium-containing ions, or mixtures thereof. In other embodiments, the methods further include mixing the mixture with proppant and a dilution fluid to form a fracturing fluid; injecting the fracturing fluid into a subterranean formation under conditions sufficient to create and/or extend at least one fracture in the subterranean formation; and placing the proppant in the at least one fracture. In other embodiments, the hydratable additive is present in the fracturing fluid between about 2 ppt and about 20 ppt of the hydrating fluid. In other embodiments, the hydratable additive further includes a powder polymer having a water content of 10 wt % or less, a polymer suspended in a fluid, or a polymer suspended in an emulsion, and/or the polymer has a molecular weight of 10,000 g/mol to 50,000,000 g/mol. In other embodiments, the hydratable additive further comprises a clay.

In other embodiments, the methods further include forming the one or more synthetic polymers, one or more hydrolyzed or partially hydrolyzed hydrolyzable polymers and copolymers, and/or the one or more anionic, cationic, or amphoteric homopolymers, copolymers, terpolymers, or high order mixed monomer polymers by (a) combining an aqueous fluid and an oleaginous fluid to prepare an invert emulsion comprising a polymerizable composition; and (b) degassing the invert emulsion under an extensional flow regime through an elongated passageway of an extender and thereby removing oxygen to produce a degassed invert emulsion, wherein a flow rate of the invert emulsion and a diameter of the elongated passageway are sufficient to achieve a Reynolds number of 20,000 or greater. In other embodiments, the methods further include preparing the invert emulsion and degassing the invert emulsion occur simultaneously, degassing is performed under inert gas, the diameter of the elongated passageway is 45 mm or less, and/or the degassed invert emulsion comprises an oxygen concentration of 1 ppm or less. In other embodiments, the invert emulsion comprises one or more emulsifiers selected from a group consisting of polyethoxylated phenols, polyethoxylated sorbitans, polyethoxylated alcohols, and carboxylic acid esters. In other embodiments, the extender is a first extender, the method further comprising (a) transferring the degassed invert emulsion to a reactor that is fluidly connected with a second extender; (b) initiating polymerization of the polymerizable composition in the degassed invert emulsion; (c) transferring at least a portion of the degassed invert emulsion to the second extender at one or more time intervals and returning the portion of the degassed invert emulsion to the reactor, wherein a flow rate of the invert emulsion and a diameter of the elongated passageway are sufficient to achieve a Reynolds number of 20,000 or greater; and (d)isolating a polymer product from the degassed invert emulsion. In other embodiments, the methods further include terminating the polymerization with a polymerization terminator fed into the second extender. In other embodiments, the polymerizable composition comprises one or more monomers selected from a group consisting of acrylamide, acrylic acid, 2-acrylamido-2-methylpropane sulfonic acid, diallyldimethylammonium chloride, cyclic lactams, and cyclic lactones. In other embodiments, the methods further include transferring the isolated polymer product to a third extender configured for vacuum distillation; and removing a stream comprising at least one of water or solvent from the isolated polymer product to create a concentrated polymer stream.

Embodiments of the disclosure broadly related to fracturing fluid compositions include proppant; a dilution fluid; and a hydratable additive concentrate comprising a hydratable additive that is at least substantially hydrated and a hydrating liquid, the hydratable additive concentrate being produced by (a) flowing a hydrating liquid in a extensional flow regime through an elongated passageway of an extender, wherein a flow rate of the hydrating liquid and a diameter of the elongated passageway are sufficient to achieve a Reynolds number of 20,000 or greater; and (b) adding a hydratable additive to the hydrating liquid in the elongated passageway to produce a mixture comprising the hydratable additive that is at least partially hydrated. In certain embodiments, the fracturing fluid compositions are further produced by prewetting the hydratable additive with a portion of the hydrating liquid before introduction of the hydratable additive to the elongated passageway, wherein a concentration of the hydratable additive being prewetted is at least 5 times higher than a concentration of the hydratable additive in the mixture. In other embodiments, the fracturing fluid compositions are further produced by conveying the mixture from the extender to a vessel; and subjecting the mixture to low shear mixing within the vessel. In other embodiments, the fracturing fluid compositions are further produced by conveying the mixture from the extender directly to a blender. In other embodiments, the hydratable additive includes (a) an effective amount of a hydratable polymer composition or a hydratable polymer slurry composition including one or more gel-forming hydratable polymers, (b) a friction reducer composition including one or more hydrolyzed or partially hydrolyzed hydrolyzable polymers and copolymers, and (c) a cross-linking composition in an amount sufficient to crosslink the one or more gel-forming hydratable polymers to form crosslinked structures within the fracturing fluid composition, wherein the effective amount of the hydratable polymer composition is less than about 10 ppt of the fracturing fluid composition, and wherein the fracturing fluid composition is adapted to improve proppant transport properties, to control viscosity improvement when the hydrating fluid is a brine or has elevated total dissolved solids (TDS), and to increase proppant concentrations and proppant particles sizes within fractures. In other embodiments, the gel-forming hydratable polymers are selected from the group consisting of galactomannan gums, glucomannan gums, guars, derivatized guars, cellulose derivatives, and mixtures or combinations thereof, the hydratable polymer composition or a hydratable polymer slurry composition further includes one or more synthetic polymers selected from the group consisting of the partially hydrolyzed polymers and copolymers are selected from the group consisting of hydrolyzed or partially hydrolyzed polyacrylic acid, hydrolyzed or partially hydrolyzed polymethacrylic acid, hydrolyzed or partially hydrolyzed polyacrylamide, hydrolyzed or partially hydrolyzed copolymers of acrylic acid and one or more ethylenically unsaturated monomers, hydrolyzed or partially hydrolyzed copolymers of methylacrylic acid and one or more ethylenically unsaturated monomers, hydrolyzed or partially hydrolyzed copolymers of acrylamide and one or more ethylenically unsaturated monomers and mixtures or combinations thereof, the ethylenically unsaturated monomers including vinyl alcohol, ethylene, propylene, and mixtures and combinations thereof, the one or more synthetic polymers are also adapted to protect and stabilize the crosslinked structures from shear degradation, and the one or more synthetic polymers have molecular weights above about 15 million, or ranging between about 18 million and about 40 million, or ranging between about 18 million and about 25 million. In other embodiments, the hydratable polymer composition is present in the slurry in an amount between about 1 gpt and about 10 gpt of the fracturing fluid composition. In other embodiments, the additive further includes one or more anionic, cationic, or amphoteric homopolymers, copolymers, terpolymers, or high order mixed monomer polymers synthesized from one or more anionic monomers, cationic monomers, and/or neutral monomers, wherein the anionic monomers are selected from the group consisting of acrylic acid, methacrylic acid, 2-acrylamide-2-methylpropane sulfonic acid, maleic anhydride, and mixtures or combinations thereof, wherein the cationic monomers are selected from the group consisting of dimethyl-diallyl ammonium chloride, dimethylamino-ethyl methacrylate, and/or allyltrimethyl ammonium chloride, wherein the neutral monomers are selected from the group consisting of butadiene, N-vinyl-2-pyrrolidone, methyl vinyl ether, methyl acrylate, maleic anhydride, styrene, vinyl acetate, acrylamide, methyl methacrylate, and/or acrylonitrile, and wherein the one or more anionic, cationic, or amphoteric homopolymers, comonomer polymers are adapted to also protect and stabilize the crosslinked structures from shear degradation. In other embodiments, the crosslinking composition comprises one or more compounds including boron-containing ions, zirconium-containing ions, and titanium-containing ions, or mixtures thereof. In other embodiments, the flow rate of the hydrating liquid is at least 50 gallons per minute through the elongated passageway and the diameter of the elongated passageway is 45 mm or less, and/or the hydratable additive is present in the mixture at 10 pounds to 300 pounds per 1000 gallons of the hydrating fluid. In other embodiments, the fracturing fluid compositions are further produced by mixing the mixture with proppant and a dilution fluid to form a fracturing fluid; injecting the fracturing fluid into a subterranean formation under conditions sufficient to create and/or extend at least one fracture in the subterranean formation; and placing the proppant in the at least one fracture. In other embodiments, the hydratable additive is present in the fracturing fluid at 0.25 pound to 40 pounds per 1000 gallons of the hydrating fluid. In other embodiments, the hydratable additive comprises (a) a powder polymer having a water content of 10 wt % or less, (b) a polymer suspended in a fluid, or (c) a polymer suspended in an emulsion, and/or the polymer has a molecular weight of 10,000 g/mol to 50,000,000 g/mol. In other embodiments, the hydratable additive further comprises a clay.

DETAILED DESCRIPTION OF DRAWINGS

U.S. Ser. No. 16/900,084

Polymerization processes can incorporate one or more extenders at various process stages. Methods presented in the following examples are discussed in terms of invert emulsions and microemulsions, however, it is envisioned that the methods can also be applied to direct emulsions and nonemulsion polymerization methods. In the example shown in FIG. 10, a polymer is prepared using an example inverse emulsion polymerization system 100. As illustrated, oleaginous fluid 102 contains a polymerizable mixture that can include one or more of monomers, comonomers, initiators, emulsifiers, and polymerization additives. The oleaginous fluid 102 is combined with an aqueous fluid 104 in a mixing device 106a that mixes (blends) the oleaginous fluid 102 and the aqueous fluid 104 to form an emulsion, such as an invert emulsion. The oleaginous fluid 102 and aqueous fluid 104 can also be combined prior to injection and mixing in the mixing device 106a in some embodiments.

The mixing device 106a of polymerization system 100 is also configured to remove oxygen and other gasses simultaneously while preparing the invert emulsion. Mixing device 106a can be configured to inject gasses and/or liquids as stream 108 into a cross stream by induction. In this example, an inert gas (or gas mixture), such as nitrogen, is injected as stream 108 into the mixing device 106a to displace oxygen from the invert emulsion formed from the oleaginous fluid 102 and the aqueous fluid 104, while oxygen and vent gases are released as stream 110. In some embodiments, mixing device 106a can be combined with a vacuum that enhances oxygen removal.

A degassed emulsion is then discharged from the mixing device 106a and transferred as stream 112 to polymerization reactor 114 where polymerization is initiated. Polymerization processes in accordance with the present disclosure can include continuous and batch processes, and polymerization reactor 114 can be selected according to the selected process method. During the polymerization reaction, the reactor 114 can be supplemented by stream 119 with one or more reactants or additives, including monomers, emulsifiers, initiators, terminating agents, and the like.

Residence time in the reactor 114 can vary depending on a number of factors such as the target molecular weight of the polymer product 124. In at least one embodiment, the polymerizing mixture originating from stream 112 may reside within the reactor 114 between 1 and 5 minutes, but could reside within the reactor 114 for a time period that is shorter or longer than 1 to 5 minutes in some embodiments, without departing from the scope of the disclosure. During operation, the fluid level within the reactor 114 may be adjusted to increase or decrease the residence time.

At one or more intervals, at least a portion of the polymerizing mixture is transferred as a stream 116 to a second mixing device 106b, which places the stream 116 in an extensional flow regime during polymerization. After passage through mixing device 106b, the stream 117 can be transferred back to the polymerization reactor 114. In some embodiments, the polymerizing mixture can be cycled by the streams 116 and 117 between the reactor 114 and the mixing device 106b for multiple cycles without shear-induced damage or chain-scission of polymer chains. Input and output streams 116 and 117 can be configured in some cases to enhance circulation through the reactor 114. For example, the input stream 116 can be positioned such that the polymerizing mixture is drawn from the bottom of reactor 114 and the output stream 117 can be position to inject the polymerizing mixture near the top inlet of the reactor 114.

Mixing device 106b may be the same as or similar to 106a, or can be modified to have differing internal dimensions, configured to perform at differing flow rates, and/or contain additional inputs for adding/replenishing various reactants for the polymerizing mixture. In some embodiments, additional reactants and additives can be added as stream 118 to the mixing device 106b, which can increase the distribution of reactants throughout the mixture and/or between phases of an emulsion. Mixing device 106b can minimize turbulence and eddies, which can enhance mixing and emulsification with minimal damage to polymer products, enabling the polymerizing mixture to be cycled multiple times.

In some embodiments, the mixing device 106b may perform at least three functions: 1) to provide the motive flow to introduce the input stream 116 into the mixing device 106b, 2) to enhance mixing of the polymerizing mixture in the input stream 116, and 3) to separate and extend the polymer molecules in the input stream 116 to increase reactive site availability and enhance chain extension reactions. The geometry of the fluid contact surfaces in mixing device 106b may be optimized to ensure that the flow of liquid in the input stream 116 smoothly converges to prevent splashing (eddies).

Polymerization in the reactor 114 can be terminated by any suitable technique, including the addition of a terminating agent to the polymerizing mixture by the streams 118 and/or 119. Upon completion of the polymerization reaction, polymerized mixture is transferred by stream 121 to a separation unit 120, which can include one or more separators for separating gaseous, liquid, and/or solid components, such as line dryers, high-pressure separators, low-pressure separators, and the like. Separated components such as monomers, solvents, oligomers, and the like, can be returned to the reactor 114 by way of the stream 123. Following extraction from separation unit 120, polymer product is isolated at 124. In some embodiments, polymerized mixture 122 can be transferred from mixing device 106b directly to separation unit 120. Prior to isolating the polymer product at 124, the polymerization system 100 can also include an optional polymer concentration step in which the polymer product is directed to a mixing device 106c (dashed box) that is configured for vacuum distillation in which excess water and/or solvent is removed as stream 128, while concentrated polymer product is obtained as 124.

While not expressly depicted, the polymerization system 100 may further include various pumps, valves, shut offs, sensors, and other devices to control, among others, the mixing efficiency and effectiveness of the mixing devices 106a,b, the concentration of reactants and fluid levels in the reactor 114, and to control the supply of the mixture 121 to the downstream separation unit 120.

In some embodiments, the polymerization system 100 can be fully or partially automated. In such embodiments, the polymerization system 100 may include a control system 126 used to regulate, monitor, and maintain efficient operation of the polymerization system 100. The control system 126 may be in communication (either wired or wirelessly) with various components of the polymerization system 100. The mixing and discharge pumps, for example, may be communicably coupled to the control system 126, which may monitor and regulate the flow rate of each pump to ensure that the fluid level within the reactor 114 is maintained at a proper level. The control system 126 may also regulate the feed rate of the polymerizable mixture by the stream 112 or reactant addition by streams 118 and 119 to ensure that the concentration of components in the reactor 114 are at the desired levels. For example, if the mixing rate increases or decreases to adjust fluid level within the reactor 114, the feed rate of the polymerizable mixture by the stream 112 may also be adjusted autonomously by the control system 126.

As described above, the mixing devices 106a,b enable various functions at differing stages of polymerization system 100. By way of nonlimiting example, FIG. 11 is an isometric view of an example mixing device 200, which may be the same as or similar to one or both of the mixing devices 106a,b of FIG. 10 and, therefore, may be best understood with respect thereto. As illustrated, the mixing device 200 may include an extender 202 having a fluid inlet 204, a secondary inlet 206, an outlet 208, and a valve 220 (e.g., tertiary inlet/outlet).

Depending on the usage in polymerization system 100, the mixing device 200 can have variations in configuration and function. When configured to remove gasses and/or prepare invert emulsion, as described with respect to mixing device 106a (FIG. 10), an oleaginous fluid 102 may be introduced into the extender 202 via the fluid inlet 204, and the aqueous fluid 104 may be introduced into the extender passage 202 via the secondary inlet 206. In some embodiments, emulsion preparation and degassing can be performed in a configuration in which oleaginous fluid 102 and aqueous fluid 104 are combined prior to introduction into the extender 202 via the fluid inlet 204 and an inert gas is introduced as stream 108 (FIG. 10) through secondary inlet 206, while oxygen and other gases are removed by an applied vacuum as stream 110 (FIG. 10) through valve 220. In yet other embodiments, additional valves (not pictured) configured as gas inlets and outlets can be installed along extender passage 202 and used to handle gas streams 108 and 110, respectively. Following emulsification and degassing, inverse emulsion may exit the extender passage 202 via the outlet 208 to be conveyed into the reactor 114 (FIG. 10), as generally described above.

The geometry of the extender 202 may cause the oleaginous liquid 102 to form a jet that flows through the extender 202 and generates a low-pressure vacuum that draws the aqueous fluid 104 into the mixing device 200 to mix with the oleaginous liquid 102. The formation of the jet also imparts energy to the mixture to help disperse the aqueous fluid 104 and generate the emulsion. The outlet 208 may be formed by a diffuser 210 coupled to the extender 202 at a coupling 212. In other embodiments, however, the diffuser 210 may form an integral part or extension of the extender 202.

The secondary inlet 206 may include a valve 214 that regulates flow of aqueous fluid 104 into the extender 202. The valve 214 may comprise, for example, a ball valve that may be manually operated or operated by automation using the control system 126 (FIG. 10). In the illustrated embodiment, the secondary inlet 206 may further include a spacer 216 interposing the valve 214 and the extender 202.

In some embodiments, valve 220 can be used to supply a flushing fluid 222 to remove residual components of injected streams 102 or 104. The spacer 216 may define a port 218 and the valve 220 may be fluidly coupled to the spacer 216 at the port 218. The valve 220 may be actuated as needed to introduce a flushing fluid 222 into the extender 202 to remove any buildup of may be coated on the inner walls of the spacer 216 and a suction port that feeds the aqueous fluid 104 into the extender 202. Similar to the valve 214, the valve 220 may be manually operated or operated by automation using the control system 126 (FIG. 10).

When it is desired to flush the system, the valve 214 may be closed (either manually or automated), and the valve 220 may be opened (either manually or automated) to allow the flushing fluid 222 to enter the spacer 216 and the extender 202. The flushing fluid 222 may be any fluid that may remove buildup including, but not limited to, water (e.g., fresh or salt), gas (e.g., air, nitrogen, carbon dioxide, etc.), hydrocarbon (e.g., ethanol, methanol, etc.), polymer residue, or any combination thereof. In at least one embodiment, the flushing fluid 222 may comprise a portion of the oleaginous liquid 102 separated from the main portion and piped to the valve 220.

FIG. 12 is a cross-sectional side view of a nonlimiting embodiment of the extender 202. As illustrated, the extender 202 includes an elongate body 302 having a first end 304a and a second end 304b. The fluid inlet 204 is provided at the first end 304a, the outlet 208 is provided at the second end 304b, and a throat 306 extends between the fluid inlet 204 and the outlet 208. In some embodiments, the extender 202 may be made of a metal, such as carbon steel, stainless steel (e.g., polished stainless steel, chrome plated steel, etc.), aluminum, any alloys thereof, or any combination thereof. Alternatively, the extender 202 may be made of a plastic or polymer, such as polytetrafluoroethylene (PTFE or TEFLON®), NYLON®, HYLON®, polyvinyl chloride (PVC), chlorinated polyvinyl chloride (CPVC), or any combination thereof. In one or more embodiments, a hydrophobic coating may be applied to the inner walls of some or all of the extender 202. In yet other embodiments, the inner walls of some or all of the extender 202 may be polished to reduce friction.

Only a portion of the secondary inlet 206 is depicted in FIG. 12. More particularly, the valve 214 (FIG. 11) is omitted, but the spacer 216 is depicted and defines the port 218 through which the flushing fluid 222 (FIG. 11) can be injected into the extender 202. In the illustrated embodiment, a recessed portion or "cutout" 308 is defined in the outer wall of the body 302, and the secondary inlet 206 may be secured to the extender 202 within the cutout 308. Mounting the secondary inlet 206 to the extender 202 within the cutout 308 helps to mitigate the occurrence of the aqueous liquid 104 on the inner walls of the secondary inlet 206.

The secondary inlet 206 may further include a suction port 310 that extends from the spacer 216 and into the throat 306 of the extender 202 at an intermediate point between the first and second ends 304a,b. The suction port 310 may be generally cylindrical and may expand or otherwise flare outward as it extends into the throat 306. In such embodiments, the diameter of the suction port 310 at or near the spacer 216 may be smaller than the diameter of the suction port 310 at its opposing end within the throat 306. This may prove advantageous in providing a larger discharge area for the aqueous fluid 104 to be combined with the oleaginous fluid 102 flowing through the throat 306.

In some embodiments, a leading (upstream) edge 312a of the suction port 310 may extend deeper (further) into the throat 306 as compared to a trailing (downstream) edge 312b of the suction port 310. This may prove advantageous in helping to prevent the incoming aqueous fluid 104 from rebounding off the jet of oleaginous fluid 102 flowing through the throat 306 and splashing back onto portions of the suction port 310. Moreover, in at least one embodiment, the leading edge 312a may define or provide a beveled bottom edge 314 and the suction port 310 may define a chamfered portion 316 that facilitates the transition between the leading and trailing edges 312a,b. The beveled bottom edge 314 and the chamfered portion 316 may be designed to help minimize or prevent splashing of the aqueous liquid 104 as it is introduced into the throat 306.

In some embodiments, the suction port 310 may be made of a metal, such as carbon steel, stainless steel (e.g., polished stainless steel, chrome plated steel, etc.), aluminum, any alloys thereof, or any combination thereof. Alternatively, the suction port 310 may be made of a plastic or a polymer, such as polytetrafluoroethylene (PTFE or TEFLON®), NYLON®, HYLON®, polyvinyl chloride (PVC), chlorinated polyvinyl chloride (CPVC), or any combination thereof. In yet other embodiments, or in addition thereto, all or a portion of the spacer 216 and the suction port 310 may be lined with a lubricious material 318, such as CPVC. The lubricious material 318 may help repel the polymerizable additive 104 and help facilitate a cleaner flushing when the port 218 is used to introduce the flushing fluid 222 (FIG. 11) to remove any buildup that may be coated on the inner walls of the spacer 216 and the suction port 310. In at least one embodiment, the lubricious material 318 may further line the inner walls of the valve 214 (FIG. 11).

In embodiments that include flushing capabilities, the extender 202 may be cleaned and flushed at periodic intervals, such as at every 20 minutes of operation, or every 30 minutes, every hour, etc. In such embodiments, the control system 126 (FIG. 10) may autonomously control operation of the flushing operations. The control system 126 may also use various flow and pressure measurements to ensure that the extender 202 is maintaining suitable suction conditions. In the event any parameters deviate from normal values, the control system 126 (FIG. 10) may cause the valve 214 (FIG. 11) to close to eliminate a backflush condition through the suction line, and initiate a flush of the extender 202.

The extender 202 may also be flushed before and/or after the mixing process is completed. Flushing the extender 202 prior to starting a mixing process may prove advantageous since if there is any build up on the inner walls of the extender 202 (e.g., the valve 214 of FIG. 11, the spacer 216, and the suction port 310), it will have already absorbed water and softened, thus making it much easier to.

The throat 306 may form at least a portion of the elongated passageway described herein above that helps elongate and unfold the polymer structure of forming polymers with minimum damage, such as those in streams 116, 117, and 120 of FIG. 10. Accordingly, the elongated passageway and the throat 306 may comprise the same structure and may be referred to herein interchangeably. More specifically, the geometry of the extender 202 may help ensure that the oleaginous liquid 102 flowing through the throat 306 smoothly converges and mitigates splashing where the aqueous fluid 104 is introduced into the stream at the suction port 310. More particularly, the fluid inlet 204 may define or otherwise provide a converging portion 320 that tapers inward to form a nozzle. The oleaginous fluid 102 forms a jet as it is forced to transition from the converging portion 310 to the throat 306.

In some embodiments, the converging portion 320 may transition to the throat 306 at an arcuate transition 322 that exhibits a radius. As opposed to a sharp corner transition, the arcuate transition 322 provides smooth and curved transition walls. The radius and arcuate length of the arcuate transition 322 may be determined based on the remaining geometry of the extender 202. In at least one embodiment, the arcuate length of the arcuate transition 322 may be about 2.0 inches, but could alternatively be less than or greater than 2.0 inches, without departing from the scope of the disclosure. The arcuate transition 322 may help the flow of the oleaginous fluid 102 to become extensional and smooth, with little or no turbulence, as it forms the jet flowing into the throat 306, and smoother flow of the oleaginous fluid 102 may help prevent splashing as the aqueous fluid 104 enters the throat 306 at the suction port 310.

During example operation, in some embodiments, opening of the valve 214 (FIG. 11) to introduce the aqueous fluid 104 may be delayed for a short period (e.g., 5 or more seconds) to allow the flow of the oleaginous fluid 102 through the throat 306 to become extensional. Once proper conditions are attained, the valve 214 can be opened to initiate feeding the aqueous fluid 104 and forming the emulsion in stream 112.

In some embodiments, the diameter of the throat 306 may increase at or near the suction port 310 and otherwise where the oleaginous fluid 104 is introduced into the throat 306. More specifically, the throat 306 may define an expansion transition 324 that increases the diameter of the throat 306 in the downstream direction. Consequently, the diameter 326a of the throat 306 upstream from the expansion transition 324 may be smaller than the diameter 326b of the throat 306 downstream from the expansion transition 324. Increasing the diameter of the throat 306 at or near the suction port 310 may prove advantageous in removing the jet of oleaginous fluid 102 from the walls of the throat 306 at that point so that it does not impinge directly on abrupt structural edges of the suction port 310. The expansion transition 324 also provides additional room for the aqueous fluid 104 to be introduced into the throat 306.

The diffuser 210 extends the length of the throat 306 and provides or otherwise defines a diverging portion 328 that tapers outward in the downstream direction. The throat 306 may transition to the diverging portion 328 at a transition 330. In some embodiments, as illustrated, the transition 330 may provide a sharp corner transition. In other embodiments, however, the transition 330 may provide a smooth, curved transition across an arcuate portion having a radius, without departing from the scope of the disclosure.

The mixing device 200 may also be configured to place the polymerizing mixture within the reactor 114 (FIG. 10) into extensional flow and enhance mixing as described with respect to mixing device 106b (FIG. 10). As indicated above, mixing device 106b can be structurally similar to or the same as mixing device 106a, described above with respect to FIG. 11 and FIG. 12, and is best understood with respect thereto. In one or more intervals, the stream 116 (FIG. 10) containing the polymerizing mixture can be directed from the reactor 114 and introduced into the extender 202 via the fluid inlet 204. Secondary inlet 206 may be used to introduce the additive stream 118 (FIG. 10) to extender passage 202, which may be used to deliver, e.g., reactants or polymerization modifiers. In some embodiments, mixing of the polymerizing mixture can be enhanced by diverting a portion of stream 116 to secondary inlet 204 or valve 222, where the stream is then recombined with the remainder of stream 116 entering fluid inlet 204. The mixture then continues through extender 202. Following treatment with extender 106b, the stream 117 may exit the extender passage 202 via the outlet 208 to be conveyed back to the reactor 114 or separation unit 120 (FIG. 10), as generally described above.

The streams 116 and 117 can comprise a mixture of polymer chains. The extensional flow generated by mixing device 106b (FIG. 10) containing the extender 202 tends to stretch the polymer chains without scission or chain transfer, while enhancing chain extension reactions by increasing reactive site accessibility and reactant mixing.

Figure 1:
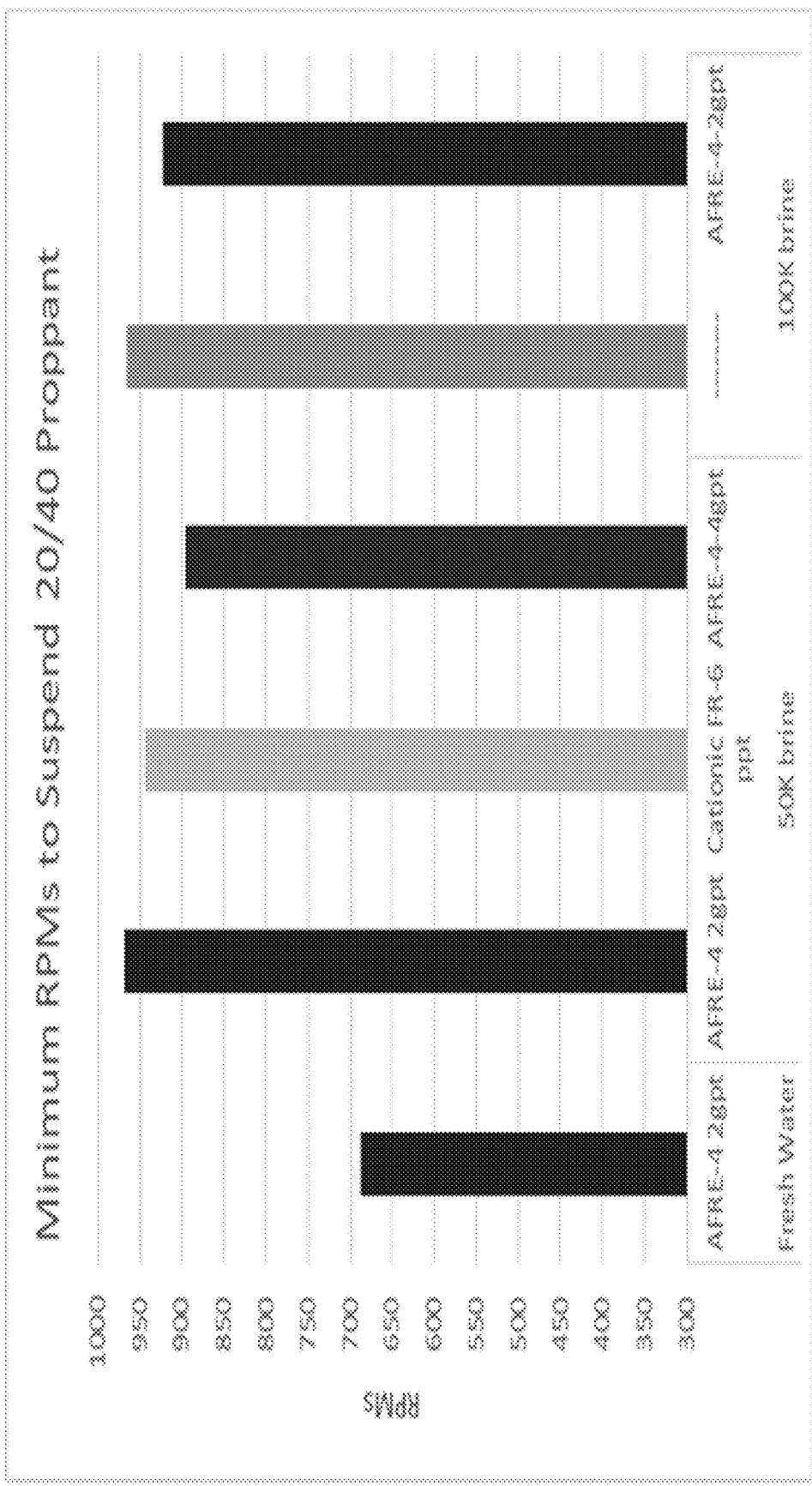
FIG. 1 depicts a plot of minimum rpm tests of fracturing fluids based on different base fluids in high shear periods.
Figure 2:
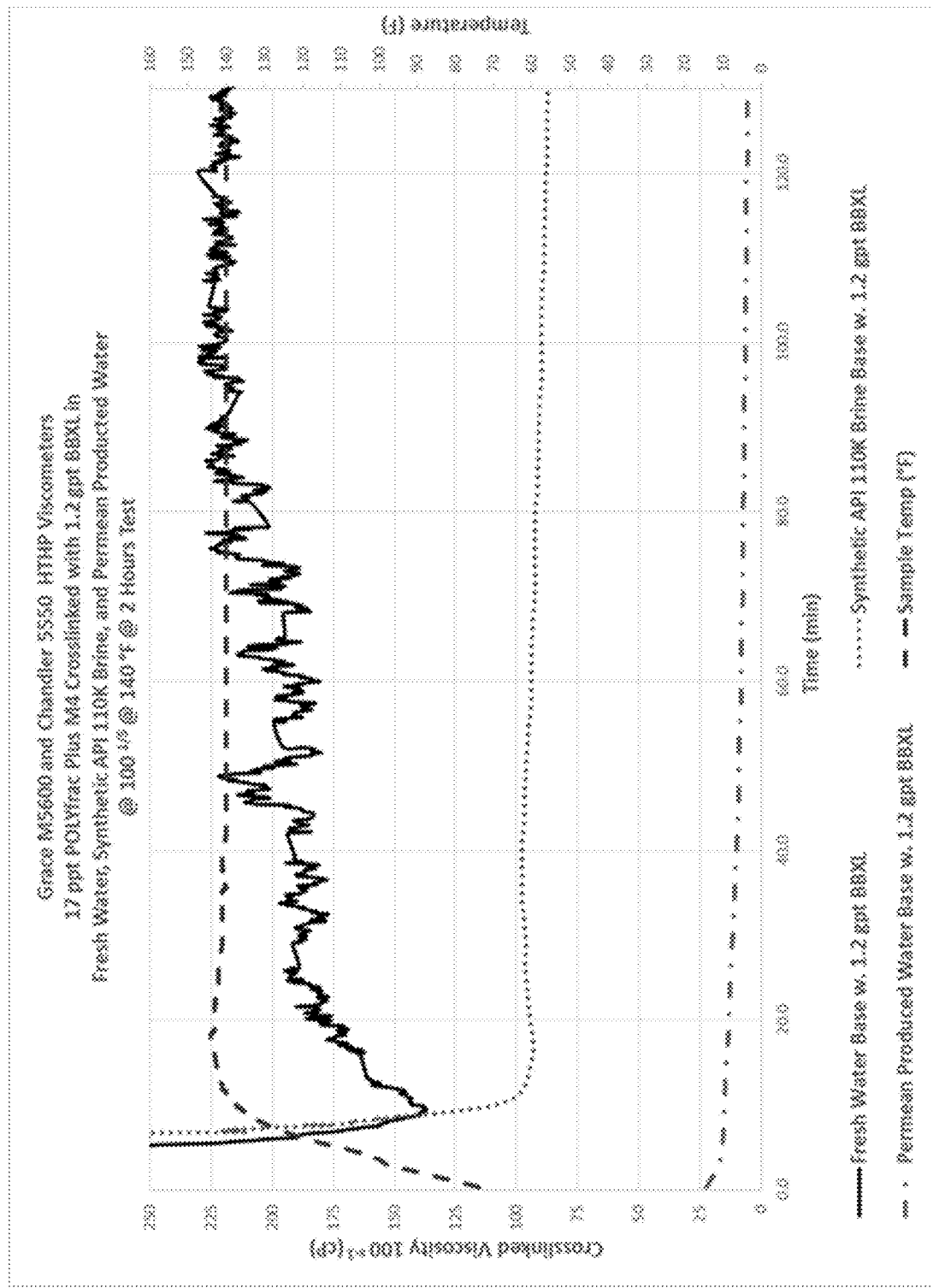
FIG. 2 depicts the viscosity profiles of a crosslinked fluids based on different base fluids.

In some embodiments, the mixing device 200 may also be configured for vacuum distillation as described with respect to mixing device 106c (FIG. 10) to remove water and/or other solvents and to increase polymer content of the polymer product 124 (FIG. 10). Mixing device 106c can be structurally similar to or the same as mixing device 106a, described above with respect to FIG. 2 and FIG. 12, and is best understood with respect thereto. For example, the product stream obtained from separation unit 120 can be introduced into the extender 202 via the fluid inlet 204. A suitable outlet, such as valve 220, can be used to withdraw volatile components such as water or solvent from the product stream which can be removed as stream 128 (FIG. 10), while the concentrated polymer product is obtained as 124.

U.S. Ser. No. 16/911,546

By way of nonlimiting example, FIG. 13 is a schematic flowchart diagram of an example blending system 400 that may incorporate one or more principles of the present disclosure. The blending system 400 may be configured to produce a mixture comprising a hydrated material, such as an HVFR, that may be incorporated into hydraulic fracturing fluids to improve fluid viscosity and proppant transport. The mixture may be blended to a predetermined concentration and diluted to particular downhole loading requirements. The blending system 400 may be implemented and used on site, such as at the site of a drilled wellbore, or may alternatively be implemented at a processing facility.

As illustrated, the blending system 400 includes a hydrating liquid 402, a hydratable additive 404, and a mixing device 406 that receives and mixes (blends) the hydratable additive 404 with the hydrating liquid 402 and thereby initiates the process of hydrating the hydratable additive 404. The hydrating liquid 402 may include any aqueous fluid, such as water or a solution comprising water. In some embodiments, the hydrating liquid 402 may comprise fresh water, but may alternatively comprise any suitable concentration and/or mixture of salts (e.g., saltwater, brackish water, or brine), without departing from the scope of the disclosure. The hydrating liquid 402 may be sourced from a local storage tank, such as a "frac" tank, but may alternatively originate from an adjacent body of water, such as a lake, a river, the sea, a surface reservoir, or a subterranean reservoir. The hydrating liquid 402 may also comprise produced water from the subterranean reservoir and/or a previous fracturing treatment.

The blending system 400 may also include a first or "mixing" pump 408 that conveys (pumps) the hydrating liquid 402 to the mixing device 406. The mixing pump 408 may be, for example, a centrifugal pump. In some embodiments, a flow meter 410 may be placed inline before or after the mixing pump 408 to measure the amount of the hydrating liquid 402 that is provided to the mixing device 406. As will be appreciated, this may help determine how much hydratable additive 404 must be introduced into the mixing device 406 to meet predetermined concentrations. In some embodiments, for example, the mixing pump 408 may be operated to provide about 400 gallons per minute (gpm) of the hydrating liquid 402 through the mixing device 406.

The hydratable additive 404 may be in the form of a powder, fine granules, or a liquid (e.g., a concentration, a suspension, an emulsion, or a slurry). Suitable materials for the hydratable additive 404 include, but are not limited to, polymers, clays, and the like, and any combination thereof. In at least one embodiment, the hydratable additive comprises a polymer suspended in a fluid (e.g., suspended in a hydrocarbon or suspended as an emulsion).

In some embodiments, the hydratable additive 404 may include natural and derivatized hydratable polymers, such as polysaccharides, biopolymers, and other polymers. Examples of polymers that may be used include, but are not limited to, arabic gums, cellulose, karaya gums, xanthaii, tragacanth gums, ghatti gums, carrageenin, psyllium, acacia gums, tamarind gums, guar gums, locust bean gums, and the like. Modified gums, including carboxyalkyl derivatives, such as carboxymethyl guar and hydroxyalkyl derivatives such as hydroxypropyl guar (HPG), can also be employed. Doubly derivatized gums such as carboxymethyl hydroxypropyl guar (CMHPG) can also be used. Generally, carboxyalkyl guar, carboxyalkyl hydroxyalkyl guar, and the like may be used, wherein the alkyl groups may comprise methyl, ethyl or propyl groups. In some embodiments, galactomannans such as guar, including natural, modified, or derivative galactomannans, may be used.

In some embodiments, the hydratable additive 404 may comprise a cellulose. Examples of celluloses, modified celluloses, and cellulose derivatives that may be used include cellulose, cellulose ethers, esters, and the like. Generally, any of the water-soluble cellulose ethers can be used. Those cellulose ethers include, among others, the various carboxyalkyl cellulose others, such as carboxyethyl cellulose and carboxymethyl cellulose (CMC); mixed ethers such as carboxyalkylethers, e.g., carboxymethylhydroxyethyl cellulose (CMHEC); hydroxyalkyl celluloses, such as hydroxyethyl cellulose (HEC) and hydroxypropyl cellulose;

alkyhydroxyalkyl celluloses, such as methylhydroxypropyl cellulose; alkyl celluloses, such as methyl cellulose, ethyl cellulose, and propyl cellulose; alkylcarboxyalkyl celluloses, such as ethylcarboxymethyl cellulose; alkylalkyl celluloses, such as methylethyl cellulose; hydroxyalkylalkyl celluloses such as hydroxypropylmethyl cellulose; and the like. Generally, carboxyalkyl cellulose, carboxyalkyl hydroxyalkyl cellulose and the like may be used, wherein the alkyl groups may comprise methyl, ethyl or propyl groups. In addition, derivatized celluloses, such as a hydroxyethyl cellulose grafted with vinyl phosphonic acid may be used.

In some embodiments, the hydratable additive 404 may comprise a hydratable synthetic polymer. Examples of hydratable synthetic polymers and copolymers that can be utilized include, but are not limited to, polyacrylate, polymethacrylate, acrylamide-acrylate copolymers, acrylamide homopolymers and copolymers (i.e., polyacrylamides), maleic anhydride methylvinyl ether copolymers, and any combination thereof.

Polymeric hydratable additives may have a molecular weight of 10,000 g/mol to 50,000,000 g/mol or greater. However, the methods of the present disclosure are particularly useful at the higher molecular weights because such polymer are typically more difficult to hydrate and possibly more sensitive to high shear degradation. Preferred embodiments may utilize polymeric hydratable additives having a molecular weight of 500,000 g/mol to 50,000,000 g/mol, or 1,000,000 g/mol to 50,000,000 g/mol, or 5,000,000 g/mol to 50,000,000 g/mol, or 10,000,000 g/mol to 50,000,000 g/mol.

In some embodiments, the hydratable additive 404 may comprise a hydratable clay such as, but not limited to, bentonite, montmorillonite, laponite, and the like.

The hydratable additive 404 may be stored in a local hopper, bin, or storage trailer, for example, and may be provided to the mixing device 406 in a variety of ways. To ensure that the hydratable additive 404 freely flows from the storage hopper or trailer, a pneumatic vibrator may run intermittently, and humidity from atmospheric air may be controlled via one or more desiccant filters. In one or more embodiments, as illustrated, the hydratable additive 404 may be fed to an auger 412 that delivers the hydratable additive 404 directly into the mixing device 406. The auger 412 112 may be operated and otherwise configured to meter a predetermined flow of the hydratable additive 404 into the mixing device 406 to proportionately match the flow of the hydrating liquid 402 entering the mixing device 406.

In other embodiments, however, the hydratable additive 404 may be pre-wetted in a wetting chamber 414 prior to being introduced into the mixing device 406. In such embodiments, a portion of the hydrating liquid 402 may be pumped through a liquid feed line 416 and into the wetting chamber 414. The hydratable additive 404 may be introduced into the wetting chamber 414 to mix with the portion of the hydrating liquid 402 and thereby form a pre-wetted and partially hydrated fluid that is conveyed to the mixing device 406. The wetting container 414 may be, for example, a container, a vessel, a bowl or any type of receptacle suitable for pre-mixing the hydratable additive 404 with the portion of the hydrating liquid 402. In some embodiments, the hydratable additive 404 may be metered into the wetting container 414 at a rate between about 60 pounds per minute (lbs/min) and about 100 lbs/min. The wetting chamber 414 is most desirable when using fast hydrating polymers like high-viscosity friction reducer (HVFR) because it allows for a higher amount of dry powder to be added without the development of gel balls or fish eyes. For slower hydrating polymers like guar the pre-wetting chamber can optionally be eliminated.

In pre-wetting, only a small amount of hydrating liquid 402 is added to the wetting chamber 414. Preferably, the amount of hydrating liquid 402 and hydratable additive 404 are so that the concentration of hydratable additive 104 is at least 5 times (e.g., 5 times to 100 times, or 10 times to 75 times, or 20 times to 50 times) the concentration of the hydratable additive 404 in the mixture 418 118 described below.

The hydratable additive 404 or the pre-wetted hydratable additive 404 may be thoroughly mixed with the hydrating liquid 402 within the mixing device 406, which discharges a concentrated mixture 418 of partially or completely hydrated material. In some embodiments, as described in more detail below, the mixing device 406 may include or otherwise incorporate an extender (not shown), which may perform three primary functions: 1) to provide the motive flow to introduce the hydratable additive 404 into the mixing device 406, 2) to impart energy to the mixture to quickly hydrate the hydratable additive 404 without creating clumps or fish eyes, and 3) to separate and extend the polymer molecules in order to yield more structural benefit and exposure for hydration, thereby promoting very rapid hydration. The geometry of the extender may be optimized to ensure that the flow of the hydrating liquid 402 smoothly converges to prevent splashing (eddies) where the hydratable additive 404 is introduced into a jet of hydrating liquid 402. An illustrative system employing an extender to promote polymer hydration is POLYMXR FR-EZ™, which is available from PfP Industries.

In the mixture 418, the hydratable additive may be present at up to 300 ppt, or 10 ppt to 300 ppt, or 25 ppt to 250 ppt, or 50 ppt to 200 ppt, or 100 ppt to 150 ppt.

The resulting mixture 418 can be a) injected directly into a dilution stream or downstream equipment 424 or tubulars (not shown) or b) conveyed into a hydration tank 420 used to further hydrate (if needed) and temporarily store the mixture 418. In some embodiments, the resulting mixture 418 may be received at a suction manifold in fluid communication with one or both of the hydration tank 420 and the downstream equipment 424. In at least one embodiment, the suction manifold may include a plurality of suction lines (e.g., four or more). As mentioned below, the downstream equipment 424 may comprise, for example, a blender. In such embodiments, suction forces generated by the blender may draw the mixture 418 into and through the manifold, thus resulting in zero head pressure downstream of the mixing device 406. Moreover, when not using the hydration tank, the time from contacting the hydrating liquid and hydratable additive in the extender to introducing the resultant mixture into a dilution stream, downstream equipment, or tubular may be 1 minute or less (e.g., immediate to 1 minute, 1 second to 45 seconds, or 5 seconds to 30 seconds).

In some embodiments, the hydration tank 420 may comprise a circular, cylindrical structure. In such embodiments, the mixture 418 may be injected (introduced) into the hydration tank 420 at an angle tangent to the inner sidewall of the hydration tank 420, which induces swirl to the mixture 418 as it enters the hydration tank 420. The swirling flow may provide enough movement in the hydration tank 420 to keep any remaining hydratable additive 404 suspended within the hydrating liquid 402 until all the hydratable additive 404 is sufficiently hydrated. This may prove advantageous if the hydratable additive 404 used in the process is a slow hydrating material, and it may also help to maintain homogeneity within the hydration tank 420 while blending. The hydration tank 420 also acts like a buffer to sudden changes in injection rate into the well. If there is a sudden drop in injection rate, it takes a finite amount of time for the hydration unit to adjust to a need for less polymer. The level of fluid in the hydration tank 420 allows the necessary time for the adjustment.

Residence time in the hydration tank 420 will vary, depending on the hydration time of the hydratable additive 404 and the targeted concentration of the polymer after dilution. In at least one embodiment, the mixture 418 may reside within the hydration tank 420 between 1 and 5 minutes, but could alternatively reside within the hydration tank 420 for a time period that is shorter or longer than 1 to 5 minutes, without departing from the scope of the disclosure, and depending on the hydration requirements of the hydratable additive 404. The fluid level within the hydration tank 420 may be adjusted to increase or decrease the residence time. For example, if a hydratable additive 404 having a slow hydration time is used, the residence time in the hydration tank 420 can be extended by increasing the fluid level. The fluid level within the hydration tank 420 may be maintained through operation of the mixing pump 410, and when associated sensors and controls determine that the fluid level is running high or low, the mixing pump 408 may slow down or speed up to adjust the fluid level.

A second or "discharge" pump 422 may be arranged downstream from the hydration tank 420 and configured to pump the mixture 418 from the hydration tank 420 to downstream equipment 424. The discharge pump 422 may be, for example, a progressive cavity pump, and the discharge rate of the discharge pump 422 may be determined based on the pump rate and required loading of the downstream equipment 424. The downstream equipment 424 may be, for example, a blender or dilution unit used to dilute the mixture 418 with a dilution fluid to form a fracturing fluid having a preferred concentration of the hydratable additive and to mix in the proppant to be placed in the created fracture. For example, the hydratable additive 404 may be present in a fracturing fluid at 0.25 ppt to 40 ppt, or 0.5 ppt to 5 ppt, or 5 to 15 ppt, or 10 to 40 ppt. In at least one embodiment, a flowmeter 426 may be arranged downstream from the discharge pump 422 to monitor the flow rate of the mixture 418 entering the downstream equipment 424.

While not expressly depicted, the blending system 400 may further include various valves, shut offs, sensors, and other devices to control the mixing efficiency and effectiveness of the mixing device 406 and to control the supply of the mixture 418 to the downstream equipment 424.

In some embodiments, the blending system 400 may be fully or partially automated. In such embodiments, the blending system 400 may include a control system 428 used to regulate, monitor, and maintain efficient operation of the blending system 400. The control system 428 may be in communication (either wired or wirelessly) with various components of the blending system 400. The mixing and discharge pumps 408, 422, for example, may be communicably coupled to the control system 428, which may monitor and regulate the flow rate of each pump 408, 422 to ensure that the fluid level within the hydration tank 420 is maintained at a proper level. The control system 428 may also regulate the feed rate of the hydratable additive 404 to ensure that the concentration of the hydratable additive 404 in the mixture 418 is accurate. If the mixing rate increases or decreases to adjust fluid level within the hydration tank 420, for instance, the feed rate of the hydratable additive 404 may also be adjusted autonomously by the control system 428.

As described above, the mixing device 406 includes an extender, which enables mixing the hydratable additive and the hydrating liquid in the extensional flow regime. By way of nonlimiting example, FIG. 14 is an isometric view of an example mixing device 500, according to one or more embodiments of the present disclosure. The mixing device 500 may be the same as or similar to the mixing device 406 of FIG. 13 and, therefore, may form part of the blending system 400 to help produce a mixture comprising a hydrated material (e.g., HVFR) that may be used in hydraulic fracturing fluids. As illustrated, the mixing device 500 may include an extender 502 having a fluid inlet 504, an additive inlet 506, and an outlet 508.

The hydrating liquid 402 may be introduced into the extender 502 via the fluid inlet 504, and the hydratable additive 404 may be introduced into the extender 502 via the additive inlet 506. As described above, the hydratable additive 104 may be fed into the additive inlet 506 either from the auger 412 (FIG. 13) or after being pre-wetted in the wetting container 414 (FIG. 13). The mixture 418 may exit the extender 502 via the outlet 508 to be conveyed into the hydration tank 420 (FIG. 13), as generally described above.

The geometry of the extender 502 may cause the hydrating liquid 402 to form a jet that flows through the extender 502 202 and generates a low pressure vacuum that draws the hydratable additive 404 into the mixing device 406 to mix with the hydrating liquid 402. The formation of the jet also imparts energy to the mixture to help hydrate the hydratable additive 404.

In some embodiments, the outlet 508 may be formed by a diffuser 510 coupled to the extender 502 at a coupling 512. In other embodiments, however, the diffuser 510 may form an integral part or extension of the extender 502.

In some embodiments, the additive inlet 506 may include a valve 514 that regulates flow of the hydratable additive 404 into the extender 502. The valve 514 may comprise, for example, a ball valve that may be manually operated or operated by automation using the control system 428 (FIG. 13). In the illustrated embodiment, the additive inlet 506 may further include a spacer 516 interposing the valve 514 and the extender 502. The spacer 516 may define a flush port 518 and a flush valve 520 may be fluidly coupled to the spacer 516 at the flush port 516. The flush valve 520 may be actuated as needed to introduce a flushing fluid 522 into the extender 502 to remove any buildup of the hydratable additive 404 that may be coated on the inner walls of the spacer 516 and a suction port that feeds the hydratable additive 404 into the extender 502. Similar to the valve 514, the flush valve 520 may be manually operated or operated by automation using the control system 428 (FIG. 13).

When it is desired to flush the system, the valve 514 may be closed (either manually or automated), and the flush valve 520 may be opened (either manually or automated) to allow the flushing fluid 522 to enter the spacer 516 and the extender 502. The flushing fluid 522 may be any fluid that may sufficiently remove built-up hydratable additive 404 including, but not limited to, water (e.g., fresh or salt), a gas (e.g., air, nitrogen, carbon dioxide, etc.), a hydrocarbon (e.g., ethanol, methanol, etc.), or any combination thereof. In at least one embodiment, the flushing fluid 522 may comprise a portion of the hydrating liquid 402 separated from the main portion and piped to the flush valve 520.

FIG. 15 is a cross-sectional side view of a nonlimiting embodiment of the extender 502. As illustrated, the extender 502 includes an elongate body 602 having a first end 604a and a second end 604b. The fluid inlet 504 is provided at the first end 604a, the outlet 508 is provided at the second end 604b, and a throat 606 extends between the fluid inlet 504 and the outlet 508. In some embodiments, the extender 502 may be made of a metal, such as carbon steel, stainless steel (e.g., polished stainless steel, chrome plated steel, etc.), aluminum, any alloys thereof, or any combination thereof. Alternatively, the extender 502 may be made of a plastic or polymer, such as polytetrafluoroethylene (PTFE or TEFLON®), NYLON®, HYLON®, polyvinyl chloride (PVC), chlorinated polyvinyl chloride (CPVC), or any combination thereof. In one or more embodiments, a hydrophobic coating may be applied to the inner walls of some or all of the extender 502. In yet other embodiments, the inner walls of some or all of the extender 502 may be polished to reduce friction.

Only a portion of the additive inlet 506 is depicted in FIG. 15. More particularly, the valve 514 (FIG. 14) is omitted, but the spacer 516 is depicted and defines the flush port 518 218 through which the flushing fluid 522 (FIG. 14) can be injected into the extender 502. In the illustrated embodiment, a recessed portion or "cutout" 608 is defined in the outer wall of the body 602, and the additive inlet 506 may be secured to the extender 502 within the cutout 608. Mounting the additive inlet 506 to the extender 502 within the cutout 608 helps to mitigate the occurrence of the hydratable additive 404 coating (covering) the inner walls of the additive inlet 506.

The additive inlet 506 may further include a suction port 610 that extends from the spacer 516 and into the throat 606 of the extender 502 at an intermediate point between the first and second ends 604a,b. The suction port 610 may be generally cylindrical and may expand or otherwise flare outward as it extends into the throat 606. In such embodiments, the diameter of the suction port 610 at or near the spacer 516 may be smaller than the diameter of the suction port 610 at its opposing end within the throat 606. This may prove advantageous in providing a larger discharge area for the hydratable additive 404 to be combined with the hydrating fluid 402 flowing through the throat 606.

In some embodiments, a leading (upstream) edge 612a of the suction port 610 may extend deeper (further) into the throat 606 as compared to a trailing (downstream) edge 612b of the suction port 610. This may prove advantageous in helping to prevent the incoming hydratable additive 404 from rebounding off the jet of hydrating fluid 402 flowing through the throat 606 and splashing back onto portions of the suction port 610. Moreover, in at least one embodiment, the leading edge 612a may define or provide a beveled bottom edge 614 and the suction port 610 may define a chamfered portion 616 that facilitates the transition between the leading and trailing edges 612a,b. The beveled bottom edge 614 and the chamfered portion 616 may be designed to help minimize or prevent splashing of the hydratable additive 404 as it is introduced into the throat 606.

In some embodiments, the suction port 610 may be made of a metal, such as carbon steel, stainless steel (e.g., polished stainless steel, chrome plated steel, etc.), aluminum, any alloys thereof, or any combination thereof. Alternatively, the suction port 610 may be made of a plastic or a polymer, such as polytetrafluoroethylene (PTFE or TEFLON®), NYLON®, HYLON®, polyvinyl chloride (PVC), chlorinated polyvinyl chloride (CPVC), or any combination thereof. In yet other embodiments, or in addition thereto, all or a portion of the spacer 516 and the suction port 610 may be lined with a lubricious material 618, such as CPVC. The lubricious material 618 may help repel the hydratable additive 404 and help facilitate a cleaner flushing when the flush port 518 is used to introduce the flushing fluid 522 (FIG. 14) to remove any buildup of the hydratable additive 404 that may be coated on the inner walls of the spacer 516 and the suction port 610. In at least one embodiment, the lubricious material 618 may further line the inner walls of the valve 514 (FIG. 14).

In embodiments that include flushing capabilities, the extender 502 may be cleaned and flushed at periodic intervals, such as at every 20 minutes of operation, or every 30 minutes, every hour, etc. In such embodiments, the control system 428 (FIG. 13) may autonomously control operation of the flushing operations. The control system 428 may also use various flow and pressure measurements to ensure that the extender 502 is maintaining suitable suction conditions. In the event any parameters deviate from normal values, the control system 428 may cause the valve 514 (FIG. 14) to close to eliminate a backflush condition through the suction line, and initiate a flush of the extender 502.

The extender 502 may also be flushed before and/or after the mixing process is completed. Flushing the extender 502 prior to starting a mixing process may prove advantageous since if there is any hydratable additive 404 already built up on the inner walls of the extender 502 (e.g., the valve 514 of FIG. 14, the spacer 516, and the suction port 610), it will have already absorbed water and softened, thus making it much easier to flush it as opposed to a fresh build-up of the hydratable additive 404. In some embodiments, the entire fluid pressure force of the mixing pump 408 (FIG. 13) may be used in the flushing process.

The throat 606 may form at least a portion of the elongated passageway described herein above that helps elongate and unfold the polymer structure of the hydratable additive 404 with minimum damage. Accordingly, the elongated passageway and the throat 606 may comprise the same structure and may be referred to herein interchangeably. More specifically, the geometry of the extender 502 may help ensure that the hydrating liquid 402 flowing through the throat 606 smoothly converges and mitigates splashing where the hydratable additive 404, especially dry hydratable additive 404, is introduced into the stream at the suction port 610. More particularly, the fluid inlet 504 may define or otherwise provide a converging portion 620 that tapers inward to form a nozzle. The hydrating liquid 502 forms a jet as it is forced to transition from the converging portion 610 to the throat 606.

In some embodiments, the converging portion 620 may transition to the throat 606 at an arcuate transition 622 that exhibits a radius. As opposed to a sharp corner transition, the arcuate transition 622 provides smooth and curved transition walls. The radius and arcuate length of the arcuate transition 622 may be determined based on the remaining geometry of the extender 502. In at least one embodiment, the arcuate length of the arcuate transition 622 may be about 2.0 inches, but could alternatively be less than or greater than 2.0 inches, without departing from the scope of the disclosure. The arcuate transition 622 may help the flow of the hydrating liquid 502 to become extensional and smooth, with little or no turbulence, as it forms the jet flowing into the throat 606, and smoother flow of the hydrating liquid 502 may help prevent splashing as the hydratable additive 404 enters the throat 606 at the suction port 610.

During example operation, in some embodiments, opening of the valve 514 (FIG. 14) to introduce the hydratable additive 404 may be delayed for a short period (e.g., 5 or more seconds) to allow the flow of the hydrating fluid 402 through the throat 606 to become extensional. Once proper conditions are attained, the valve 514 can be opened to start feeding the hydratable additive 404 and forming the mixture 418.

In some embodiments, the diameter of the throat 606 may increase at or near the suction port 310 and otherwise where the hydratable additive 404 is introduced into the throat 606. More specifically, the throat 606 may define an expansion transition 624 that increases the diameter of the throat 606 in the downstream direction. Consequently, the diameter 626a of the throat 606 upstream from the expansion transition 624 may be smaller than the diameter 626b of the throat 606 downstream from the expansion transition 624. Increasing the diameter of the throat 606 at or near the suction port 610 may prove advantageous in removing the jet of hydrating fluid 402 from the walls of the throat 606 at that point so that it does not impinge directly on abrupt structural edges of the suction port 610. The expansion transition 624 also provides additional room for the hydratable additive 404 to be introduced into the throat 606.

The diffuser 510 extends the length of the throat 306 and provides or otherwise defines a diverging portion 628 that tapers outward in the downstream direction. The throat 606 may transition to the diverging portion 628 at a transition 630. In some embodiments, as illustrated, the transition 630 may provide a sharp corner transition. In other embodiments, however, the transition 630 may provide a smooth, curved transition across an arcuate portion having a radius, without departing from the scope of the disclosure.

In a preferred embodiment, the hydratable additive 404 comprises a polymer, such as a polyacrylamide. The extensional flow generated by the extender 502 tends to keep the polymer structure of the hydratable additive 404 more intact, and tends to stretch the polymer without breaking it, thus improving its shear resistance and dynamic proppant transport capability. The mixing device 500 (FIG. 14) may be able to produce a flow of the hydrating fluid 402 with a minimum amount of wasted energy in the form of turbulence, and the hydratable additive 404 (e.g., polymer) is added to this stream. This allows the hydratable additive 404 to be wetted and then begin its structure development. The smooth, extensional flow pattern helps achieve elongation and unfolding of the polymer structure with a minimum of damage (e.g., shortening of the polymer chain).

The downstream hydration tank 424 (FIG. 13) may also help improve shear resistance and dynamic proppant transport capability in that it may keep the hydratable additive 404, which is now partially hydrated, in a constant but controlled movement (e.g., spiral flow). This step may complete the stretching of the polymer chains and maximize the area that the polymer structure covers. Combining these two blending steps may complete the required structural development process.

Maximizing the polymer concentration that is reached using this process allows the mixing device 406, 500 (FIGS. 13 and 14) to support a relatively high polymer concentration and, in turn, be capable of handling of the polymer requirement for a high injection rate through the downstream equipment 424 (FIG. 13).

To facilitate a better understanding of the embodiments of the present invention, the following examples of preferred or representative embodiments are given. In no way should the following examples be read to limit, or to define, the scope of the invention.

Suitable Reagents Used in the Disclosure

U.S. Ser. No. 16/101,835
Aqueous Base Fluids
Suitable aqueous base fluids include, without limitation, a high TDS produced water, a high TDS flow back water, a high TDS fracturing flow back water, a brackish water, a reverse osmosis (RO) reject water, a clear brine, and mixtures thereof. In certain embodiments, the aqueous base fluids further include fresh water.
Hydratable Polymers
Suitable hydratable polymers or gelling agents that may be used in the disclosure include, without limitation, any hydratable polysaccharides that are capable of forming a gel in the presence of a crosslinking agent. Exemplary examples of hydratable polysaccharides include, without limitation, galactomannan gums, glucomannan gums, guars, derivatized guars, cellulose derivatives, and mixtures or combinations thereof. Specific examples are guar gum, guar gum derivatives, locust bean gum, Karaya gum, carboxymethyl cellulose, carboxymethyl hydroxyethyl cellulose, and hydroxyethyl cellulose. Other specific examples include, without limitation, guar gums, hydroxypropyl guar, carboxymethyl hydroxypropyl guar, carboxymethyl guar, and carboxymethyl hydroxyethyl cellulose. Suitable hydratable polymers may also include synthetic polymers, such as polyvinyl alcohol, polyacrylamides, poly-2-amino-2-methyl propane sulfonic acid, and various other synthetic polymers and copolymers. In certain embodiments, the molecular weight of the hydratable synthetic polymers are between about 10,000 to about 100,000,000. In other embodiments, the molecular weight is between about 10,000 to about 10,000,000. In other embodiments, the molecular weight is between about 10,000 to about 1,000,000.

The hydratable polymer may be present in a fracturing fluid in concentrations ranging from about 0.05 wt. % to about 10 wt. %. In certain embodiments, the polymer concentration ranges between about 0.10 wt. % and about 5.0 wt. %. In other embodiments, the polymer concentration ranges between about 0.05 wt. % and about 0.7 wt. % of the aqueous fluid. In certain embodiments, the hydratable polymer is present in a range from about 0.10 wt. % to about 0.25 wt. %. If the polymer is in the form or a slurry, then the slurry is present in an amount between about 10 gpt and about 30 gpt (gallons per thousand gallons) of the fracturing fluid. In certain embodiments, the polymer slurry amount is between about 1 gpt and about 15 gpt. In other embodiments, the polymer slurry amount is between about between about 2 gpt and about 5 gpt.
Crosslinking Agents
Suitable crosslinking agents include, without limitation, any compound that increases the viscosity of a fluid including the hydratable polymers by chemical crosslinks, physical crosslinks, and/or cross-links the hydratable polymer by any other mechanism. For example, the gelation of a hydratable polymer may be achieved by cross-linking the polymer with metal ions including boron, zirconium, and titanium containing compounds, or mixtures thereof. One class of suitable crosslinking agents is organotitanates. Another class of suitable crosslinking agents is borates. The selection of an appropriate crosslinking agent depends upon the type of treatment to be performed and the hydratable polymer to be used. The amount of the crosslinking agent used also depends upon the well conditions and the type of treatment to be introduced. However, the range is generally from about 10 ppm to about 1000 ppm of metal ion of the crosslinking agent in the hydratable polymer fluid.

Other crosslinking agents may be a borate-containing compounds, titanate-containing compounds, zirconium-containing compound, and mixtures thereof. For example, the crosslinking agent can be sodium borate×H$_2$O (varying waters of hydration), boric acid, borate crosslinkers (a mixture of a titanate constituent, preferably an organotitanate constituent, with a boron constituent. The organotitanate constituent can be TYZOR® titanium chelate esters from E.I du Pont de Nemours & Company. The organotitanate constituent can be a mixture of a first organotitanate compound having a lactate base and a second organotitanate compound having triethanolamine base. The boron constituent can be selected from the group consisting of boric acid, sodium tetraborate, and mixtures thereof. These are described in U.S. Pat. No. 4,514,309, incorporated herein by reference, borate based ores such as ulexite and colemanite, Ti(IV) acetylacetonate, Ti(IV) triethanolamine, Zr lactate, Zr triethanolamine, Zr lactate-triethanolamine, Zr lactate-ethanolamine-triisopropanolamine, or mixtures thereof. In some embodiments, the well treatment fluid composition may further comprise a proppant.

Yet other crosslinking agents that crosslink polymer to even higher viscosities and more effective at carrying proppant into the fractured formation. The borate ion has been used extensively as a crosslinking agent, typically in high pH fluids, for guar, guar derivatives and other galactomannans. See, for example, U.S. Pat. No. 3,059,909, incorporated herein by reference and numerous other patents that describe this classic aqueous gel as a fracture fluid. Other crosslinking agents include, for example, titanium crosslinkers (U.S. Pat. No. 3,888,312, incorporated herein by reference), chromium, iron, aluminum, and zirconium (U.S. Pat. No. 3,301,723, incorporated herein by reference). Of these, the titanium and zirconium crosslinking agents are typically preferred. Examples of commonly used zirconium crosslinking agents include zirconium triethanolamine complexes, zirconium acetylacetonate, zirconium lactate, zirconium carbonate, and chelants of organic alphahydroxycorboxylic acid and zirconium. Examples of commonly used titanium crosslinking agents include titanium triethanolamine complexes, titanium acetylacetonate, titanium lactate, and chelants of organic alphahydroxycorboxylic acid and titanium. The crosslinking compositions may include mixtures or combination of any of crosslinking agents disclosed herein.

Proppants

Suitable propping agents or proppants are typically added to the fracturing fluid prior to the addition of a crosslinking agent. However, proppants may be introduced in any manner which achieves the desired result. Any proppant may be used in embodiments of the disclosure. Examples of suitable proppants include, but are not limited to, quartz sand grains, glass and ceramic beads, walnut shell fragments, aluminum pellets, nylon pellets, and the like. Proppants are typically used in concentrations between about 1 lb to about 8 lbs. per gallon of a fracturing fluid, although higher or lower concentrations may also be used as desired. The fracturing fluid may also contain other additives, such as surfactants, corrosion inhibitors, mutual solvents, stabilizers, paraffin inhibitors, tracers to monitor fluid flow back, and so on.

Breaking Agents

The term "breaking agent" or "breaker" refers to any chemical that is capable of reducing the viscosity of a gelled or crosslinked fluid. As described above, after a fracturing fluid is formed and pumped into a subterranean formation, it is generally desirable to convert the highly viscous gel to a lower viscosity fluid. This allows the fluid to be easily and effectively removed from the formation and to allow desired material, such as oil or gas, to flow through the proppant packed fracture into the well bore. This reduction in viscosity of the treating fluid is commonly referred to as "breaking". The reduction in viscosity may be attributable to breaking the crosslinked structure, degrading the base polymer being used or a combination of both mechanisms. Consequently, the chemicals used to break the viscosity of the fluid is referred to as a breaking agent or a breaker.

Examples of inorganic breaking agents for use in this invention include, but are not limited to, persulfates, percarbonates, perborates, peroxides, perphosphates, permanganates, etc. Specific examples of inorganic breaking agents include, but are not limited to, alkaline earth metal persulfates, alkaline earth metal percarbonates, alkaline earth metal perborates, alkaline earth metal peroxides, alkaline earth metal perphosphates, zinc salts of peroxide, perphosphate, perborate, and percarbonate, and so on. Additional suitable breaking agents are disclosed in U.S. Pat. Nos. 5,877,127; 5,649,596; 5,669,447; 5,624,886; 5,106,518; 6,162,766; and 5,807,812, incorporated herein by reference. In some embodiments, an inorganic breaking agent is selected from alkaline earth metal or transition metal-based oxidizing agents, such as magnesium peroxides, zinc peroxides, and calcium peroxides.

In addition, enzymatic breakers may also be used in place of or in addition to a non-enzymatic breaker. Examples of suitable enzymatic breakers such as guar specific enzymes, alpha and beta amylases, amyloglucosidase, aligoglucosidase, invertase, maltase, cellulase, and hemi-cellulase are disclosed in U.S. Pat. Nos. 5,806,597 and 5,067,566, incorporated herein by reference.

A breaking agent or breaker may be used "as is" or be encapsulated and activated by a variety of mechanisms including crushing by formation closure or dissolution by formation fluids. Such techniques are disclosed, for example, in U.S. Pat. Nos. 4,506,734; 4,741,401; 5,110,486; and 3,163,219, incorporated herein by reference.

Inorganic Acids

Suitable inorganic acids include, without limitation, any inorganic acid. Exemplary examples include, without limitation, hydrogen chloride, sulfuric acid, phosphoric acid, or mixtures thereof.

Organic Acids

Suitable organic acids include, without limitation, any organic acid. Exemplary examples include, without limitation, formic acid, acetic acid, propionic acid, or mixtures thereof.

Inorganic Bases

Suitable inorganic bases include, without limitation, any inorganic base. Exemplary examples include, without limitation, sodium hydroxide, sodium bicarbonate, sodium carbonate, sodium bicarbonate, potassium hydroxide, potassium bicarbonate, potassium carbonate, or mixtures thereof.

Organic Bases

Suitable organic acids include, without limitation, any organic base. Exemplary examples include, without limitation, sodium tert-butoxide, potassium tert-butoxide, choline hydroxide, or mixtures thereof.

Friction Reducing Agents

Suitable friction reducing agents include, without limitation, high molecular weight, anionic polymers having a molecular weight of above about 15 million, or ranging from about 18 million to about 40 million or ranging from about 18 million to about 25 million. Most standard polymers useful as friction reducers for oil and gas field stimulation exhibit a molecular weight within the range of about 10 to about 12 million. Exemplary example of high molecular weight, anionic polymers include, without limitation, hydrolyzed or partially hydrolyzed polyacrylic acid, hydrolyzed or partially hydrolyzed polymethacrylic acid, hydrolyzed or partially hydrolyzed polyacrylamide, hydrolyzed or partially hydrolyzed copolymers including acrylic acid, methylacrylic acid, and/or acrylamide with other ethylenically unsaturated monomers including vinyl alcohol, ethylene, propylene, etc. and mixtures and combinations thereof. In certain embodiments, the friction reducing agents include partially hydrolyzed polyacrylamide (PHPA).

Nonionic and Amphoteric Polymers

Suitable nonionic and amphoteric polymers used in the present composition preferably exhibit a molecular weight within the range of about 8 million to about 14 million or ranging from about 10 million to 15 million or ranging from about 10 million to about 12 million. Additional information on this mixture of friction-reducing polymers for high TDS systems is disclosed in copending U.S. patent application Ser. No. 15/786,769 the disclosure of which is hereby incorporated by reference.

Exemplary polymers (anionic, cationic, or amphoteric) may also be homopolymers, copolymers, terpolymers, or high order mixed monomer polymers synthesized from one or more anionic monomers, cationic monomers, and/or neutral monomers. For copolymer and high order mixed monomer polymers, the monomers used may have similar reactivities so that the resultant amphoteric polymeric material has a random distribution of monomers. The anionic monomers may be any anionic monomer such as acrylic acid, methacrylic acid, 2-acrylamide-2-methylpropane sulfonic acid, and/or maleic anhydride. The cationic monomer may be any cationic monomer such as dimethyl-diallyl ammonium chloride, dimethylamino-ethyl methacrylate, and/or allyltrimethyl ammonium chloride. The neutral monomer may be any neutral monomer such as butadiene, N-vinyl-2-pyrrolidone, methyl vinyl ether, methyl acrylate, maleic anhydride, styrene, vinyl acetate, acrylamide, methyl methacrylate, and/or acrylonitrile. Other exemplary polymers may be a terpolymer synthesized from acrylic acid (AA), dimethyl diallyl ammonium chloride (DMDAC) or diallyl dimethyl ammonium chloride (DADMAC), and acrylamide (AM). The ratio of monomers in the terpolymer can generally be any ratio. A presently preferred ratio is about 1:1:1. Other exemplary amphoteric polymeric materials include approximately 30% polymerized AA, 40% h polymerized AM, and 10% polymerized DMDAC or DADMAC with approximately 20% free residual DMDAC or DADMAC which is not polymerized due to lower relative reactivity of the DMDAC or DADMAC monomer.

U.S. Ser. No. 16/900,084

Monomers

Polymerization methods in accordance with the present disclosure can be adapted to the synthesis of any polymer or copolymer, including ionic and nonionic polymers, and random and block copolymers. Suitable monomers can include any hydrophilic monomer or combination of monomers having vinyl or unsaturated substituents (anionic, cation, amphoteric, or nonionic), and heterocyclic monomers. Example monomers include acrylic acid and methacrylic acid derivatives, acrylamide, 2-acrylamido-2-methylpropane sulfonic acid (AMPS), diallyldimethylammonium chloride (DADMAC), alkyl vinyl ethers, cyclic lactams, cyclic lactones, salt derivatives thereof, and mixtures thereof. Depending on solubility, monomers and comonomers may be dissolved in the aqueous or oleaginous phase. In some embodiments, monomers or comonomers may localize at the interphase boundary and function as emulsifiers.

Polymers produced by methods disclosed herein may have a weight average molecular weight of 10,000 g/mol to 50,000,000 g/mol or greater. In some embodiments, polymers may have a weight average molecular weight in a range of 500,000 g/mol to 50,000,000 g/mol, 1,000,000 g/mol to 50,000,000 g/mol, 5,000,000 g/mol to 50,000,000 g/mol, or 10,000,000 g/mol to 50,000,000 g/mol. Polymers produced may have a branching index in a range of 0.95 to 1.0 or greater.

Initiators

Initiators for this methodology can be free radical, anionic, or cationic. Radical initiators can be initiated by thermal decomposition, photolysis, and redox reactions including but not limited to dicumyl peroxide, azobisisobutyronitrile (AIBN), peroxide with ferrous iron (Fe(II)), and potassium persulfate. Anionic initiators can be initiated by amine, phosphine, and alkyl lithium nucleophiles like tris (hydroxylmethyl) phosphine or n-butyl lithium. Nucleophilic strength will depend on the stability of the anion created at the polymer active center. Cationic initiators are non-nucleophilic cations e.g., triphenylmethane cation and tropylium cation.

Initiators can include one or more organic or inorganic compounds that generate free radicals under the conditions employed. In some embodiments, the initiator is a per-oxygen type compound, such as an organic peroxide. Examples of suitable initiators are per-oxygen compounds such as hydrogen peroxide, dialkyl dioxides, such as diethyl peroxide, and ditertiary butyl peroxide: butyryl peroxide and lauroyl peroxide; benzoyl peroxide; alkylhydroperoxides, diperoxy dicarbonate esters, tertiary alkyl percarboxylates, such as tertiary butyl perbenzoate and potassium persulfate; azo-bis (isobutyronitrile); azines, such as benzalazine; and oximes, such as acetone oxide. Particularly suitable are mixtures of the per-oxygen compounds, for example peroxides such as lauroyl peroxide and ditertiary-butyl peroxide in various proportions.

Base Fluids

Oleaginous fluids in accordance with the present disclosure include paraffinic hydrocarbons with or without solvents like mineral oil with toluene, diesel, mineral oil, vegetable oil, synthetic oil, silicone oil, or mixtures of these or similar materials. Aqueous fluids (equivalently non-oleaginous fluids) can include aqueous fluids including fresh water, seawater, brine, and other similar fluids.

Emulsifiers

Polymerization methods disclosed herein can include emulsion polymerizations that include one or more emulsifiers. Emulsifiers can include any emulsifier or blend capable of enhancing the kinetic stability of the selected emulsion system (e.g., invert emulsions, direction emulsions, etc.), including one or more emulsifiers such as polyethoxylated phenols, polyethoxylated sorbitans, polyethoxylated alcohols, carboxylic acid esters, and the like.

In some embodiments, emulsions can include a single emulsifier or a mixture of emulsifiers with varied hydrophilic-lipophilic balance (HLB). The emulsifier may contain vinyl olefin functional groups capable of inclusion in the polymer chain.

To facilitate a better understanding of the embodiments of the present invention, the following examples of preferred or representative embodiments are given. In no way should the following examples be read to limit, or to define, the scope of the invention.

Experiments of the Disclosure

U.S. Ser. No. 16/101,835

Example 1—Crosslinked Fracturing Fluid Made with Produced Water

This example compared the rheologies of three different crosslinked fracturing fluid systems: a standard borate crosslinked fresh water fracturing fluid, a produced water sample including no pH adjusting buffer, and a produced water sample including a pH adjusting buffer. The rheologies are shown in FIG. 3.

Figure 3:
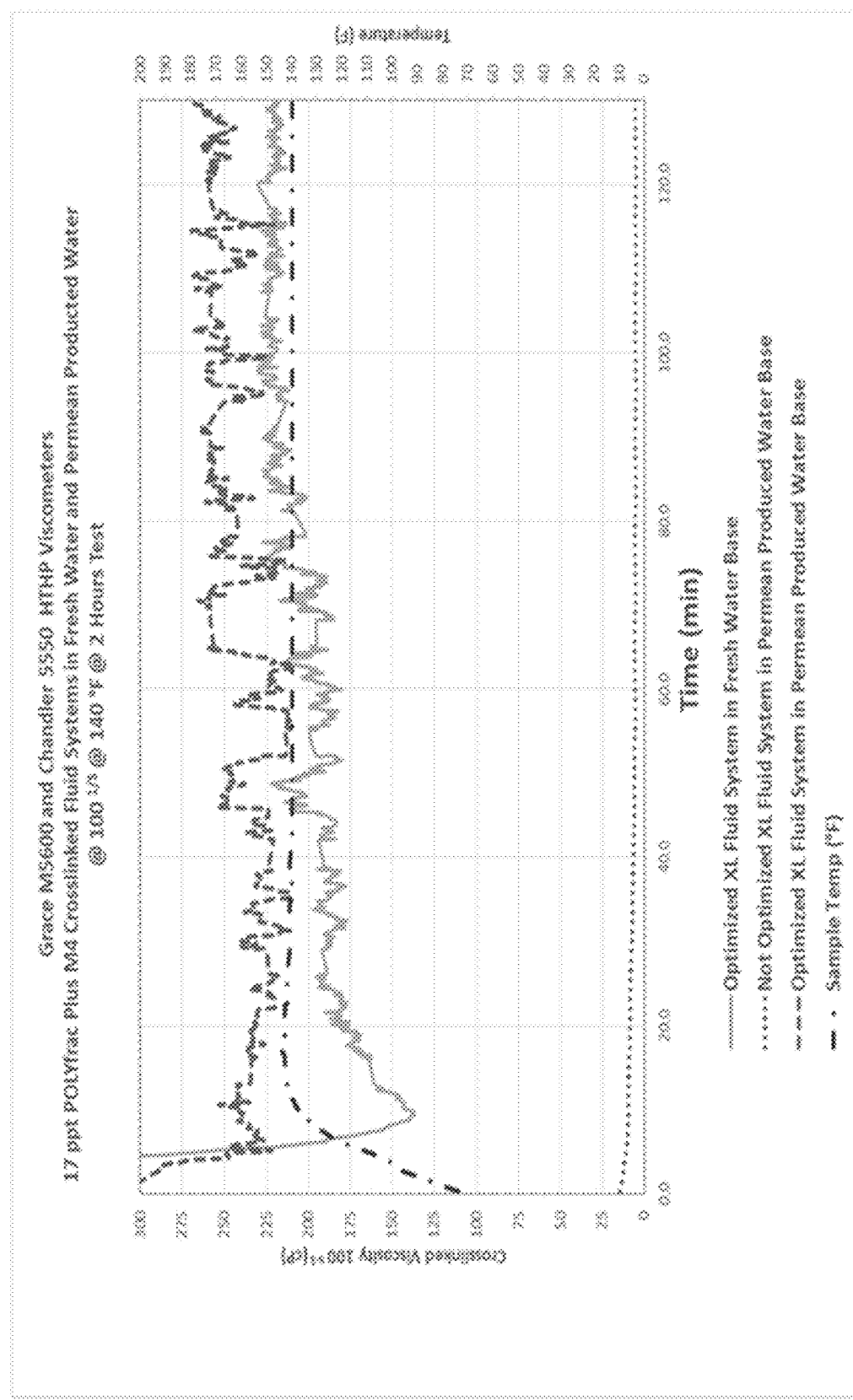
FIG. 3 depicts the behavior of a fracturing fluid of this disclosure.

A standard borate crosslinked fracturing fluid (made in a fresh water) was prepared using the following:
a) a guar gum loading of 17 ppt
b) a pH buffer to adjust the fluid pH to above 9
c) a borate crosslinking solution This combination of chemicals produced the rheology properties represented by the grey curve in FIG. 3. This curve shows a fracturing fluid system that may sustain a viscosity of ≥200 cps @ 100 sec$^{-1}$ for over two hours.

This test was then rerun after replacing the fresh water with a high TDS produced back water sample. The produced back water had an analysis as follows:

| Property/Reagent | Concentrations (mg/L) |
| --- | --- |
| pH | 7.05 |
| TDS | 99000 |
| Total Hardness as $CaCO_3$ | 6200 |
| Carbonate | 0 |
| Bicarbonate | ≥2440 |
| Alkalinity | ≥2440 |
| Chloride | 60000 |
| $H_2S$ | 1 |
| Bacteria | |
| SRB (cell/mL) | 1000 |
| APB (cell/mL) | 1000 |
| Calcium (Titration) | 2240 |
| Magnesium (Titration) | 145.8 |
| Boron (Hach) | 43 |

Utilizing the same three components (from the fresh water test) and a produced back fluid resulted in the rheology properties represented by the dotted curve in FIG. 3. The results of this test confirm that the use of a produced water prevents the development of any significant viscosity.

Finally, the effectiveness of utilizing the compositions, systems and methods may be illustrated by using the same high TDS produced water in the following modified procedure:
1. Weigh 350 (±0.5) grams of produced water base fluid into 1 liter blender glass jar.
2. Mix produced water base fluid on Constant Speed Blender at 2000 (±100) rpm.
3. Add 1.25 gpt of a low pH buffer or adjust produced water base fluid to pH~4.5.
4. Measure 17 ppt POLYfrac Plus M4$^1$ (~1.5 mL of slurry) in 3 mL syringe.
   $^1$ POLYfrac Plus M4 is a slurry of a guar gum in a suspension package
5. Inject 1.5 mL slurry into blender jar and mix for 3 minutes.
6. Measure and record viscosity on Fann 35 viscometer (w. R1B1) or equivalent @ 300 rpm (511 sec$^{-1}$) for 1 minute and record pH.
7. Weigh 100 (±0.5) grams of linear gel into Pyrex 300 mL glass beaker or equivalent.
8. Place beaker under overhead mixer and mix gel at 1000 (±50) rpm with high efficiency mixing blade.
9. Add 1.8 gpt BBXL$^2$ (0.18 mL) and promptly add 1.4 gpt Catalyst Activator$^3$ (0.14 mL) into the gel solution.
   $^2$ BBXL is a borate based crosslinker
   $^3$ Catalyst Activator is a pH buffer that is used to adjust the final pH of the fracturing fluid
11. Mix gel until crosslinking.
12. Promptly weigh 50 (±0.5) grams of crosslinked gel into cup and place it on Grace M5600 HTHP viscometer or equivalent.
13. Run test at 140° F. for 2 hours.
14. Record crosslinked gel pH and post crosslinked gel pH.

The dashed curve in FIG. 3 illustrates the test results from the compositions, systems and methods of this disclosure. The test results verify the ability to reach a high viscosity that is stable at 250 cps @ for at least 2 hours that is comparable if not superior to the fresh water test results.

Example 2—Composition and System Behavior

A variety of compositions of this disclosure was tested. The same approach utilized in Example 1 was repeated for each composition to illustrate the effectiveness of this approach. The results of these tests are illustrated in FIG. 4.

The graph illustrates the results of utilizing the previously described compositions of the disclosure to generate a two hour viscosity that is comparable to what is achieved when using a fresh water. The eight produced water sources covered a TDS range from about 60 ppm to about 120,000 ppm. But even more important than the TDS was the presence of measurable amounts of ions (for example boron) that have historically been known to present major issues in creating a crosslinked fracturing fluid that exhibits the targeted viscosity and temperature stability that is required when utilizing this type of fracturing fluid system.

Example 3—Shear History Effects

To measure proppant suspension properties of a polymer containing fracturing fluid (both before and after a shear history) in a dynamic test, the following procedure was developed:
a) hydrate the polymer (to be evaluated) for 5 minutes at 1500 rpm.
b) add 120 gm of 20/40 coated or uncoated sand (2 pounds per gallon) and mix for 60 seconds at 1500 rpm. Note that the 120 grams would equate to 2 lb/gal if the test sample size is 500 mL.
c) lower the rpm until sand accumulates on the bottom of the blender jar.
d) record the lowest rpm reading that does not cause sand accumulation.

To establish the shear sensitivity of the test sample, the above sequence was repeated by adding a high shear step (3 minutes @ 4500 rpm) between steps (b) and (c).

Using the above procedure (both with and without a shear step) with uncoated sand yielded the data shown in FIG. 5. The reported minimum rpm reflects the degree of dynamic movement necessary to keep the solids in suspension. The proppant is 20/40 uncoated sand.

These test results showed that a shear history resulted in a greater than 40% increase in measured minimum rpm (which equates to a >40% decrease in transport properties). Both standard and high molecular weight/viscosity friction reducers showed a level of shear degradation. However, when the standard friction reducers were exposed to a representative shear history, the result was a complete loss of proppant transport properties (sheared standard friction reducers gave similar suspension results to the base fluid without the addition of a polymer). The high molecular weight/viscosity friction reducer was damaged by a representative shear history, but still retained some measureable ability to contribute to proppant transport. A linear gel was shown to not be so shear degradable, but also was less effective (than the high viscosity friction reducer) in contributing to proppant transport.

Example 4—Shear History and Controlled Crosslinking

One option to low viscosity, high rate slick water treatment is to utilize the compositions, systems and methods of this disclosure to create a low polymer concentration crosslinked fracturing fluid that will exhibit a controlled viscosity increase and improved proppant transport. This approach may be designed to accomplish the following:
 a) generate relatively long narrow fractures or fracture geometries,
 b) improve proppant transport, which in turn leads to an increase in propped fracture length,
 c) potentially reduce an injection rate (which helps contain the fracture growth within the targeted formation) and put away the desired amount of proppant, and
 d) reduce a volume of water that is required to create a desired fracture geometry and place the proppant in the fracture.

Using a low polymer concentration (in this case 8 ppt polymer) and uncoated sand but with a specially formulated crosslinking mechanism had a substantial impact on controlling shear degradation of the crosslinked polymer system (as compared to the effects of high shear on the various friction reducers and linear gels that are frequently utilized in a slick water design). The suspension test results are shown in FIG. 6. The reported minimum rpm reflects the degree of dynamic movement necessary to keep the solids in suspension. The proppantis 20/40 uncoated sand.

FIG. 6 verifies the effect (that a representative shear history) has on the ability to transport proppant. In each friction reducer test, the inclusion of a representative shear history resulted in a significant loss of the ability of the friction reducer to contribute to proppant transport. However, a properly formulated low polymer concentration crosslinked fracturing fluid system accomplishes the desired goal of achieving a substantial level of proppant transport despite experiencing a realistic shear history.

For a low polymer concentration polymer crosslinked fracturing fluid system to be suitably effective, initially the crosslinked structure (and its accompanying viscosity increase) should be delayed, but should be established before the fracturing fluid slurry leaves the tubular downhole injection mechanism and heads into the fracture field. In certain embodiments, the crosslinking process is timed to occur in the last 25% of its residence time in the wellbore tube. This would limit the period of high shear that the crosslink structure is exposed to before the crosslinked fracturing fluid enters the relatively low shear environment that is characteristic of a fracturing fluid moving through a created fractured matrix. The crosslinked structure need not be completely formed before the slurry enters the fracture, but the crosslinking process desirably has gone far enough to have already resulted in a substantial increase in viscosity that accompanies the development of the crosslinked structure and the associated contribution to improved proppant transport.

A Mechanism for Preventing Viscosity Degradation

While controlling the rate of crosslinking is certainly an effective way to control the effects of shear degradation of low polymer concentration crosslinked fracturing fluids, it is not likely a total answer. The time a fracturing fluid takes to move through tubular mechanism for injection into a formation, a high shear period, may vary dramatically due to a combination of well depth, lateral length, and pump rate. Thus, to better preserve the proppant transport capabilities of the low polymer concentration crosslinked fracturing fluids, a second mechanism may be incorporated that protects the fracturing fluid system against shear degradation. Shear degradation in certain situations adversely affects the ability for low polymer concentration crosslinked fracturing fluids to maintain viscosity and transport proppant capabilities. The added protection mechanism (when utilizing relatively low TDS water) includes utilizing a mixture of a guar or a guar derivative or a mixture thereof with a high molecular weight anionic polyacrylamide>15 million. The approach was tested using a mixture of guar (4550) and friction reducer (identified as AFRD-12) to achieve the desired combination of rheological properties and proppant transport. When utilizing high TDS water (for the fracturing fluid) it may still be possible to utilize a high molecular weight anionic polyacrylamide but it may be necessary to replace this polyacrylamide with either a cationic, non-ionic or amphoteric polyacrylamide.

Example 5—Maximum Transport Systems

To illustrate this approach, the following tests were performed. The first set of tests (Table I) were performed using an initial 3 minute high shear period to simulate the trip from the surface to the fracture opening, while the second set of tests (Table II) were performed without the initial 3 minute high shear period. These so-called Maximum Transport Systems (MTS™, a trademark of PfP Industries) are fracturing fluids including a mixture of a guar, guar derivative or mixture thereof and a friction reducer (FR) that is crosslinked to achieve maximal proppant transport properties.

TABLE I

Tests of Fracturing Fluids Including a Guar and a Friction Reducer Without an Initial High Shear Period

| Test # | Guar† (ppt) | FR‡ (ppt) | Hydration Viscosity (cP) | Temp (° F.) | n' 3 min | n' 30 min | n' 60 min | Visc @ 100(1/s) cP 3 min | Visc @ 100(1/s) cP 30 min | Visc @ 100(1/s) cP 60 min |
|---|---|---|---|---|---|---|---|---|---|---|
| 23 | 7 | 1 | 5.6 | 75 | 0.5565 | 0.7897 | 0.7835 | 29.5 | 36.68 | 40.16 |
| 24 | 7 | 1 | 5.6 | 120 | 0.2857 | 0.4859 | 0.5424 | 21.79 | 49.29 | 46.71 |

TABLE I-continued

Tests of Fracturing Fluids Including a Guar and a Friction
Reducer Without an Initial High Shear Period

| Test | Guar[†] | FR[‡] | Hydration Viscosity | Temp | n' | | | Visc @ 100(1/s) cP | | |
|---|---|---|---|---|---|---|---|---|---|---|
| # | (ppt) | (ppt) | (cP) | (° F.) | 3 min | 30 min | 60 min | 3 min | 30 min | 60 min |
| 25 | 7 | 1 | 5.6 | 120 | 0.2269 | 0.4327 | 0.4822 | 23.85 | 44.51 | 41.39 |
| 28 | 7 | 0 | 4.4 | 75 | 0.4333 | 0.7805 | 0.7935 | 16.19 | 13.04 | 16.33 |
| 29 | 7 | 0 | 4.4 | 120 | 0.3305 | 0.9279 | 1.0106 | 15.2 | 24.91 | 24.58 |
| 30 | 7 | 0 | 4.4 | 120 | 0.3049 | 1.3651 | 1.4849 | 13 | 17.47 | 17.9 |
| 31 | 8 | 0 | 5.0 | 80 | 0.5993 | 0.6097 | 0.7045 | 22.61 | 22.65 | 28.86 |
| 34 | 8 | 0 | 5.0 | 120 | 0.5679 | 0.3507 | 0.2994 | 17.63 | 48.08 | 47.98 |
| 35 | 8 | 0 | 5.0 | 120 | 0.4305 | 0.3180 | 0.3862 | 16.65 | 45.41 | 46.4 |

[†]4550 Guar is a high viscosity guar gelling agent available from available from PfP Industries
[‡]AFRD-12 is a dry anionic high viscosity friction reducer available from PfP Industries.

Looking at Test #24 and Test #34, the data suggests that there is little difference between a 7:1 (guar:FR) mix and just using 8 ppt guar. However, the results may have been influenced by the fact that at 8 ppt of 4550 guar, the fracturing fluid may be getting too close to a concentration of guar that acts more like a conventional crosslinked system. Looking at Test #24 and Test #29, comparing a fracturing fluid based on a 7:1 guar:FR mixture to a fracturing fluid based on a 7:0 guar:FR mixture, the data suggests that the FR is contributing to the viscosity building in an unexpected way. To better characterize the effect of FR-on viscosity building, Test #24 and Test-#29 were rerun, but without the initial high shear period. If the viscosity is not very different in the two runs, then the result would support the concept that an FR really does not impact the viscosity building or crosslinked viscosity of a fracturing fluid. However, because the original results of Test #24 and Test #29 were so different, it may support the concept that the addition of the selected FR protects a 7 ppt crosslinked guar fracturing fluid from shear degradation.

To see whether a mixture of a guar and a friction reducer in a fracturing fluid has no effect on viscosity building or a marked effect on viscosity building, several of the tests of Table I, where repeated, but without the initial high shear period.

Comparing Test #24 to Test #104 verifies that the inclusion of 1 ppt of the AFRD-12 friction reducer transforms the formulation into a fracturing fluid system that is unaffected by high shear. Test #24 of Table I, which was exposed to an initial high shear period, actually exhibited a higher 60 minute viscosity of 46.7 cP compared Test #104, which was not exposed to the initial high shear period, which had a to 60 minute viscosity of 42 cP.

The results of Test #98 and Test #104 of Table 1 both showed 60 minute n' values below 0.7, while the results of Test #24 and Test #29 of Table I showed that when the 7:1 formulation (Test #24) is subjected to the initial high shear period, the formulation had a low n' (0.542), while, even though the 7:0 formulation (Test #29) exhibited a 60 minute viscosity >24 cP, its 60 minute n' was >1 (an indication that the fluid may not have the desired crosslinked structure to maximize proppant transport).

The results from Test #100 of Table II compared to Test #34 of Table I confirms that a 8:0 formulation is fairly resistant to shear degradation. The inclusion of the initial high shear period only dropped the 60 minute viscosity reading by 8%.

TABLE II

Tests of Fracturing Fluids Including a Guar and a Friction Reducer
Without an Initial High Shear Period @ 120° F.

| Test | Guar[†] | FR[‡] | Hydration Viscosity | Buffer | DXL-2 | n' | | | Visc @ 100(1/s) cP | | |
|---|---|---|---|---|---|---|---|---|---|---|---|
| # | (ppt) | (ppt) | (cP) | (gpt) | (ppt) | 5 min | 30 min | 60 min | 5 min | 30 min | 60 min |
| 98 | 7 | 0 | 4.2 | 1 | 4.8 | 0.7965 | 0.6101 | 0.6654 | 42 | 38 | 38 |
| 104 | 7 | 1 | 5 | 1 | 4.8 | 0.8942 | 0.5937 | 0.6685 | 69 | 44 | 42 |
| 100 | 8 | 0 | 4.8 | 1 | 4.8 | 1.0118 | 0.3084 | 0.2933 | 69 | 52 | 52 |
| 102 | 8 | 1 | 5.4 | 1 | 4.8 | 0.8345 | 0.4813 | 0.502 | 85 | 70 | 70 |

[†]4550 Guar is a high viscosity guar gelling agent available from available from PfP Industries
[‡]AFRD-12 is a dry anionic high viscosity friction reducer available from PfP Industries.

When looking at Test #24 and Test #29 of Table I, which included a initial high shear period, the 7:1 formulation had approximately twice the viscosity @ 1 hour as did the 7:0 formulation. When looking at Test #98 and Test #104 of Table II, which did not include an initial high shear period, the 7:1 formulation showed about 10% increase in viscosity @ 1 hour compared to 7:0 formulation.

Example 6—Dynamic Proppant Transport in a Crosslinked Fracturing Fluid Prepared from High TDS Produced Back Water Base Fluids Having established in Example 2 that the disclosed compositions, systems and methods of this disclosure may generate desired rheological properties using a high TDS produced back water base fluid, it is important to determine if in a low polymer concentration crosslinked fracturing fluid system may exhibit a substantial proppant transport capability even when subjected to a representative shear history and utilizing a high TDS water base fluid. FIG. 7 represents the suspension test results of the low polymer concentration crosslinked fracturing fluid approach and a variety of friction reducers in two different high TDS base fluids. In each case test, the suspension test included a representative shear history.

Clearly the combination of a representative shear history and elevated TDS render all friction reducers incapable of contributing to proppant transport (with the suspension test results being essentially the same as measured with a brine containing no polymer). However, with this test approach, the low polymer crosslinked fracturing fluid system (based on the embodiments, systems and methods of this disclosure) still exhibits a substantial ability to transport proppant.

Example 7—Friction Reduction

There are two more fracturing fluid characteristics that are considered to be important for a low concentration crosslinked polymer fracturing fluid system to exhibit if the system was going to be used in place of a friction reducer polymer in a slick water fracturing fluid. The first such characteristic is drag reduction. The one thing a friction reducer does well is reduce pipe friction that is created when the fracturing fluid and proppant are pumped through injection tubulars.

The conventional industry-accepted way to determine the amount of drag reduction (that a friction reducer may create) is with a device described as a flow or friction loop. An example of such a device is shown in FIG. 8.

The device includes a pump and a length of pipe with pressure taps that have been designed to allow the fluid velocity in the test to be representative of what may be achieved in a fracturing treatment. By monitoring the pressure drop in the test section and comparing the test results of pumping water with and without a friction reduction polymer, one may calculate the expected drag reduction that the addition of a the polymer may achieve.

If a low concentration polymer crosslinked fracturing fluid system is to be effective in replacing a slick water treatment design, it needs to yield similar drag reduction results. FIG. 9 shows the results of a drag reduction test comparing the drag reduction properties of a standard anionic friction reducer, a high molecular/high viscosity friction reducer and the low polymer concentration crosslinked fracturing fluid. All three samples gave between 70% and 75% drag reduction and where stable through the duration of the test cycle.

The present compositions, systems and methods are significantly different than the industry standards which use normal guar and borate based cross-linkers. Our process and chemistry works with a wide range of TDS base fluids that are obtained using a variety of produced waters, flow back waters, frac flow back waters, brine brackish waters, OR waters, or mixtures thereof. In certain embodiments, the base fluids may also include fresh water.

U.S. Ser. No. 16/900,084

Example 8: Representative Invert Emulsion Polymerization

In the following example, an invert emulsion polymerization system as disclosed herein is used to perform an inverse emulsion synthesis of polyacrylamide in continuous and batch processes. The methodology has the overall steps of: A. preparation of aqueous and oil phases; B. blending of aqueous phase and oil phases; C. initiation of polymerization; D. termination and polymer isolation. Each of the steps are discussed in detail below.

A. Preparation of Aqueous and Oil Phases

The aqueous phase of the invert emulsion is prepared by dissolving acrylamide monomer in an aqueous fluid with or without a comonomer. The aqueous phase may also contain other additives such as inorganic salts, acid, base, pH buffer, initiator precursor, and cooling agents such as ice and dry ice. The oil phase contains a paraffinic hydrocarbon(s), an emulsifier made up of one or more surfactants, and an optional initiator precursor.

B. Blending of the Aqueous and Oil Phases

The aqueous and oleaginous phases are combined using a mixing device incorporating an extender, which results in a homogenized inverse emulsion (w/o) or inverse microemulsion (w/o). During emulsification, the mixing device simultaneously saturates the liquids with nitrogen gas by addition of pure nitrogen gas as part of the degassing process. The emulsion blending/degassing step can be a batch process where the liquids are blended and degassed in a single tank under slight vacuum, or a continuous process where the emulsion flows into a resonance tank under slight vacuum.

C. Initiation of Polymerization

After emulsification and degassing, the emulsion is initiated using initiators like sodium bisulfite with sodium bromate, or azobisisobutyronitrile (AIBN) present in a constituent phase prior to emulsion or added to the emulsion prior to propagation. Propagation can then occur through a recirculation of the material in a batch reactor or in a continuous process using an inline mixed tube reactor of sufficient length to for the desired degree of propagation. To inhibit chain transfer reactions and increase polymer linearity, the polymerizing mixture is transferred to a mixing device that includes an extender from a batch or linear reactor. As the polymerizing mixture passes through the extender, the polymer chains stretch, which inhibits intramolecular chain transfer and other branching reactions.

During propagation, the system can be cooled by cooling tower water, chilled water, or other heat exchanger to maintain an isothermal environment. In some embodiments, polymerization reactions can be adiabatic and cooled after propagation by cooling tower water, chilled water, flash evaporator cooling/concentration, and the like.

D. Termination and Polymer Isolation

After cooling, termination by an appropriate material e.g. radical scavenger, radical inhibitor, or complete consumption of monomer. The polymer can then be isolate by precipitation or phase inversion.

U.S. Ser. No. 16/911,546

Dynamic proppant transport capability (DPTC) test procedure. The DPTC test procedure can be used to compare the relative ability of fluids to suspend proppant particles. Complete details on the DPTC test procedure can be found in U.S. Provisional Patent App. Ser. No. 62/770,871 entitled "Apparatuses, Systems, and Methods for Dynamic Proppant Transport Fluid Testing," and filed on Nov. 23, 2018, the contents of which are hereby incorporated by reference in their entirety. The test is performed in a Model 20 Constant Speed Blender available from OFITE. The reference sample is 250 mL of water and 60 grams of 40/70 sand (equivalent to 2 ppg). A sample tested by this procedure is 250 mL of water, 60 grams of 40/70 sand, and desired concentration of hydratable additive (which may be hydrated according to a desired method). A "traditional shear hydration" method herein refers to adding the water, sand, and hydratable additive to the blender sequentially within 5 seconds and beginning the test. There is no additional hydration time. Each sample is subjected to the following procedure.

(1) The samples are mixed in the blender at 1200 RPM for 12 seconds, which represents the mixing time spent in the blender equipment during pumping.

(2) The RPM is increased for a corresponding time as prescribed in the description. If one is not specified, 5 min at 4500 RPM is used.

(3) The RPM is reduced over time at a rate no faster than 50 RPM/sec until sand accumulates on the bottom of the blender jar.

(4) The RPM is increased to re-suspend the sand and then decreased at a rate no faster than 50 RPM/sec to observe sand accumulation. This is repeated at least 5 times until a minimum RPM to suspend the sand is determined.

The % improvement in a dynamic proppant transport capability is the minimum RPM of the reference sample minus the minimum RPM of the sample where the difference is then divided by the minimum RPM of the reference sample and multiplied by 100.

Example 9

To evaluate the ability of a friction reduction additive to aid in proppant transport through surface equipment, a test procedure was developed that simulated the dynamics of moving proppant through a blender tub and high-pressure pumps. For the test procedure to be representative of what occurs at a wellsite, the test procedure must take into account the time and mixing that occurs when the friction reducer additive (a hydratable additive), base fluid (e.g., comprising the hydrating fluid), and proppant come together in the blender tub and the reduction in fluid velocity that occurs when the fracturing fluid/slurry leaves the blender and moves into the suction manifolds of the high pressure pumps. To simulate this process the following procedure was developed.

(1) All tests were run using 250 mL of fresh water and 30 grams of 40/70 sand (equivalent to 1 pound per gallon (ppg)) at room temperature.

(2) Add the water, sand, and the friction reducer (FR) being tested into the blender and mix for 7 seconds at 1200 RPM. The time interval of 7 seconds was chosen as a representative time from the fluid's entering the suction manifold (of the blender) until the time it leaves the discharge manifold (for a treatment that is being pumped at approximately 90 barrels per minute).

(3) At the end of 12 seconds, reduce the setting to 700 RPM. The 700 RPM setting was chosen as being representative of the fluid velocity/shear rate that is achieved going through the high-pressure pumps.

(4) Observe for 30 seconds at 700 RPM to see if any sand accumulates on the bottom of the blender jar. (As a point of reference, sand drops out of water (containing no polymer) at ±890 RPM.)

(5) Document the test results with a picture of the bottom of the blender jar.

Using said procedure, four samples were tested: (1) 1 gpt (gallon additive per 1000 gallons of fluid) of emulsion/liquid FR hydrated by a method that simulates addition at the blender; (2) 1 gpt liquid HVFR-2 hydrated by a method that simulates addition at the blender; (3) solid HVFR-1 hydrated using an extender/extensional flow described herein at a concentration corresponding to the polymer concentration in 1 gpt of the liquid equivalent to HVFR-1; and (4) solid HVFR-1 hydrated using an extender/extensional flow described herein at a concentration corresponding to the polymer concentration in 0.5 gpt of the liquid equivalent to HVFR-1. Sand settling was observed for Samples 1 and 2 and not observed for samples 3 and 4.

Example 10

This example determines the HVFR concentration required to provide at least a 30% reduction in the RPM as compared to water with no polymer required to keep a 40/70 sand in suspension after first being subjected to a representative shear history at room temperature. The samples were 250 mL of water to which friction reducer at concentrations per Table 1 below and 60 grams of 40/70 sand (equivalent to 2 ppg) were added. The test was performed according to the DPTC test procedure.

Samples and different shear histories (combination of time and shear rate/RPM) utilized in this comparison and the settling results are provided in Table 1. The shear histories were chosen to equate to a representative time and shear rate that can occur during a fracturing treatment. The No Polymer control sample used for comparison had a minimum RPM of 883. HVFR-1L and HVFR-2L are liquid additives and used as provided. HVFR-1S is a solid additive that was hydrated by the extender/extensional flow methods of the present disclosure.

TABLE 2

| Sample | Shear History* | Minimum RPM | % Improvement in DPTC |
|---|---|---|---|
| 2 gpt HVFR-1L | 3 min at 3400 RPM | 669 | 24.2 |
| 2 gpt HVFR-1L | 5 min at 3400 RPM | 622 | 29.6 |
| 2 gpt HVFR-1L | 3 min at 4500 RPM | 688 | 22.1 |
| 2 gpt HVFR-1L | 5 min at 4500 RPM | 694 | 21.4 |
| 3 gpt HVFR-1L | 3 min at 3400 RPM | 544 | 38.4 |
| 3 gpt HVFR-1L | 5 min at 3400 RPM | 592 | 33.0 |
| 3 gpt HVFR-1L | 3 min at 4500 RPM | 640 | 27.5 |
| 3 gpt HVFR-1L | 5 min at 4500 RPM | 710 | 19.6 |
| 2 gpt HVFR-2L | 3 min at 3400 RPM | 639 | 27.6 |
| 2 gpt HVFR-2L | 5 min at 3400 RPM | 668 | 24.3 |
| 2 gpt HVFR-2L | 3 min at 4500 RPM | 772 | 12.6 |
| 3 gpt HVFR-2L | 3 min at 3400 RPM | 643 | 27.2 |
| 3 gpt HVFR-2L | 5 min at 3400 RPM | 671 | 24.0 |
| 3 gpt HVFR-2L | 3 min at 4500 RPM | 704 | 20.3 |
| 3 gpt HVFR-2L | 5 min at 4500 RPM | 728 | 16.5 |
| Eq 2 gpt HVFR-1S** | 3 min at 3400 RPM | 637 | 27.9 |
| Eq 2 gpt HVFR-1S | 5 min at 3400 RPM | 655 | 25.8 |
| Eq 2 gpt HVFR-1S | 3 min at 4500 RPM | 567 | 35.8 |
| Eq 2 gpt HVFR-1S | 5 min at 4500 RPM | 584 | 33.9 |
| Eq 3 gpt HVFR-1S | 3 min at 3400 RPM | 494 | 44.1 |
| Eq 3 gpt HVFR-1S | 5 min at 3400 RPM | 511 | 42.1 |
| Eq 3 gpt HVFR-1S | 3 min at 4500 RPM | 463 | 47.6 |
| Eq 3 gpt HVFR-1S | 5 min at 4500 RPM | 550 | 37.7 |

*The Shear Histories listed equate to the following:
3 minutes at 3400 RPM simulates the shear history of a fluid being pumped at 69 barrels per minute (BPM) through 8730 ft of 5.5 inch OD casing;
5 minutes at 3400 RPM simulates the shear history of a fluid being pumped at 69 BPM through 14,550 ft of 5.5 inch OD casing;
3 minutes at 4500 RPM simulates the shear history of a fluid being pumped at 94 BPM through 11,700 ft of 5.5 inch OD casing; and
5 minutes at 4500 RPM simulates the shear history of a fluid being pumped at 94 BPM through 19,500 ft of 5.5 inch OD casing.
**Eq # gpt HVFR-1 refers to a concentration of HVFR-1 that contains the same HVFR-1 concentration in dry form as what is present in the liquid additive HVFR-1 at # gpt.

Almost all of the samples prepared with a HVFR hydrated by the extender/extensional flow methods of the present disclosure provide greater than 30% improvement in sand suspension. However, only a few of the samples prepared with HVFR liquid polymer additives pass such threshold. This example demonstrates that hydratable additives that are hydrated by the extender/extensional flow methods of the present disclosure are more shear stable would have greater dynamic 5 proppant transport.

Example 11

This example investigates the use of a liquid hydratable additive in the extender/extensional flow methods of the present disclosure.

Three samples were prepared according to the following test methods using (a) 3 gpt liquid HVFR-1, (b) solid HVFR-1 hydrated using an extender/extensional flow described herein at a concentration corresponding to the polymer concentration in 3 gpt of the liquid equivalent to HVFR-1, or (c) 3 gpt liquid HVFR-1 hydrated using an extender/extensional flow described herein. The samples were 250 mL of water to which friction reducer at the foregoing concentrations and 60 grams of 40/70 sand (equivalent to 2 ppg) were added. The test was performed according to the DPTC test procedure.

Samples and different shear histories (combination of time and shear rate/RPM) utilized in this comparison and the settling results are provided in Table 3. The No Polymer control sample used for comparison had a minimum RPM of 883.

TABLE 3

| Sample | Shear History | Minimum RPM | % Improvement in DPTC |
|---|---|---|---|
| 3 gpt HVFR-1L | 3 min at 3400 RPM | 544 | 38.4 |
| 3 gpt HVFR-1L | 5 min at 3400 RPM | 592 | 33.0 |
| 3 gpt HVFR-1L | 3 min at 4500 RPM | 640 | 27.5 |
| 3 gpt HVFR-1L | 5 min at 4500 RPM | 710 | 19.6 |
| Eq 3 gpt HVFR-1S* | 3 min at 3400 RPM | 494 | 44.1 |
| Eq 3 gpt HVFR-1S* | 5 min at 3400 RPM | 511 | 42.1 |
| Eq 3 gpt HVFR-1S* | 3 min at 4500 RPM | 463 | 47.6 |
| Eq 3 gpt HVFR-1S* | 5 min at 4500 RPM | 550 | 37.7 |
| 3 gpt HVFR-1L* | 3 min at 3400 RPM | 494 | 41.6 |
| 3 gpt HVFR-1L* | 5 min at 3400 RPM | 570 | 35.4 |
| 3 gpt HVFR-1L* | 3 min at 4500 RPM | 659 | 25.4 |
| 3 gpt HVFR-1L* | 5 min at 4500 RPM | 644 | 27.1 |

*Samples were hydrated using an extender/extensional flow described herein.

Hydrating the HVFR using an extender/extensional flow described herein improves the sand suspension in the fluid whether the HVFR is solid or liquid. However, in the hydration methods using an extender/extensional flow described herein, a solid additive appears to be superior to a liquid additive.

Example 12

Three samples of 12 ppt AFRD™-12 (anionic high viscosity friction reducer, available from PfP Industries) in water were prepared by different methods. The first method was 13 seconds of blending in a Waring blender at 1250 RPM. The second method was using an extender/extensional flow described herein followed by mixing for 5 seconds in the Waring blender at 1250 RPM. The third method was using an extender/extensional flow described herein to produce a 48 ppt concentrate of AFRD™-12 that was then diluted 3:1 and mixed for 5 seconds in the Waring blender at 1250 RPM to produce the 12 ppt AFRD™-12 in water. The 13 seconds for the blending in the first method was chosen because that is the approximate time for the second and third methods.

The viscosity (OFITE 900 viscometer at 300 rpm and 80° F.) of the three samples is reported in Table 4.

TABLE 4

| | | Viscosity (cps) | | | |
|---|---|---|---|---|---|
| Sample | AFRD™-12 Conc. (ppt) | 1 minute | 2 minutes | 3 minutes | 5 minutes |
| 1st Method | 12 | 4.2 | 7.4 | 10.1 | 12.6 |
| 2nd Method | 12 | 5.7 | 12.1 | 14.5 | 16.1 |
| 3rd Method | 12 | 7.5 | 10.2 | 11.2 | 12.4 |
| 1st Method | 24 | 8.0 | 14.8 | 21.3 | 24.1 |
| 2nd Method | 24 | 17.1 | 28.5 | 33.0 | 33.5 |

Test results for the 12 ppt AFRD™-12 samples indicate that the extender/extensional flow described herein (2nd Method) creates an increase in the rate of polymer hydration/viscosity build-up as compared to the blending (1st Method) that varies from about 22% to almost 40% depending on what time increment is being analyzed. The viscosity comparison also showed an increase in peak viscosity of approximately 22% at the 5-minute mark. The test utilizing the 48 ppt concentrate (3rd Method) showed an even faster initial hydration rate but later reading showing viscosity fluctuations are attributed to insufficient mixing (only 5 seconds) of the concentrate and dilution water before the viscosity measurements were started.

The test results on the 24 ppt AFRD™-12 samples indicated that the initial build-up for the extender/extensional flow described herein (2nd Method) was approximately twice as fast as the blending (1st Method). Along with the faster viscosity build-up that was also a bigger difference in the viscosity readings at 5 minutes with approximately 39% more viscosity (33.5/24.1 cps) for the extender/extensional flow described herein (1st Method) than the blending (1st Method). If the evaluation of the viscosity profile for each sample was extended, it is likely that the peak viscosities would trend to a similar value.

Example 13

DPTC was analyzed for the for three samples: 3 gpt XCEL™ 200 (acrylic acid polymer, available from Xcel Surfaces) in water mixed in a Waring blender for 13 seconds, 12 ppt AFRD™-12 sample by the 2nd Method of Example 4, and 12 ppt AFRD™-12 sample by the 3rd Method of Example 4. The results are provided in Table 5.

TABLE 5

| Sample | Minimum RPM % | Improvement in DPTC |
|---|---|---|
| Water | 883 | n/a |
| 3 gpt XCEL™ 200 | 710 | 19.6 |
| 12 ppt AFRD™-12 2nd Method | 661 | 25.1 |
| 12 ppt AFRD™-12 3rd Method | 557 | 37.0 |

The DPTC again verified the value of hydrating the high molecular weight AFRD™-12 polyacrylamide using the extender/extensional flow described herein. Both samples produced with the extender/extensional flow described herein retained superior dynamic transport properties as compared to the same polymer concentration (in a suspension) that was hydrated utilizing a mixer and the same mixing time as the extender/extensional flow samples prior to being subjected to a representation shear history.

Further, the sample produced with the 3rd Method outperformed the sample produced with the 2nd method. Without being limited by theory, this may be that the added initial viscosity of the 48 ppt concentrate sample before dilution continues to protect the structure development of the polymer during its early hydration.

CLOSING PARAGRAPH

All references cited herein are incorporated by reference. Although the disclosure has been disclosed with reference to its preferred embodiments, from reading this description those of skill in the art may appreciate changes and modification that may be made which do not depart from the scope and spirit of the disclosure as described above and claimed hereafter.

We claim:

1. A method comprising:
    flowing a hydrating liquid in an extensional flow regime through an elongated passageway of an extender, wherein a flow rate of the hydrating liquid and a diameter of the elongated passageway are sufficient to achieve a Reynolds number of 20,000 or greater; and
    adding a hydratable additive to the hydrating liquid in the elongated passageway to produce a fracturing fluid composition comprising the hydratable additive and the hydrating liquid, wherein:
        the hydrating liquid comprises a base fluid; and
        the hydratable additive comprises:
            an effective amount of one or more dry powdered gel-forming hydratable polymers,
            a friction reducer composition, and
            a cross-linking composition in an amount sufficient to crosslink the one or more gel-forming hydratable polymers to form crosslinked structures within the fracturing fluid composition,
        wherein:
            the effective amount of the one or more dry powdered gel-forming hydratable polymers is between about 2 ppt and about 10 ppt of the fracturing fluid composition, and
            the fracturing fluid composition is adapted to improve proppant transport properties, to control viscosity when the hydrating fluid is a brine or a water having elevated total dissolved solids (TDS), and to increase proppant concentrations and proppant particle sizes within fractures.

2. The method of claim 1, further comprising:
    prewetting the hydratable additive with a portion of the hydrating liquid before introduction of the hydratable additive to the elongated passageway,
    wherein a concentration of the hydratable additive being prewetted is at least 5 times higher than a concentration of the hydratable additive in the fracturing fluid composition.

3. The method of any of the preceding claims, further comprising:
    conveying the fracturing fluid composition from the extender to a suction side and/or a discharge side of a blender.

4. The method of any of the preceding claims, wherein:
    the one or more dry powdered gel-forming hydratable polymers comprise galactomannan gums, glucomannan gums, guars, derivatized guars, cellulose derivatives, or mixtures and combinations thereof.

5. The method of any of the preceding claims, wherein friction reducer composition includes:
    one or more powdered synthetic polymers, copolymers, or mixtures thereof,
    one or more powdered anionic, cationic, or amphoteric homopolymers, copolymers, terpolymers, or high order mixed monomer polymers synthesized from one or more anionic monomers, cationic monomers, neutral monomers, or mixtures thereof,
        the anionic monomers including acrylic acid, methacrylic acid, 2-acrylamide-2-methylpropane sulfonic acid, maleic anhydride, or mixtures and combinations thereof,
        the cationic monomers including dimethyl-diallyl ammonium chloride, dimethylamino-ethyl methacrylate, allyltrimethyl ammonium chloride, or mixtures thereof,
        the neutral monomers including butadiene, N-vinyl-2-pyrrolidone, methyl vinyl ether, methyl acrylate, maleic anhydride, styrene, vinyl acetate, acrylamide, methyl methacrylate, acrylonitrile, or mixtures thereof,
    the one or more powdered synthetic polymers and/or the one or more anionic, cationic, or amphoteric homopolymers, copolymers, terpolymers, or high order mixed monomer polymers are also adapted to protect and stabilize the crosslinked structures from shear degradation, or
    mixtures and combinations thereof.

6. The method of any of the preceding claims, wherein the crosslinking composition comprises one or more compounds including boron-containing ions, zirconium-containing ions, and titanium-containing ions, or mixtures thereof.

7. The method of any of the preceding claims, wherein the gel-forming hydratable polymers are present in the fracturing fluid in an amount less than about 10 ppt.

8. The composition of claim 7, wherein the amount less than or equal to about 8 ppt.

9. The method of any of the preceding claims, wherein the one or more dry powdered gel-forming hydratable polymers, the one or more dry powdered synthetic polymers, and/or the one or more dry powdered anionic, cationic, or amphoteric homopolymers, copolymers, terpolymers, or high order mixed monomer polymers have less than or equal to 10 wt % water and molecular weights ranging between about 10,000 g/mol and about 50 million g/mol.

10. The composition of claim 9, wherein the molecular weights ranging between about 18 million g/mol and about 40 million g/mol.

11. The composition of claim 10, wherein the molecular weights ranging between about 18 million g/mol and about 25 million g/mol.

12. The method of any of the preceding claims, wherein the hydratable additive further comprises:
    one or more clays.

13. The method of any of the preceding claims, further comprising:
    mixing the fracturing fluid composition with proppant and adding a diluent if needed to insure that the gel-forming hydratable polymers are present in the fracturing fluid in an amount less than about 10 ppt;
    injecting the fracturing fluid into a subterranean formation under conditions sufficient to create and/or extend at least one fracture in the subterranean formation; and
    placing the proppant in the at least one fracture.

14. The composition of claim 13, wherein the amount less than or equal to about 8 ppt.

15. A fracturing fluid composition comprising:
produced by:
flowing a hydrating liquid in a extensional flow regime through an elongated passageway of an extender, wherein a flow rate of the hydrating liquid and a diameter of the elongated passageway are sufficient to achieve a Reynolds number of 20,000 or greater, and
adding a hydratable additive to the hydrating liquid in the elongated passageway to produce the fracturing fluid comprising the hydratable additive that is at least partially hydrated;
wherein:
the hydrating liquid comprises a base fluid; and
the hydratable additive comprises:
an effective amount of one or more dry powdered gel-forming hydratable polymers,
a friction reducer composition, and
a cross-linking composition in an amount sufficient to crosslink the one or more dry powdered gel-forming hydratable polymers to form crosslinked structures within the fracturing fluid composition,
wherein:
the hydratable additive is at least partially hydrated,
the effective amount of the one or more dry powdered gel-forming hydratable polymers is between about 2 ppt and about 10 ppt of the fracturing fluid composition, and
the fracturing fluid composition is adapted to improve proppant transport properties, to control viscosity when the hydrating fluid is a brine or a water having elevated total dissolved solids (TDS), and to increase proppant concentrations and proppant particle sizes within fractures.

16. The composition of claim 15, further comprising:
prewetting the hydratable additive with a portion of the hydrating liquid before introduction of the hydratable additive to the elongated passageway,
wherein a concentration of the hydratable additive being prewetted is at least 5 times higher than a concentration of the hydratable additive in the fracturing fluid composition.

17. The composition of any of the claims 15-16, further comprising:
conveying the fracturing fluid composition from the extender to a suction side and/or a discharge side of a blender.

18. The composition of any of the claims 15-17, wherein:
the dry powdered gel-forming hydratable polymers are selected from the group consisting of galactomannan gums, glucomannan gums, guars, derivatized guars, cellulose derivatives, and mixtures or combinations thereof.

19. The composition of any of the claims 15-18, wherein friction reducer composition includes:
one or more dry powdered synthetic polymers selected from the group consisting of the partially hydrolyzed polymers and copolymers are selected from the group consisting of hydrolyzed or partially hydrolyzed polyacrylic acid, hydrolyzed or partially hydrolyzed polymethacrylic acid, hydrolyzed or partially hydrolyzed polyacrylamide, hydrolyzed or partially hydrolyzed copolymers of acrylic acid and one or more ethylenically unsaturated monomers, hydrolyzed or partially hydrolyzed copolymers of methylacrylic acid and one or more ethylenically unsaturated monomers, hydrolyzed or partially hydrolyzed copolymers of acrylamide and one or more ethylenically unsaturated monomers and mixtures or combinations thereof,
the ethylenically unsaturated monomers including vinyl alcohol, ethylene, propylene, and mixtures and combinations thereof, and/or
one or more dry powdered anionic, cationic, or amphoteric homopolymers, copolymers, terpolymers, or high order mixed monomer polymers synthesized from one or more anionic monomers, cationic monomers, and/or neutral monomers,
the anionic monomers are selected from the group consisting of acrylic acid, methacrylic acid, 2-acrylamide-2-methylpropane sulfonic acid, maleic anhydride, and mixtures or combinations thereof,
the cationic monomers are selected from the group consisting of dimethyl-diallyl ammonium chloride, dimethylamino-ethyl methacrylate, and/or allyltrimethyl ammonium chloride,
the neutral monomers are selected from the group consisting of butadiene, N-vinyl-2-pyrrolidone, methyl vinyl ether, methyl acrylate, maleic anhydride, styrene, vinyl acetate, acrylamide, methyl methacrylate, and/or acrylonitrile, and
the one or more dry powdered synthetic polymers and/or the one or more anionic, cationic, or amphoteric homopolymers, copolymers, terpolymers, or high order mixed monomer polymers are also adapted to protect and stabilize the crosslinked structures from shear degradation.

20. The composition of any of the claims 15-19, wherein the crosslinking composition comprises one or more compounds including boron-containing ions, zirconium-containing ions, and titanium-containing ions, or mixtures thereof.

21. The composition of any of the claims 15-20, wherein the dry polymer gel-forming hydratable polymers is present in the fracturing fluid in an amount less than about 10 ppt.

22. The composition of claim 21, wherein the amount less than or equal to about 8 ppt.

23. The composition of any of the claims 15-21, wherein the one or more dry powdered gel-forming hydratable polymers, the one or more dry powdered synthetic polymers, and the one or more dry powdered anionic, cationic, or amphoteric homopolymers, copolymers, terpolymers, or high order mixed monomer polymers have less than or equal to 10 wt % water and molecular weights ranging between about 10,000 g/mol and about 50 million g/mol.

24. The composition of claim 23, wherein the molecular weights ranging between about 18 million g/mol and about 40 million g/mol.

25. The composition of claim 24, wherein the molecular weights ranging between about 18 million g/mol and about 25 million g/mol.

26. The composition of any of the claims 15-23, wherein the hydratable additive further comprises:
one or more clays.

27. The composition of any of the claims 15-26, further comprising:
mixing the fracturing fluid composition with proppant and adding a diluent if needed to in sure that the gel-forming hydratable polymers are present in the fracturing fluid in an amount less than about 10 ppt.

28. The composition of claim 27, wherein the amount less than or equal to about 8 ppt.

* * * * *